(12) United States Patent
Nakano

(10) Patent No.: US 12,485,147 B2
(45) Date of Patent: Dec. 2, 2025

(54) METHOD FOR PRODUCING CELL MASS INCLUDING PITUITARY TISSUE, AND CELL MASS THEREOF

(71) Applicant: SUMITOMO CHEMICAL COMPANY, LIMITED, Chuo-ku (JP)

(72) Inventor: Tokushige Nakano, Kobe (JP)

(73) Assignee: SUMITOMO CHEMICAL COMPANY, LIMITED, Chuo-ku (JP)

( * ) Notice: Subject to any disclaimer, the term of this patent is extended or adjusted under 35 U.S.C. 154(b) by 527 days.

(21) Appl. No.: 16/766,529

(22) PCT Filed: Nov. 22, 2018

(86) PCT No.: PCT/JP2018/043290
§ 371 (c)(1),
(2) Date: May 22, 2020

(87) PCT Pub. No.: WO2019/103129
PCT Pub. Date: May 31, 2019

(65) Prior Publication Data
US 2020/0345784 A1 Nov. 5, 2020

(30) Foreign Application Priority Data
Nov. 24, 2017 (JP) .................. 2017-226312

(51) Int. Cl.
*C12N 5/00* (2006.01)
*A61K 35/30* (2015.01)
*C12N 5/10* (2006.01)

(52) U.S. Cl.
CPC ............ *A61K 35/30* (2013.01); *C12N 5/0018* (2013.01); *C12N 5/10* (2013.01); *C12N 2500/99* (2013.01);
(Continued)

(58) Field of Classification Search
CPC ........ A61K 35/30; C12N 5/0018; C12N 5/10; C12N 2500/99; C12N 2501/115;
(Continued)

(56) References Cited

U.S. PATENT DOCUMENTS 10,760,047 B2 * 9/2020 Sasai ................. C12N 5/0618
2011/0091869 A1 4/2011 Sasai et al.
(Continued)

FOREIGN PATENT DOCUMENTS

JP 2016-518137 A 6/2016
JP 2016-538856 A 12/2016
(Continued)

OTHER PUBLICATIONS

Aly et al., PloS ONE, vol. 8, Issue 6: e66131, Jun. 2013 (doi:10.1371/journal.pone.0066131.g009) (Year: 2013).*
(Continued)

*Primary Examiner* — Kimberly Ballard
*Assistant Examiner* — Stacey N MacFarlane
(74) *Attorney, Agent, or Firm* — Oblon, McClelland, Maier & Neustadt, L.L.P.

(57) ABSTRACT

The present invention aims to provide a method for efficiently producing a cell mass containing pituitary tissue from pluripotent stem cells. A method for producing a cell mass containing pituitary tissue, including the following steps (1) and (2):
(1) a first step of suspension-culturing pluripotent stem cells to form a cell aggregate in the presence of a Wnt signal transduction pathway inhibiting substance,
(2) a second step of suspension-culturing the aggregate obtained in the first step in the presence of a BMP signal transduction pathway activating substance and a
(Continued)

Sonic hedgehog signal transduction pathway activating substance, thereby obtaining a cell mass comprising pituitary tissue.

31 Claims, 17 Drawing Sheets

(52) U.S. Cl.
CPC .... *C12N 2501/115* (2013.01); *C12N 2501/15* (2013.01); *C12N 2501/155* (2013.01); *C12N 2501/41* (2013.01); *C12N 2501/415* (2013.01); *C12N 2501/727* (2013.01); *C12N 2506/02* (2013.01); *C12N 2506/45* (2013.01); *C12N 2533/52* (2013.01)

(58) Field of Classification Search
CPC .......... C12N 2501/15; C12N 2501/155; C12N 2501/41; C12N 2501/415; C12N 2501/727; C12N 2506/02; C12N 2506/45; C12N 2533/52; C12N 5/0618; C12N 5/0652; C12N 5/0697; C12N 5/0616; C12N 2513/00; C12N 5/0621; C12N 2501/113; C12N 2501/42; A61P 5/06; A61P 5/10; A61P 43/00
See application file for complete search history.

(56) References Cited

U.S. PATENT DOCUMENTS

| | | |
|---|---|---|
| 2014/0308743 A1 | 10/2014 | Sasai et al. |
| 2016/0115448 A1 | 4/2016 | Studer et al. |
| 2017/0313976 A1 | 11/2017 | Kuwahara et al. |
| 2018/0195041 A1 | 7/2018 | Sasai et al. |
| 2019/0010452 A1 | 1/2019 | Suga et al. |
| 2019/0127690 A1 | 5/2019 | Kuwahara et al. |
| 2019/0225939 A1 | 7/2019 | Chambers et al. |

FOREIGN PATENT DOCUMENTS

| | | | |
|---|---|---|---|
| WO | WO 2009/148170 A1 | | 12/2009 |
| WO | WO 2013/065763 A1 | | 5/2013 |
| WO | WO/2016/013669 | * | 1/2016 |
| WO | WO 2016/013669 A1 | | 1/2016 |
| WO | WO 2016/063985 A1 | | 4/2016 |
| WO | WO 2017/126551 A1 | | 7/2017 |
| WO | WO 2017/183732 A1 | | 10/2017 |

OTHER PUBLICATIONS

Attisano and Wrana F1000 Prime Reports, 2013, 5:17 (doi:10.12703/P5-17) (Year: 2013).*
Suga et al., Nature, 480:57-64, Dec. 2011 (Year: 2011).*
Extended European Search Report issued Jul. 27, 2021 in European Patent Application No. 18881914.8, 15 pages.
International Search Report issued Feb. 19, 2019 in PCT/JP2018/043290, 3 pages.
Chambers S.M. et al., "Highly Efficient Neural Conversion of Human ES and iPS Cells by Dual Inhibition of SMAD Signaling", Nature Biotechnology, vol. 27, No. 3, 2009, pp. 275-280.
Kadoshima T. et al., "Generation of Various Telencephalic Regions from Human Embryonic Stem Cells in Three-Dimensional Culture", Methods in Molecular Biology, vol. 1597, 2017, pp. 1-16.
Ozone C. et al., "Functional Anterior Pituitary Generated in Self-organizing Culture of Human Embryonic Stem Cells", Nature Communications, vol. 7, No. 1, Jan. 1, 2016, pp. 1-10.
Dincer Z. et al., "Specification of Functional Cranial Placode Derivatives from Human Pluripotent Stem Cells", Cell Reports, vol. 5, 2013, pp. 1387-1402.
Zimmer et al., "Derivation of Diverse Hormone-Releasing Pituitary Cells from Human Pluripotent Stem Cells", Stem Cell Reports, vol. 6, 2016, pp. 858-872.

* cited by examiner

METHOD FOR PRODUCING CELL MASS INCLUDING PITUITARY TISSUE, AND CELL MASS THEREOF

TECHNICAL FIELD

The present invention relates to a method for producing a cell mass containing pituitary tissue, and the cell mass. Furthermore, it relates to a cell mass containing neural cells or neural tissue, pituitary tissue, and mesenchymal cells.

BACKGROUND ART

The pituitary gland is an endocrine organ located in the head and produces various pituitary hormones that are important for the maintenance and growth of the body, such as adrenocorticotropic hormone (ACTH) and growth hormone. When pituitary dysfunction is caused by diseases such as pituitary hypoplasia, hypopituitarism, pituitary adenoma and the like, severe symptoms similar to growth disorder, genital-related abnormality, and abnormalities of the adrenal gland and thyroid gland occur. In general, disordered pituitary tissue rarely regenerates naturally and recovers function.

Patent document 1 and non-patent documents 1, 2 report that cranial placode-derived cells including pituitary cells were produced by inducing differentiation of human pluripotent stem cells in the presence of a BMP signal transduction pathway inhibiting substance or activating substance, a Sonic hedgehog (sometimes referred to as Shh in the present specification) signal transduction pathway activating substance, and a TGF-β signal transduction pathway inhibitor. However, the cells produced were those two-dimensionally cultured and the structure of complicated pituitary tissue of the body which is important for exhibiting functions has not been reproduced. Therefore, a method capable of efficiently producing three-dimensional pituitary tissue has been desired.

DOCUMENT LIST

Patent Document patent document 1: JP-A-2016-538856

Non-Patent Documents non-patent document 1: Dincer et al. Cell Reports 5, 1387-1402, 2013.
non-patent document 2: Zimmer et al. Stem Cell Reports 6, 858-872, 2016

SUMMARY OF THE INVENTION

Problems to be Solved by the Invention

An object of the present invention is to provide a method for efficiently producing a cell mass containing pituitary tissue from pluripotent stem cells. Particularly, it is to provide a method for efficiently producing a cell mass containing high quality pituitary tissue containing pituitary tissue stem cells in the tissue. Specifically, it is to provide a method for efficiently producing a cell mass which may use a feeder-free cultured pluripotent stem cell as a starting material, and permits reduction of the amount of expensive recombinant protein to be used to produce the cell mass at a lower cost.

Means of Solving the Problems

The present inventor has conducted intensive studies in an attempt to solve the above-mentioned problems and found that a cell mass containing pituitary tissue can be efficiently produced by culturing pluripotent stem cells in suspension in the presence of a Wnt signal transduction pathway inhibiting substance, and adding a BMP signal transduction pathway activating substance and a Sonic hedgehog signal transduction pathway activating substance. Furthermore, it has found that the efficiency of producing the cell mass can be improved by culturing, before the aforementioned suspension culturing in the presence of a Wnt signal transduction pathway inhibiting substance, pluripotent stem cells in the absence of feeder cells in a medium containing 1) a TGFβ family signal transduction pathway inhibiting substance and/or a Sonic hedgehog signal transduction pathway activating substance, and 2) a factor for maintaining an undifferentiated state. In addition, it has succeeded in inducing differentiation of pituitary tissue by BMP4 at a lower concentration than usual by optimizing the addition conditions of the BMP signal transduction pathway activating substance, and identifying the optimal timing of addition which is within 72 hr from the start of suspension culturing. That is, the present invention relates to the following.

[1] A method for producing a cell mass comprising pituitary tissue, comprising the following steps (1) and (2):
(1) a first step of suspension-culturing pluripotent stem cells to form a cell aggregate in the presence of a Wnt signal transduction pathway inhibiting substance,
(2) a second step of suspension-culturing the aggregate obtained in the first step in the presence of a BMP signal transduction pathway activating substance and a Sonic hedgehog signal transduction pathway activating substance, thereby obtaining a cell mass comprising pituitary tissue.

[2] A method for producing a cell mass comprising pituitary tissue, comprising the following steps (a), (1) and (2):
(a) step a of culturing pluripotent stem cells in the absence of feeder cells and in a medium containing 1) a TGFβ family signal transduction pathway inhibiting substance and/or a Sonic hedgehog signal transduction pathway activating substance, and 2) a factor for maintaining an undifferentiated state,
(1) a first step of suspension-culturing the pluripotent stem cells, which were cultured in step a, to form a cell aggregate in the presence of a Wnt signal transduction pathway inhibiting substance,
(2) a second step of suspension-culturing the aggregate obtained in the first step in the presence of a BMP signal transduction pathway activating substance and a Sonic hedgehog signal transduction pathway activating substance, thereby obtaining a cell mass comprising pituitary tissue.

[3] A method for producing a cell mass comprising pituitary tissue, comprising the following steps (1), (2-1) and (2-2):
(1) a first step of suspension-culturing pluripotent stem cells to form a cell aggregate in the presence of a Wnt signal transduction pathway inhibiting substance,
(2-1) a second step (1) of suspension-culturing the aggregate obtained in the first step in the presence of a BMP signal transduction pathway activating substance and a Sonic hedgehog signal transduction pathway activating substance,
(2-2) a second step (2) of suspension-culturing the aggregate suspension-cultured in the second step (1) in the presence of a BMP signal transduction pathway inhibiting substance, thereby obtaining a cell mass comprising pituitary tissue.

[4] A method for producing a cell mass comprising pituitary tissue, comprising the following steps (a), (1), (2-1) and (2-2):

(a) step a of culturing pluripotent stem cells in the absence of feeder cells and in a medium containing 1) a TGFβ family signal transduction pathway inhibiting substance and/or a Sonic hedgehog signal transduction pathway activating substance, and 2) a factor for maintaining an undifferentiated state, (1) a first step of suspension-culturing the pluripotent stem cells, which were cultured in step a, to form a cell aggregate in the presence of a Wnt signal transduction pathway inhibiting substance, (2-1) a second step (1) of suspension-culturing the aggregate obtained in the first step in the presence of a BMP signal transduction pathway activating substance and a Sonic hedgehog signal transduction pathway activating substance, (2-2) a second step (2) of suspension-culturing the aggregate obtained in the second step (1) in the presence of a BMP signal transduction pathway inhibiting substance, thereby obtaining a cell mass comprising pituitary tissue.

[5] The production method of any of [1] to [4], wherein the BMP signal transduction pathway activating substance in the step (2) or step (2-1) is added within 0.5 hr to 72 hr from the start of the suspension culturing of the pluripotent stem cells in the step (1).

[6] The production method of any of [1] to [4], wherein the BMP signal transduction pathway activating substance in the step (2) or step (2-1) is added during a period when not less than 10% of the cells of the surface layer of the aggregate formed in the step (1) form a tight junction.

[7] The production method of any of [1] to [6], wherein the BMP signal transduction pathway activating substance is at least one kind of protein selected from the group consisting of BMP2, BMP4, BMP7, and GDF7.

[8] The production method of any of [1] to [7], wherein the BMP signal transduction pathway activating substance is BMP4.

[9] The production method of [8], wherein the suspension culturing in the step (2) or step (2-1) is performed in a medium with a concentration of the BMP4 of 10 pM-5 nM.

[10] The production method of any of [3] to [9], wherein the BMP signal transduction pathway inhibiting substance is added in the step (2-2) after 12 hr and within 20 days from the addition of the BMP signal transduction pathway activating substance in the step (2-1).

[11] The production method of any of [1] to [10], wherein the Wnt signal transduction pathway inhibiting substance has an inhibitory activity against non-canonical Wnt pathway.

[12] The production method of any of [1] to [11], wherein the Wnt signal transduction pathway inhibiting substance is a PORCN inhibitor.

[13] The production method of [12], wherein the PORCN inhibitor is at least one kind of compound selected from the group consisting of IWP-2, IWP-3, IWP-4, IWP-L6, IWP-12, LGK-974, Wnt-059, ETC-159, and GNF-6231.

[14] The production method of any of [1] to [11], wherein the Wnt signal transduction pathway inhibiting substance is KY-02111 or KY-03-I.

[15] The production method of any of [1] to [10], wherein the Wnt signal transduction pathway inhibiting substance is a TANK inhibitor.

[16] The production method of [15], wherein the TANK inhibitor is at least one kind of compound selected from the group consisting of IWR1-endo, XAV939, and MN-64.

[17] The production method of any of the above-mentioned [1] to [16], wherein the suspension culturing in the steps (1), (2), (2-1) and (2-2) is performed in the further presence of a TGFβ signal transduction pathway inhibiting substance.

[18] The production method of [17], wherein the TGFβ signal transduction pathway inhibiting substance is an Alk5/TGFβR1 inhibitor.

[19] The production method of [18], wherein the Alk5/TGFβR1 inhibitor is at least one kind of compound selected from the group consisting of SB431542, SB505124, SB525334, LY2157299, GW788388, LY364947, SD-208, EW-7197, A 83-01, and RepSox.

[20] The production method of [17], wherein the TGFβ signal transduction pathway inhibiting substance is a SMAD3 inhibitor.

[21] The production method of [20], wherein the SMAD3 inhibitor is SIS3.

[22] The production method of any of [1] to [21], wherein the Sonic hedgehog signal transduction pathway activating substance is at least one kind of compound selected from the group consisting of SAG, Purmorphamine, and GSA-10.

[23] The production method of [22], wherein the concentration of the Sonic hedgehog signal transduction pathway activating substance contained in the medium in the step (a) is a concentration showing a Sonic hedgehog signal transduction promoting activity corresponding to that of 10 nM to 700 nM SAG.

[24] The production method of [22] or [23], wherein the concentration of the Sonic hedgehog signal transduction pathway activating substance contained in the medium in the step (2) or step (2-1) is a concentration showing a Sonic hedgehog signal transduction promoting activity corresponding to that of 100 nM to 3 μM SAG.

[25] The production method of any of [3] to [24], wherein the BMP signal transduction pathway inhibiting substance comprises a type I BMP receptor inhibitor.

[26] The production method of [25], wherein the type I BMP receptor inhibitor is at least one selected from the group consisting of K02288, Dorsomorphin, LDN-193189, LDN-212854, LDN-214117, ML347, DMH1, and DMH2.

[27] The production method of [25] or [26], wherein the type I BMP receptor inhibitor comprises K02288, and the step (2-2) is started in a medium comprising the K02288 at a concentration of 10 nM-50 μM.

[28] The production method of any of [1] to [27], wherein at least one step selected from the group consisting of the steps (1), (2), (2-1) and (2-2) is performed in the presence of an FGF signal transduction pathway activating substance.

[29] The production method of any of [3] to [27], wherein the step (2-2) is performed in the presence of an FGF signal transduction pathway activating substance.

[30] The production method of [28] or [29], wherein the FGF signal transduction pathway activating substance comprises at least one selected from the group consisting of FGF2 and FGF8, and variants of these.

[31] The production method of any of [1] to [30], wherein at least one step selected from the group consisting of the steps (1), (2), (2-1) and (2-2) is performed in the presence of a Wnt signal transduction pathway activating substance.

[32] The production method of [31], wherein the Wnt signal transduction pathway activating substance acts on a signal transduction factor at the downstream of the point of action of the Wnt signaling pathway inhibiting substance added in the step (1).

[33] The production method of [31] or [32], wherein the Wnt signal transduction pathway activating substance is a substance that activates a canonical Wnt pathway.

[34] The production method of any of [31] to [33], wherein the substance that activates the canonical Wnt pathway has an action of inhibiting decomposition and promoting stabilization of β-catenin.

[35] The production method of any of [31] to [34], wherein the Wnt signal transduction pathway activating substance is a GSK3 inhibitor.

[36] The production method of any of [31] to [35], wherein the Wnt signal transduction pathway inhibiting substance is a PORCN inhibitor and the Wnt signal transduction pathway activating substance is a GSK3 inhibitor.

[37] The production method of any of [31] to [36], wherein the GSK3 inhibitor comprises at least one selected from the group consisting of CHIR99021, CHIR98014, TWS119, S2216763, SB415286, BIO, AZD2858, AZD1080, AR-A014418, TDZD-8, LY2090314, IM-12, Indirubin, Bikinin, A 1070722, 3F8, Kenpaullone, 10Z-Hymenialdisine, Indirubin-3'-oxime, NSC 693868, TC-G 24, TCS 2002, TCS 21311, CP21R7 and derivatives of these compounds.

[38] The production method of any of [31] to [37], wherein the GSK3 inhibitor comprises CHIR99021, and a concentration of the CHIR99021 to be added to at least one step selected from the group consisting of the steps (1), (2), (2-1) and (2-2) is 10 nM-50 μM.

[39] The production method of any of [31] to [34], wherein the Wnt signal transduction pathway activating substance comprises at least one selected from the group consisting of BML-284 and SKL2001.

[40] The production method of any of [1] to [39], wherein the suspension culturing to be performed in the step (1) is suspension culturing using a serum-free medium.

[41] The production method of [40], wherein the serum-free medium comprises a serum replacement.

[42] The production method of any of [1] to [41], wherein the suspension culturing to be performed in the step (1) is performed using dispersion-treated pluripotent stem cells.

[43] The production method of any of [1] to [42], wherein the suspension culturing to be performed in the step (1) is performed in the presence of a ROCK inhibitor.

[44] The production method of [43], wherein a concentration of the ROCK inhibitor to be added in the step (1) is a concentration having a cell protection ability corresponding to 1 nM to 1 mM Y-27632.

[45] The production method of any of [1] to [44], wherein the suspension culturing in at least one step selected from the group consisting of the steps (1), (2), (2-1) and (2-2) is further performed in the presence of a Notch signal inhibitor.

[46] The production method of [45], wherein the Notch signal inhibitor is a γ secretase inhibitor.

[47] The production method of [46], wherein the γ secretase inhibitor is DAPT.

[48] The production method of any of [1] to [47], wherein the suspension culturing in at least one step selected from the group consisting of the steps (1), (2), (2-1) and (2-2) is further performed in the presence of dexamethasone.

[49] The production method of any of [1] to [48], wherein the pluripotent stem cell is a primate pluripotent stem cell.

[50] The production method of [49], wherein the primate pluripotent stem cell is a human pluripotent stem cell.

[51] A cell mass comprising pituitary tissue obtained by the production method of any of the above-mentioned [1] to [50].

[52] A method for producing a pituitary tissue, comprising the following steps (1)-(3):
(1) a first step of suspension-culturing pluripotent stem cells to form a cell aggregate in the presence of a Wnt signal transduction pathway inhibiting substance,
(2) a second step of suspension-culturing the aggregate obtained in the first step in the presence of a BMP signal transduction pathway activating substance and a Sonic hedgehog signal transduction pathway activating substance, thereby obtaining a cell mass comprising pituitary tissue,
(3) a third step of collecting pituitary tissue from the cell mass obtained in the second step.

[53] A method for producing a pituitary tissue, comprising the following steps (1), (2-1), (2-2) and (3):
(1) a first step of suspension-culturing pluripotent stem cells to form a cell aggregate in the presence of a Wnt signal transduction pathway inhibiting substance,
(2-1) a second step (1) of suspension-culturing the aggregate obtained in the first step in the presence of a BMP signal transduction pathway activating substance and a Sonic hedgehog signal transduction pathway activating substance,
(2-2) a second step (2) of suspension-culturing the aggregate suspension-cultured in the second step (1) in the presence of a BMP signal transduction pathway inhibiting substance, thereby obtaining a cell mass comprising pituitary tissue,
(3) a third step of collecting pituitary tissue from the cell mass obtained in the second step (2).

[54] A pituitary tissue obtained by the production method of [52] or [53].

[55] A cell mass comprising 1) neural cells or neural tissue, 2) pituitary tissue and 3) mesenchymal cells.

[56] The cell mass of [55], wherein the 3) mesenchymal cells express at least one kind of mesenchymal cell marker selected from the group consisting of Nestin, Vimentin, Cadherin-11, Laminin, CD44, CD90, and CD105.

[57] A cell mass comprising 1) neural cells or neural tissue, 2) pituitary tissue and 4) neural crest cells or neural crest-derived cells.

[58] The cell mass of [57], wherein the 4) neural crest cells express at least one kind of neural crest cell marker selected from the group consisting of Nestin, Sox10, Slug, Snail, Pax3, Zic1, FoxD3, p75 NTR, HNK-1, CHD7, Numb, and Ascl1.

[59] The cell mass of any of [55] to [58], wherein a surface thereof is covered with nonneural epithelial tissue, and 2) pituitary tissue is formed in at least a part of the nonneural epithelial tissue.

[60] The cell mass of [59], wherein the nonneural epithelial tissue expresses at least one kind of nonneural epithelial tissue marker selected from the group consisting of cytokeratin, E-Cadherin, and EpCAM.

[61] The cell mass of [55] or [56], wherein the nonneural epithelial tissue covers at least one of 1) neural cells or neural tissue and 3) mesenchymal cells.

[62] The cell mass of [57] or [58], wherein the nonneural epithelial tissue covers at least one of 1) neural cells or neural tissue and 4) neural crest cells or neural crest-derived cells.

[63] The cell mass of [61], wherein the 3) mesenchymal cells are present between nonneural epithelial tissue coating a surface of the cell mass and 1) neural cells or neural tissue present inside the cell mass.

[64] The cell mass of [62], wherein the 4) neural crest cells or neural crest-derived cells are present between nonneural epithelial tissue coating a surface of the cell mass and 1) neural cells or neural tissue present inside the cell mass.

[65] The cell mass of any of [59] to [64], wherein the nonneural epithelial tissue is mouth cavity epithelium or precursor tissue thereof.

[66] The cell mass of any of [55] to [65], wherein the 2) pituitary tissue includes a pituitary hormone producing cell.

[67] The cell mass of [66], wherein the pituitary hormone producing cell is at least one kind selected from the group consisting of growth hormone (GH)-producing cells, prolactin (PRL)-producing cells and adrenocorticotropic hormone (ACTH)-producing cells.

[68] The cell mass of any of [55] to [67], wherein the pituitary tissue includes a pituitary tissue stem cell.

[69] The cell mass of [68], wherein the pituitary tissue stem cell expresses at least one kind of pituitary tissue stem cell marker selected from the group consisting of Sox2, Sox9, E-Cadherin, Nestin, S100β, GFRα2, Prop1, CD133, β-Catenin, Klf4, Oct4, Pax6, Coxsackievirus and adenovirus common receptor (CXADR), PRRX1/2, Ephrin-B2 and ACE.

[70] The cell mass of [68] or [69], wherein the pituitary tissue stem cell forms pituitary niche.

[71] The cell mass of any of [55] to [70], wherein the 1) neural cells or neural tissue is a cell or tissue of ventral diencephalon or hypothalamus.

[72] The cell mass of [71], wherein the 1) neural cells or neural tissue is an N-Cadherin positive neuroepithelial tissue.

[73] The cell mass of [72], wherein a ventricle-like vacuole is formed inside the neuroepithelial tissue, and a surface of the neuroepithelial tissue in contact with the vacuole is an aPKC-zeta-positive apical surface.

[74] A method for evaluating toxicity or efficacy of a test substance, comprising
a step of contacting a cell mass produced by the method of any of [1] to [50] or a pituitary tissue produced by the method of 52 with a test substance and a step of detecting an influence of the test substance on the cell mass or pituitary tissue.

[75] A reagent for evaluating toxicity or efficacy of a test substance, comprising a cell mass produced by the method of any of [1] to [50] or a pituitary tissue produced by the method of [52].

[76] A method for treating a disease due to a disorder of pituitary gland in a non-human animal, comprising a step of transplanting an effective amount of pituitary tissue produced by the method of [52] to a target in need of the transplantation.

[77] A therapeutic drug for a disease due to a disorder of pituitary gland, comprising a cell mass produced by the method of any of [1] to [50] or a pituitary tissue produced by the method of [52].

Effect of the Invention

According to the present invention, a cell mass containing pituitary tissue can be produced efficiently from pluripotent stem cells.

BRIEF DESCRIPTION OF THE DRAWINGS

FIG. 1-2. L-X of FIG. 1-2 are diagrams showing bright-field observation images by an inverted microscope of the cell mass 28 days from the start of suspension culturing in Example 1. L-N respectively show Sox3, EpCAM and nuclear-stained image thereof. O-Q respectively show Tbx3, βIII tubulin (βIII Tub) and nuclear-stained image thereof. S-U respectively show Emx2, Nestin and nuclear-stained image thereof. V-X respectively show Pitx1, pan-cytokeratin (Pan-CK) and nuclear-stained image thereof. The lower panel Y is a diagram schematically showing the structure of a cell mass containing pituitary tissue on day 28 of culturing.

FIG. 2. The upper panel of FIG. 2 is a diagram schematically showing a procedure for producing a cell mass containing pituitary tissue from human ES cells in Example 2. The lower panels A and B are diagrams showing bright-field observation images by an inverted microscope of the cell mass 70 days from the start of suspension culturing in Example 2. The lower panels C-J show the results of examination by fluorescent immunostaining of the expression state of each cell marker in the cell mass 70 days or 84 days from the start of suspension culturing. C and D respectively show ACTH and nuclear-stained image thereof. E-G respectively show prolactin (PRL), pan-cytokeratin (PanCK) and nuclear-stained image thereof. H-J respectively show growth hormone (GH), pan-cytokeratin (PanCK) and nuclear-stained image thereof.

FIG. 12Q-AB are diagrams sequentially showing bright-field observation images by an inverted microscope of the cell mass 13 days from the start of suspension culturing in Example 10 and continued from FIG. 11. Q-S and W-Y respectively show stained images of Dlx5, N-Cadherin and nuclear-stained image thereof. T-V and Z-AB respectively show stained images of Six1, E-Cadherin and nuclear-stained image thereof.

FIG. 16M-Y are diagrams sequentially showing bright-field observation images by an inverted microscope of the cell mass 28 days from the start of suspension culturing in Example 15 and continued from FIG. 12. M-P respectively show stained images of Nestin, Pitx2, Sox2 and nuclear-stained image thereof. Q-S respectively show stained images of Six1, Vimentin and nuclear-stained image thereof. T-V respectively show stained images of Rx, N-Cadherin and nuclear-stained image thereof. W-Y respectively show stained images of Tbx3, pan-cytokeratin and nuclear-stained image thereof.

DESCRIPTION OF EMBODIMENTS

1. Definition

Figure 1:
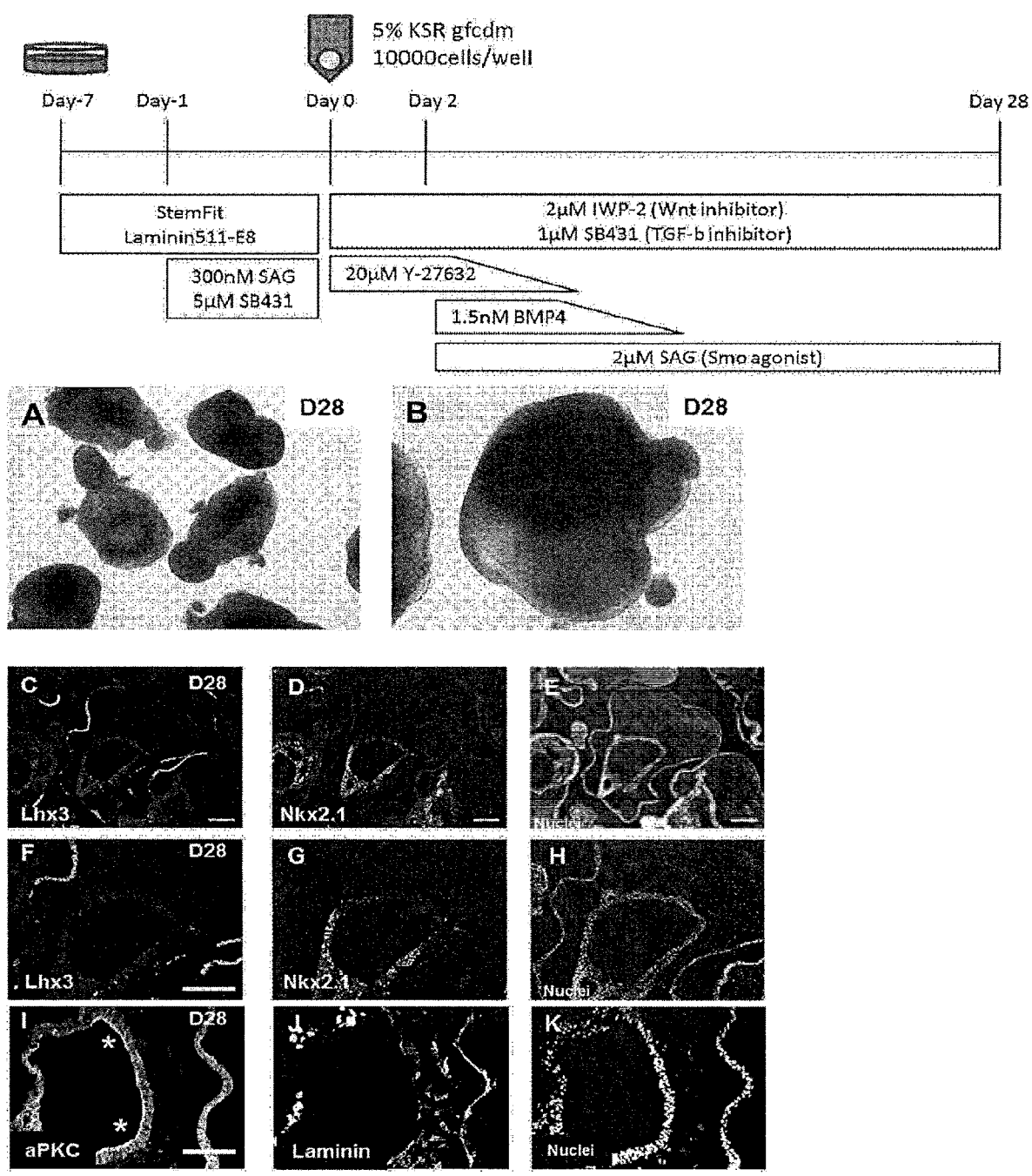
FIG. 1-1. The upper panel of FIG. 1-1 is a diagram schematically showing a procedure for producing a cell mass containing pituitary tissue from human ES cells in Example 1. The lower panels A and B are diagrams showing bright-field observation images by an inverted microscope of the cell mass 28 days from the start of suspension culturing in Example 1. The lower panels C-K show the results of examination by fluorescent immunostaining of the expression state of each cell marker in the cell mass 28 days from the start of suspension culturing in Example 1. C-E respectively show Lhx3, Nkx2.1 and nuclear-stained image thereof. F-H respectively show Lhx3, Nkx2.1 and nuclear-stained image thereof. I-K respectively show aPKC, Laminin and nuclear-stained image thereof.
Figure 1:
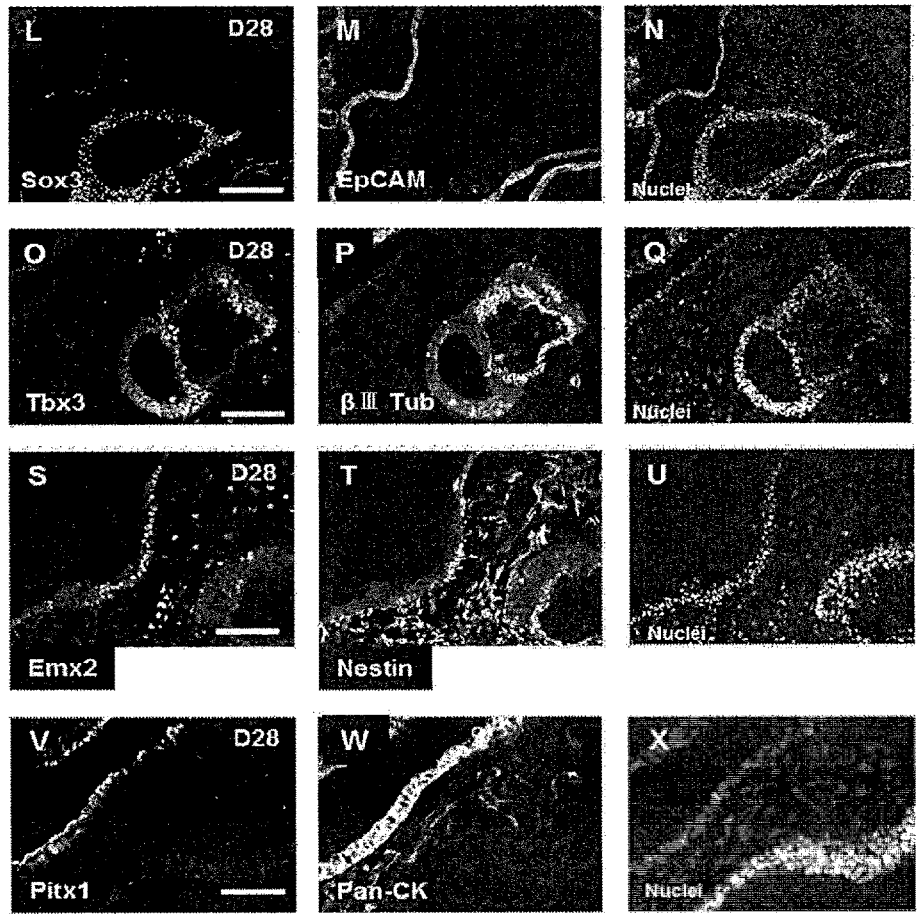

In the present invention, "stem cell" means an undifferentiated cell having differentiation potency and proliferative capacity (particularly self-renewal competence) maintaining differentiation potency. The stem cell includes subpopulations such as pluripotent stem cell, multipotent stem cell, unipotent stem cell and the like according to the differentiation potency. Pluripotent stem cell refers to a stem cell capable of being cultured in vitro and having a potency to differentiate into any cell constituting living organisms (tissue derived from three germ layers (ectoderm, mesoderm, endoderm) (pluripotency). The multipotent stem cell means a stem cell having a potency to differentiate into plural types of tissues or cells, though not all kinds. The unipotent stem cell means a stem cell having a potency to differentiate into a particular tissue or cell.

Pluripotent stem cell can be induced from fertilized egg, clone embryo, germ stem cell, stem cell in a tissue, somatic cell or the like. Examples of the pluripotent stem cell include embryonic stem cell (ES cell), EG cell (embryonic germ cell), and induced pluripotent stem cell (iPS cell). Muse cell (Multi-lineage differentiating stress enduring cell) obtained from mesenchymal stem cell (MSC), and GS cell produced from reproductive cell (e.g., testis) are also encompassed in the pluripotent stem cell. Embryonic stem cell was first established in 1981, and has also been applied to the generation of knockout mouse since 1989. In 1998, human embryonic stem cell was established, which is also being utilized for regenerative medicine. ES cell can be produced by culturing an inner cell mass on a feeder cell or in a medium containing LIF. The production methods of ES cell are described in, for example, WO 96/22362, WO 02/101057, U.S. Pat. Nos. 5,843,780, 6,200,806, and 6,280,718. Embryonic stem cells are available from given organizations, or a commercially available product can be purchased. For example, human embryonic stem cells, KhES-1, KhES-2 and KhES-3, are available from Kyoto University's Institute for Frontier Medical Sciences. EB5 cell, which is a mouse embryonic stem cell, is available from Incorporated Administrative Agency RIKEN, and D3 cell line, which is a mouse embryonic stem cell, is available from ATCC. Nuclear transfer ES cell (ntES cell), which is one of the ES cells, can be established from a clone embryo produced by transplanting the cell nucleus of a somatic cell into an enucleated egg.

EG cell can be produced by culturing a primordial germ cell in a medium containing mSCF, LIF and bFGF (Cell, 70: 841-847, 1992).

The "induced pluripotent stem cell" in the present invention is a cell induced to have pluripotency by reprogramming a somatic cell by a known method and the like. Specifically, a cell induced to have pluripotency by reprogramming differentiated somatic cells such as fibroblast, and peripheral blood mononuclear cell by the expression of a combination of a plurality of genes selected from the group consisting of reprogramming genes including Oct3/4, Sox2, Klf4, Myc (c-Myc, N-Myc, L-Myc), Glis1, Nanog, Sal14, lin28, and Esrrb can be mentioned. Induced pluripotent stem cell was established by Yamanaka et al. in mouse cell in 2006 (Cell, 2006, 126(4), pp. 663-676). In 2007, Induced pluripotent stem cell was also established from human fibroblast, and has pluripotency and self-renewal competence similar to those of embryonic stem cells (Cell, 2007, 131(5), pp. 861-872; Science, 2007, 318(5858), pp. 1917-1920; Nat. Biotechnol., 2008, 26(1), pp. 101-106). Besides the production method based on direct reprogramming by gene expression, induced pluripotent stem cell can also be obtained from somatic cell by the addition of a compound and the like (Science, 2013, 341, pp. 651-654).

While the somatic cell used for producing induced pluripotent stem cell is not particularly limited, tissue-derived fibroblast, blood-lineage cells (e.g., peripheral blood mononuclear cell, T cell), hepatocyte, pancreatic cell, intestinal epithelial cell, and smooth muscle cell can be mentioned.

When induced pluripotent stem cell is produced by reprogramming by the expression of several kinds of genes (e.g., 4 factors of Oct3/4, Sox2, Klf4, and Myc), the means for gene expression is not particularly limited. Examples of the aforementioned means include an infection method using a virus vector (e.g., retrovirus vector, lentivirus vector, Sendaivirus vector, adenovirus vector, adeno-associated virus vector), a gene transfer method using a plasmid vector (e.g., plasmid vector, episomal vector) (e.g., calcium phosphate method, lipofection method, retronectin method, electroporation method), a gene transfer method using an RNA vector (e.g., calcium phosphate method, lipofection method, electroporation method), and a method with direct injection of protein.

The pluripotent stem cell to be used in the present invention is preferably ES cell or induced pluripotent stem cell.

As the multipotent stem cell, tissue stem cells (also called stem cell in a tissue, tissue-specific stem cell or somatic stem cell) such as hematopoietic stem cell, neural stem cell, retinal stem cell, pituitary stem cell, and mesenchymal stem cell can be mentioned.

Genetically-modified pluripotent stem cells can be produced by using, for example, a homologous recombination technique. Examples of the gene on the chromosome to be modified include a cell marker gene, a histocompatibility antigen gene, a gene related to a disease due to a disorder of neural cell and so on. A target gene on the chromosome can be modified using the methods described in Manipulating the Mouse Embryo, A Laboratory Manual, Second Edition, Cold Spring Harbor Laboratory Press (1994); Gene Targeting, A Practical Approach, IRL Press at Oxford University Press (1993); Biomanual Series 8, Gene Targeting, Making of Mutant Mouse using ES cell, YODOSHA CO., LTD. (1995); and so on.

To be specific, for example, the genome gene of the target gene to be modified (e.g., cell marker gene, histocompatibility antigen gene, disease-related gene and so on) is isolated, and a targeting vector used for homologous recombination of the target gene is produced using the isolated genome gene. The produced targeting vector is introduced into stem cells and the cells that showed homologous recombination between the target gene and the targeting vector are selected, whereby stem cells having the modified gene on the chromosome can be produced.

Examples of the method for isolating genome gene of the target gene include known methods described in Molecular Cloning, A Laboratory Manual, Second Edition, Cold Spring Harbor Laboratory Press (1989), Current Protocols in Molecular Biology, John Wiley & Sons (1987-1997) and so on. The genome gene of the target gene can also be isolated using genomic DNA library screening system (manufactured by Genome Systems), Universal GenomeWalker Kits (manufactured by CLONTECH) and so on.

Production of targeting vector used for homologous recombination of the target gene, and efficient selection of a homologous recombinant can be performed according to the methods described in Gene Targeting, A Practical Approach, IRL Press at Oxford University Press (1993); Biomanual Series 8, Gene Targeting, Making of Mutant Mouse using ES cell, YODOSHA CO., LTD. (1995); and so on. As the targeting vector, any of replacement type or insertion type can be used. As the selection method, methods such as positive selection, promoter selection, negative selection, polyA selection and so on can be used.

Examples of a method for selecting the desired homologous recombinant from the selected cell lines include Southern hybridization method, PCR method and so on for the genomic DNA.

The "mammal" in the present invention encompasses rodents, ungulata, carnivora, primates etc. The rodents encompass mouse, rat, hamster, guinea pig etc. Ungulata encompass swine, bovine, goat, horse, sheep etc. Carnivora encompasses dog, cat etc. The "primates" in the present invention refers to mammals belonging to the primate, and the primates include prosimian such as lemur, loris, and tupai, and anthropoidea such as monkey, ape, and human.

The pluripotent stem cells to be used in the present invention are mammalian pluripotent stem cells, preferably pluripotent stem cells of rodents (e.g., mouse, rat) or primates (e.g., human, monkey), most preferably a human pluripotent stem cell.

The "signal transduction" in the present invention refers to the mechanism of the cells for transmission of information, amplification and processing of, and response to biochemical stimulation, such as processes and mechanisms in which receptor proteins present in the cell membrane and the like bind to chemical substances and the like to cause a structural change, which in turn is transmitted sequentially in the cell as a stimulation to finally cause reactions such as gene expression, channel opening and the like. In the present invention, the "downstream of signal transduction" refers to a relative relationship in which biochemical changes such as phosphorylation are applied in a later process in time and causality with respect to a certain factor among the factors involved in a series of signal transduction. For example, in a series of signal transduction mechanisms, when phosphorylation of factor B by factor A causes subsequent signal transduction, factor B is a signal transduction factor at the downstream of factor A.

The "cell adhesion" in the present invention refers to cell-cell adhesion and cell-extracellular matrix adhesion. Adhesion of cells to culture vessels and the like that occurs under an artificial culture environment in vitro is also included in the cell adhesion. As the kind of the cell adhesion, anchoring junction, communicating junction, occluding junction can be mentioned.

The "Tight junction" in the present invention refers to, among cell-cell adhesions, occluding junctions found in vertebrates and chordates. A tight junction is formed between epithelial cells. Whether a tight junction is present in tissues of biological origin or cell masses produced by the production method of the present invention and the like can be detected by, for example, methods such as immunohistochemistry and the like using an antibody (anti-claudin antibody, anti-ZO-1 antibody etc.) to a constituent component of the tight junction.

The "suspension culturing" or "suspension culturing method" in the present invention refers to culturing while maintaining a state in which cells, cell aggregates or cell masses are suspended in a culture medium and a method of performing the culturing. That is, the suspension culturing is performed under conditions in which cells, cell aggregates or cell masses are not adhered to a culture vessel and the like, and culturing performed under conditions permitting adhesion to a culture vessel and the like (adhesion culturing or adhesion culturing method) is not included in the category of suspension culturing. In this case, adhesion of cell means that a strong cell-substratum junction, which is one type of cell adhesion, is formed between a cell, cell aggregate or cell mass and a culture vessel. More particularly, suspension culturing refers to culturing under conditions in which a strong cell-substratum junction is not formed between a cell, cell aggregate or cell mass and a culture vessel and the like, and adhesion culturing refers to culturing under conditions in which a strong cell-substratum junction is formed between a cell, cell aggregate or cell mass and a culture vessel and the like.

In a cell aggregate or cell mass in suspension culturing, a plane attachment is formed between a cell and a cell. In a cell aggregate or cell mass in suspension culturing, a cell-substratum junction is hardly formed with a culture vessel and the like and, even if it is formed, its contribution is small. In some embodiments, an endogenous cell-substratum junction is present inside the aggregate or cell mass, but a cell-substratum junction is hardly formed with a culture vessel and the like and, even if it is formed, its contribution is small.

The plane attachment between a cell and a cell means that a cell attaches to another cell via planes. More particularly, the plane attachment between a cell and a cell means that, for example, not less than 1%, preferably not less than 3%, more preferably not less than 5%, of the surface area of a cell adheres to the surface of another cell. A surface of a cell can be detected by methods such as staining with a reagent (e.g., DiI) that stains membranes, immunohistochemistry of cell adhesion factors (e.g., E-cadherin and N-cadherin), and the like.

The culture vessel to be used when performing suspension culturing is not particularly limited as long as it enables "culturing in suspension" and those of ordinary skill in the art can appropriately determine same. Examples of such culture vessel include flask, tissue culture flask, dish, petri dish, tissue culture dish, multidish, microplate, microwell plate, micropore, multiplate, multiwell plate, chamber slide, schale, tube, tray, culture bag, spinner flask, and roller bottle. To enable suspension culturing, these culture vessels are preferably non-cell-adhesive. Useful non-cell-adhesive culture vessels include culture vessels whose surfaces have not undergone an artificial treatment for improving adhesiveness to cells (e.g., coating treatment with extracellular matrix such as basement membrane preparation, laminin, entactin, collagen, and gelatin, or with polymer such as polylysine, and polyornithine or surface treatment such as positive electric charge treatment), and the like. As a non-cell-adhesive culture vessel, culture vessels whose surfaces have been artificially treated to decrease adhesiveness to the cells (e.g., superhydrophilic treatment with MPC polymer and the like, and protein low adsorption treatment) and the like can be used. Roller culturing using spinner flask, and roller bottle may be performed. The culture surface of the culture vessel may be a flat bottom or may have concaves and convexes.

The medium to be used for culturing cells in the present invention can be prepared from a medium generally used for culturing animal cells as a basal medium. Examples of the basal medium include media that can be used for culturing animal cells such as BME medium, BGJb medium, CMRL1066 medium, Glasgow MEM medium, Improved MEM Zinc Option medium, IMDM medium, Medium199 medium, Eagle MEM medium, ° MEM medium, DMEM medium, F-12 medium, DMEM/F-12 medium, IMDM/F12 medium, Ham's medium, RPMI1640 medium, Fischer's medium, and mixed medium thereof.

For culturing pluripotent stem cells, a medium for culturing pluripotent stem cells using the above-mentioned basal medium as the base, preferably a known medium for embryonic stem cells and/or induced pluripotent stem cells, a medium for culturing pluripotent stem cells under feeder free can be used. For example, feeder-free medium such as Essential 8 medium, TeSR medium, mTeSR medium, mTeSR-E8 medium, and StemFit medium can be mentioned.

The "serum-free medium" in the present invention means a medium free of unadjusted or unpurified serum. In the present invention, a medium containing purified blood-derived components and animal tissue-derived components (e.g., growth factor) is also included in a serum-free medium unless unadjusted or unpurified serum is contained therein.

The serum-free medium may contain a serum replacement. Examples of the serum replacement include one appropriately containing albumin, transferrin, fatty acid, collagen precursor, trace element, 2-mercaptoethanol or 3' thiolglycerol, or equivalents of these, and so on. Such serum replacement may be prepared by, for example, the method described in WO98/30679. The serum replacement may be a commercially available product. Examples of such commercially available serum replacement include Knockout™ Serum Replacement (Life Technologies: hereinafter sometimes referred to as KSR), Chemically Defined Lipid Concentrated (manufactured by Life Technologies) and Glutamax™ (manufactured by Life Technologies), B27 (manufactured by Life Technologies), and N2 (manufactured by Life Technologies).

The serum-free medium to be used for suspension culturing may appropriately contain a fatty acid or lipid, amino acid (e.g., non-essential amino acids), vitamin, growth factor, cytokine, antioxidant, 2-mercaptoethanol, pyruvic acid, buffering agent, inorganic salts and so on.

To avoid complicated preparation, a serum-free medium supplemented with an appropriate amount (e.g., about 0.5% to about 30%, preferably about 1% to about 20%) of commercially available KSR (manufactured by Life Technologies) (e.g., medium of 1:1 mixture of F-12 medium and IMDM medium supplemented with 1× Chemically-defined Lipid concentrated, 5% KSR and 450 μM 1-monothioglycerol) may be used as such serum-free medium. In addition, as a product equivalent to KSR, the medium disclosed in JP-A-2001-508302 can be mentioned.

The "serum-containing medium" in the present invention means a medium containing unadjusted or unpurified serum. The medium may contain a fatty acid, lipid, amino acid (e.g., non-essential amino acids), vitamin, growth factor, cytokine, antioxidant, 2-mercaptoethanol, 1-monothioglycerol, pyruvic acid, buffering agent, inorganic salts and so on. For example, when a pluripotent stem cell is induced to differentiate into a retinal tissue and the like by using a basement membrane preparation such as Matrigel and the like, a serum-containing medium can be used (Cell Stem Cell, 10(6), 771-775 (2012)).

The culturing in the present invention is preferably performed under xeno-free conditions. The "xeno-free" means conditions eliminating components derived from species different from that of the cell to be cultured.

The medium to be used in the present invention is preferably a medium containing chemically determined components (Chemically defined medium; CDM) to avoid contamination with chemically undetermined components.

The "basement membrane"-like structure in the present invention means a thin membrane structure composed of extracellular matrix. The basement membrane is formed on the basal side of epithelial cells in a living body. The components of the basement membrane include type IV collagen, laminin, heparan sulfate proteoglycan (perlecan), entactin/nidogen, cytokine, growth factor and the like. Whether a basement membrane is present in a tissue derived from a living body and in a cell mass prepared by the production method of the present invention is determined by, for example, tissue staining such as PAM staining, and a method such as immunohistochemistry using an antibody against a constituent component of the basement membrane (anti-laminin antibody, anti-type IV collagen antibody, etc.).

The "basement membrane preparation" in the present invention is one containing a basement membrane constituent component having functions to control epithelial cell-like cell morphology, differentiation, proliferation, motility, functional expression, and the like when desired cells having basement membrane formability are seeded thereon and cultured. For example, when the cells and tissues produced by the present invention are dispersed and further subjected to adhesion culturing, they can be cultured in the presence of a basement membrane preparation. As used herein, the "basement membrane constituent component" refers to an extracellular matrix molecule as a thin membrane present between an epithelial cell layer and an interstitial cell layer and the like in animal tissues. A basement membrane preparation can be produced, for example, by removing cells adhered to the support via a basement membrane and having the ability to form the basement membrane from the support by using a solution having the ability to dissolve the lipids of the cells, an alkaline solution or the like. Examples of the basement membrane preparation include products commercially available as basement membrane products (e.g., Matrigel™ (manufactured by Becton, Dickinson and Company: hereinafter sometimes referred to as Matrigel)) and Geltrex™ (manufactured by Life Technologies), and extracellular matrix molecules known as basement membrane components (e.g., laminin, type-IV collagen, heparan sulfate proteoglycan, and entactin).

In the present invention, a basement membrane preparation such as Matrigel (manufactured by Corning) which is extracted from a tissue or cell of Engelbreth-Holm-Swarm (EHS) mouse sarcoma and the like and solubilized can be used for culturing cells and tissues. Similarly, as a basement membrane component used for cell culturing, human solubilized amniotic membrane (manufactured by Bioresource Application Institute, Co.), human recombinant laminin produced by HEK293 cell (manufactured by BioLamina), human recombinant laminin fragment (manufactured by Nippi, Inc.), and human recombinant vitronectin (manufactured by Thermo Fisher) and the like can also be used. To avoid contamination with components derived from different organism species and to avoid the risk of infections, preferred is a recombinant protein whose components are clear.

In the present invention, the "medium containing a substance X" and "in the presence of a substance X" respectively refer to a medium supplemented with an exogenous substance X or a medium containing an exogenous substance X, and in the presence of an exogenous substance X. The exogenous substance X is distinguished from the endogenous substance X which is the substance X endogenously expressed, secreted or produced by, for example, the cells or tissues present in the medium.

For example, a "medium containing a Sonic hedgehog signal transduction pathway activating substance" is a medium supplemented with an exogenous Sonic hedgehog signal transduction pathway activating substance or a medium containing an exogenous Sonic hedgehog signal transduction pathway activating substance.

In the present invention, a "feeder cell" refers to a cell other than a stem cell that co-exists when culturing the stem cell. Examples of the feeder cells used for culturing pluripotent stem cells while maintaining undifferentiated state include mouse fibroblasts (MEF), human fibroblasts, and SNL cells. As the feeder cells, feeder cells that underwent a growth suppression treatment is preferable. Examples of the growth suppression treatment include treatment with a growth inhibitor (e.g., mitomycin C), and UV irradiation. Feeder cells used for culturing pluripotent stem cells while maintaining undifferentiated state contributes to the maintenance of undifferentiated state of pluripotent stem cell by secretion of humoral factors (preferably factor for maintaining undifferentiated state), or production of scaffolds for cell adhesion (extracellular matrix).

In the present invention, an "aggregate" of cells refers to a clump formed by assembly of cells dispersed in a medium, wherein the cells are adhered to each other. Cell clumps, embryoid bodies, spheres, spheroids, and organoids are also encompassed in the cell aggregates. Preferably, a plane attachment is formed between a cell and a cell in the aggregate of cells. In some embodiments, cells sometimes form a cell-cell junction and/or a cell adhesion, for example, adherence junction, in some or all of the aggregates. The "aggregate" in the present invention specifically includes an aggregate produced in the first step of the below-mentioned "2. Production method of cell mass containing pituitary tissue", which is formed by cells dispersed at the time of the start of the suspension culturing.

In the present invention, "uniformed aggregates" means that the size of each aggregate is constant when a plurality of aggregates are cultured, and that the variance in the length of the maximum diameter is small when the size of the aggregates are evaluated by the length of the maximum diameter. More specifically, it means that not less than 75% of aggregates in the whole aggregate population are within mean±100%, preferably mean±50%, more preferably mean±20%, of the maximum diameter in the population of the cell masses.

In the present invention, to "form uniformed aggregates" means to rapidly aggregate a given number of dispersed cells to form cell aggregates uniform in size, when gathering the cells to form cell aggregates and culturing the aggregates in suspension.

"Dispersing" refers to dividing cells or a tissue into small cell debris (not less than 2 cells and not more than 100 cells, preferably not more than 50 cells) or single cells by a dispersion treatment such as enzymatic treatment, and physical treatment. A given number of dispersed cells is a collection of a certain number of cell debris or single cells.

Examples of the method of dispersing pluripotent stem cells include a mechanical dispersion treatment, a cell dispersion solution treatment, and a cell protecting agent addition treatment. These treatments may be performed in combination. Preferably, a cell dispersion solution treatment is performed and then a mechanical dispersion treatment is performed.

As a method of mechanical dispersion treatment, a pipetting treatment or scraping operation by a scraper can be mentioned.

As a cell dispersion solution to be used for the cell dispersion solution treatment, a solution containing any of enzymes such as trypsin, collagenase, hyaluronidase, elastase, pronase, DNase, and papain, and a chelating agent such as ethylenediaminetetraacetic acid can be mentioned. A commercially available cell dispersion solution such as Accumax (manufactured by Innovative cell technologies) and TrypLE Select (manufactured by Life Technologies) can also be used.

As a cell protecting agent to be used for a cell protector addition treatment, FGF signal transduction pathway activating substance, heparin, ROCK inhibiting substance, serum, or serum replacement can be mentioned. As a preferable cell protecting agent, a ROCK inhibiting substance can be mentioned.

For example, a method for dispersing pluripotent stem cells includes a method involving treating a colony of pluripotent stem cells with a cell dispersion solution (Accumax) in the presence of a ROCK inhibiting substance as a cell protecting agent, and further dispersing them by pipetting.

In the production method of the present invention, it is preferable to form an aggregate of pluripotent stem cells by rapidly gathering the pluripotent stem cells. When an aggregate of pluripotent stem cells is formed in such a manner, an epithelium-like structure can be formed with good reproducibility in the cells induced and differentiated from the formed aggregate. Examples of the experimental operation m to form an aggregate include a method involving keeping cells in a small space by using a plate with small wells (e.g., plate with wells having a base area of about 0.1-2.0 cm$^2$ when calculated in terms of flat bottom), micropore and so on, a method involving aggregating cells by centrifugation for a short time using a small centrifugation tube. As a plate with small wells, for example, 24 well plate (area of about 1.88 cm² when calculated in terms of flat bottom), 48 well plate (area of about 1.0 cm² when calculated in terms of flat bottom), 96 well plate (area of about 0.35 cm² when calculated in terms of flat bottom, inner diameter about 6-8 mm), and 384 well plate can be mentioned. Preferred is 96 well plate. As a shape of the plate with small wells, the shape of the bottom surface when the well is seen from above is, for example, polygon, rectangle, ellipse, true circle, preferably true circle. As a shape of the plate with small wells when the well is seen from the side well, the shape of the bottom surface is preferably a structure having high outer circumference and low inner concave, which is, for example, U-bottom, V-bottom or M-bottom, preferably U-bottom or V-bottom, most preferably V-bottom. As a plate with small wells, a cell culture dish (e.g., 60 mm-150 mm dish, culture flask) with a concave convex, or dent on the bottom surface may also be used. The bottom surface of a plate with small wells is preferably a non-cell-adhesive bottom surface, preferably the aforementioned non-cell-adhesive-coated bottom surface.

Formation of aggregates of pluripotent stem cells, and formation of an epithelium-like structure in each cell forming the aggregate can be determined based on the size and cell number of the aggregate, macroscopic morphology of the aggregate, microscopic morphology by tissue staining analysis and uniformity thereof, expression of differentiation and undifferentiation markers and uniformity thereof, control of expression of differentiation marker and synchronism thereof, reproducibility of differentiation efficiency between aggregates, and so on.

The "tissue" in the present invention refers to a structure of a cell population having a structure in which plural types of cells having different morphologies and properties are sterically arranged in a given pattern.

In the present invention, the "neural tissue" refers to a tissue constituted of neural cells including cerebrum, midbrain, diencephalon, cerebellum, spinal cord, retina, peripheral nerve and the like in the developing stage or adult stage. A neural tissue sometimes forms an epithelial structure (neuroepithelium) having a layer structure, and the amount of neuroepithelium in a neural tissue can be evaluated by bright field observation using an optical microscope.

In the present invention, the "diencephalon" refers to the neural tissue of the central nervous system that is in contact with the third ventricle. The diencephalon includes tissues such as epithalamus, thalamus, hypothalamus, and pituitary gland.

In the present invention, the "hypothalamus" refers to one region of the diencephalon that is in contact with the pituitary gland. The hypothalamus is further segmented into the dorsal hypothalamus and ventral hypothalamus. The hypothalamus can be identified using markers such as Rx, Vax1, and Six3. The dorsal hypothalamus can be identified using markers such as Otp, Brn2 and vasopressin. The ventral hypothalamus can be identified using markers such as Nkx2.1 and SF1.

In the present invention, the "ventricle" refers to a cavity formed by the central nervous tissue. In the living body, it is an acellular structure that is normally filled with a tissue fluid such as cerebrospinal fluid, and the apical surface of the neural tissue faces the ventricle. The ventricle periphery layer surrounding the ventricles is a region where neural stem cells are present and cell proliferation and neuron production occur in the developing stage. Whether the cell mass and tissue produced by the production method of the present invention include ventricle can be detected by, for example, a method such as immunohistochemistry using a central nervous tissue marker (Bf1, Pax6, etc.) and an apical surface marker (PKC-zeta, etc.).

In the present invention, the "neural cell" refers to a cell other than epidermal lineage cell in a tissue derived from ectoderm. That is, it includes cells such as neural precursor cell, neuron (neural cell), glia cell, neural stem cell, neuron precursor cell, glial precursor cell and the like. The neural cell also encompasses cell constituting the below-mentioned retinal tissue (retinal cell), retinal progenitor cell, retinal layer-specific neuron, neural retinal cell, and retinal pigment epithelial cell. The neural cell can be identified by using Nestin, TuJ1, PSA-NCAM, N-cadherin and the like as a marker.

Neuron is a functional cell that forms a neural circuit and contributes to signal transmission, and can be identified by using the expression of immature neuronal markers such as TuJ1, Dcx, and HuC/D and/or mature neural cell markers such as Map2, and NeuN as an index.

As glial cell, astrocyte, oligodendrocyte, and Müller glia can be mentioned. As an astrocyte marker, GFAP can be mentioned; as an oligodendrocyte marker, 04 can be mentioned; and as a Müller glia marker, CRALBP and the like can be mentioned.

The neural stem cell is a cell having differentiation potency (multipotency) into neuron and glial cell, and proliferative capacity (sometimes referred to as self-renewal competence) maintaining multipotency. As the neural stem cell marker, Nestin, Sox2, Musashi, Hes family, CD133 etc. can be mentioned; however, these markers are markers for progenitor/precursor cells in general and are not considered neural stem cell-specific markers. The number of neural stem cells can be evaluated by neurosphere assay, and clonal assay.

The neuronal precursor cell is a cell having proliferative capacity, which produces neuron and does not produce glial cell. As a neuronal precursor cell marker, Tbr2, Tα1 etc. can be mentioned. Alternatively, an immature neuronal marker (TuJ1, Dcx, HuC/D)-positive and growth marker (Ki67, pH3, MCM)-positive cell can also be identified as a neuronal precursor cell.

The glial precursor cell is a cell having proliferative capacity, which produces glial cell and does not produce neuron.

The neural precursor cell is an assembly of precursor cells including neural stem cell, neuronal precursor cell and glial precursor cell, and has proliferative capacity and neuron- and glial cell-productivity. The neural precursor cell can be identified using Nestin, GLAST, Sox2, Sox1, Musashi, Pax6 and the like as markers. Alternatively, a neural cell marker-positive and growth marker (Ki67, pH3, MCM)-positive cell can also be identified as a neural precursor cell.

In the present invention, the "nonneural epithelial tissue" refers to a tissue other than the neuroepithelial tissues among the tissues having an epithelial structure. An epithelial tissue can also be formed from any germ layer of ectoderm, mesoderm, endoderm, or nutrition ectoderm. The epithelial tissue includes epithelium, mesothelium, and endothelium. Examples of the tissue included in the nonneural epithelial tissue include epidermis, corneal epithelium, nasal cavity epithelium, mouth cavity epithelium, trachea epithelium, bronchus epithelium, airway epithelium, kidney epithelium, renal cortex epithelium, placenta epithelium and the like.

Epithelial tissues are generally connected by various intercellular junctions, and form tissues having a monolayer or multilayer structure. Confirmation of the presence or absence of such epithelial tissues and quantification of the amount thereof can be performed by observation with an optical microscope or a method such as immunohistochemistry using antibodies against epithelial cell markers (anti-E-Cadherin antibody, anti-N-Cadherin antibody, anti-EpCAM antibody etc.).

In the present invention, the "epithelial polarity" shows spatially formed bias of the distribution of components and cellular functions in epithelial cells. For example, corneal epithelial cells are localized in the outermost layer of the eyeball, express apical-specific proteins such as membrane-bound mucins (MUC-1, 4, 16) on the apical side to retain tears, and express basal-specific proteins such as α6 integrin and β1 integrin on the basal side to adhere to the basement membrane.

Whether epithelial polarity is present in a tissue derived from a living body and in a cell mass prepared by the production method of the present invention can be detected by, for example, a method such as immunohistochemistry using Phalloidin, an apical marker (anti-MUC-1 antibody, anti-PKC-zeta antibody etc.) and a basal marker (anti-α6 integrin antibody, anti-β1 integrin antibody etc.).

In the present invention, the "placode" refers to primordia of organs formed by thickening of a part of epidermal ectoderm mainly in the developmental process of vertebrate. As the tissue derived from placode, crystallin lens, nose, inner ear, trigeminal nerve, adenopituitary and the like can be mentioned. As a marker of placode or a precursor tissue thereof (preplacodal region), Six1, Six4, Dlx5, Eya2, Emx2, Bf1, and the like can be mentioned.

In the present invention, the "pituitary placode" is a thickened structure that is formed in the region of epidermis ectoderm in the process of embryonic development, and expresses a pituitary progenitor cell marker. As the pituitary progenitor cell marker, Lim3, Pitx1/2, Islet1/2 and the like can be mentioned. The pituitary placode expresses at least one pituitary progenitor cell marker selected from the group consisting of Lim3, Pitx1, and Islet1/2, preferably all pituitary progenitor cell markers. The pituitary placode is invaginated and forms Rathke's pouch, which is a sac-like structure in the middle of development, and forms adenohypophysis when the development further progresses.

In the present invention, the "adenohypophysis" refers to a tissue containing at least one kind of anterior lobe or middle lobe pituitary cells. The pituitary cell includes pituitary hormone-producing cells that produce hormones that regulate physiological functions, and non-hormone-producing cells. Examples of the pituitary hormone-producing cell include cells constituting the anterior lobe such as growth hormone (GH)-producing cells, prolactin (PRL)-producing cells, adrenocorticotropic hormone (ACTH)-producing cells, thyroid-stimulating hormone (TSH)-producing cells, follicle-stimulating hormone (FSH)-producing cells, luteinizing hormone (LH)-producing cells; and cells constituting the middle lobe such as melanocyte-stimulating hormone (MSH)-producing cells. Examples of the non-hormone producing cell include vascular endothelial cells, pericytes, folliculostellate cells, pituitary stem cells and pituitary progenitor cells.

In one embodiment, the adenohypophysis contains at least one kind, preferably two kinds, more preferably three kinds, selected from the group consisting of growth hormone (GH)-producing cells, prolactin (PRL)-producing cells, and adrenocorticotropic hormone (ACTH)-producing cells. In another embodiment, adenohypophysis contains at least one kind, preferably two or more kinds (2, 3, 4, 5 or 6 kinds), of pituitary hormone-producing cells selected from the group consisting of growth hormone (GH)-producing cells, prolactin (PRL)-producing cells, adrenocorticotropic hormone (ACTH)-producing cells, thyroid-stimulating hormone (TSH)-producing cells, follicle-stimulating hormone (FSH)-producing cells, and luteinizing hormone (LH)-producing cells. Whether adenohypophysis or pituitary hormone-producing cell is contained in a tissue derived from the living body and a cell mass generated by the production method of the present invention can be detected by a method such as immunohistochemistry using growth hormone (GH)-producing cell markers (anti-Pit1 antibody, anti-GH antibody etc.), prolactin (PRL)-producing cell marker (anti-Pit1 antibody, anti-PRL antibody etc.), adrenocorticotropic hormone (ACTH)-producing cell marker (anti-T-Pit antibody, anti-NeuroD1 antibody, anti-ACTH antibody etc.), thyroid-stimulating hormone (TSH)-producing cell marker (anti-GATA2 antibody, anti-ACTH antibody etc.), follicle-stimulating hormone (FSH)-producing cells, and luteinizing hormone (LH)-producing cell marker (anti-GATA2 antibody, anti-SF1 antibody, anti-FSH antibody, anti-LH antibody etc.), ELISA for secreted hormones and the like.

In the present invention, the "pituitary stem cell" refers to an undifferentiated multipotent stem cell or progenitor cell that is present in the pituitary gland and contributes to regeneration of pituitary tissue and supply of pituitary hormone-producing cells. Whether a pituitary stem cell is contained in the cell mass or tissue produced by the production method of the present invention can be detected by a method such as immunohistochemistry using, for example, antibody to a pituitary stem cell markers such as Sox2, Sox9, E-Cadherin, Nestin, s100β, GFRα2, Prop1, CD133, β-Catenin, Klf4, Oct4, Pax6, Coxsackievirus and adenovirus common receptor (CXADR), PRRX1/2, Ephrin-B2, ACE, YAP1, TAZ and a cell proliferation marker such as Ki67, phosphorylated histone H3, MCM; proliferating cell labeling assay using nucleic acid analogue such as BrdU, EdU, IdU; ptake assay of fluorescence-labeled dipeptide (β-alanyl-lysyl-N-7-amino-4-methylcoumarin-3-acetic acid); was used proliferated cell labeling assay, u, pituitary sphere (pitusphere) formation assay.

In the present invention, the "niche" or "stem cell niche" refers to a microenvironment involved in the proliferation, differentiation, maintenance of properties, and the like of stem cells. Examples of the niche in the living body include hematopoietic stem cell niche, hair follicle stem cell niche, intestinal epithelial stem cell niche, muscle stem cell niche, and pituitary niche. In these niches, stem cells unique to each tissue and supporting cells that provide the niche are present, and stem cells are maintained by cytokine, chemokine, extracellular matrix, cell adhesion factor, intercellular signal transduction factor and the like provided by the supporting cells.

In the present invention, the "pituitary niche" refers to a microenvironment involved in proliferation, differentiation, maintenance of properties, and the like of pituitary stem cells. Examples of the pituitary niche include Maginal Cell Layer (MCL) niche existing around the residual cavity (Rathke's cleft) that remains between the anterior pituitary and the middle lobe as a trace of the hollow part of the sac-like Rathke's pouch in the developing stage, and Parenchymal niche scattered in the anterior pituitary gland.

In the present invention, the "neural crest" refers to a structure formed between epidermis ectoderm and neural plate in the initial development of vertebrate. The "neural crest cell or neural crest-derived cell" refers to cells present in the neural crest or neural crest-derived cells that have migrated and differentiated. Examples of the neural crest-derived cell include nerve cells of the peripheral nervous system, supporting cells, pigment cells, endocrine cells, smooth muscle, head skeletal cells, and mesenchymal cells. Whether the cell mass or tissue produced by the production method of the present invention contains neural crest cell or neural crest-derived cell can be detected by a method such as immunohistochemistry using an antibody to neural crest cell marker such as Nestin, Sox10, Sox9, Slug, Snail, Twist, FoxD3, TFAP2, Pax3, Pax7, HNK-1, and p75NTR.

In the present invention, the "mesenchymal cell" is a non-epithelial cell that is mainly derived from mesoderm and neural crest and forms connective tissue. A part of these cells are multipotent somatic stem cells called mesenchymal stem cells. Whether a mesenchymal cell is contained in the cell mass or tissue produced by the production method of the present invention can be detected by a method such as immunohistochemistry using an antibody to a mesenchymal cell marker such as Nestin, Vimentin, Cadherin-11, Laminin, and CD44. Whether a mesenchymal stem cell is included can be detected by a method such as immunohistochemistry using an antibody to a mesenchymal stem cell marker such as CD9, CD13, CD29, CD44, CD55, CD59, CD73, CD105, CD140b, CD166, VCAM-1, STRO-1, c-Kit, Sca-1, Nucleostemin, CDCP1, BMPR2, BMPR1A, and BPMR1B.

2. Production Method of Cell Mass Containing Pituitary Tissue

The present invention provides a cell mass comprising pituitary tissue and a production method thereof. In the following, it is also to be referred to as the production method of the present invention.

One embodiment of the production method of the present invention is a method for producing a cell mass containing pituitary tissue, including the following steps (1) and (2):
  (1) a first step of suspension-culturing pluripotent stem cells to form a cell aggregate in the presence of a Wnt signal transduction pathway inhibiting substance,
  (2) a second step of suspension-culturing the aggregate obtained in the first step in the presence of a BMP signal transduction pathway activating substance and a Sonic hedgehog signal transduction pathway activating substance, thereby obtaining a cell mass containing pituitary tissue.

Preferable one embodiment of the production method of the present invention is a method for producing a cell mass comprising pituitary tissue, comprising the following steps (a), (1) and (2):
  (a) step a of culturing pluripotent stem cells in the absence of feeder cells and in a medium containing 1) a TGFβ family signal transduction pathway inhibiting substance and/or a Sonic hedgehog signal transduction pathway activating substance, and 2) a factor for maintaining an undifferentiated state,
  (1) a first step of suspension-culturing the cells cultured in step a, to form a cell aggregate in the presence of a Wnt signal transduction pathway inhibiting substance,
  (2) a second step of suspension-culturing the aggregate obtained in the first step in the presence of a BMP signal transduction pathway activating substance and a Sonic hedgehog signal transduction pathway activating substance, thereby obtaining a cell mass comprising pituitary tissue.

More preferable one embodiment of the production method of the present invention is a method for producing a cell mass comprising pituitary tissue, comprising the following steps (1), (2-1) and (2-2):
  (1) a first step of suspension-culturing pluripotent stem cells to form a cell aggregate in the presence of a Wnt signal transduction pathway inhibiting substance,
  (2-1) a second step (1) of suspension-culturing the aggregate obtained in the first step in the presence of a BMP signal transduction pathway activating substance and a Sonic hedgehog signal transduction pathway activating substance,
  (2-2) a second step (2) of suspension-culturing the aggregate suspension-cultured in the second step (1) in the presence of a BMP signal transduction pathway inhibiting substance, thereby obtaining a cell mass comprising pituitary tissue.

Further preferable one embodiment of the production method of the present invention is a method for producing a cell mass comprising pituitary tissue, comprising the following steps (a), (1), (2-1) and (2-2):
  (a) step a of culturing pluripotent stem cells in the absence of feeder cells and in a medium containing 1) a TGFβ family signal transduction pathway inhibiting substance and/or a Sonic hedgehog signal transduction pathway activating substance, and 2) a factor for maintaining an undifferentiated state,
  (1) a first step of suspension-culturing the cells cultured in step a, to form a cell aggregate in the presence of a Wnt signal transduction pathway inhibiting substance,
  (2-1) a second step (1) of suspension-culturing the aggregate obtained in the first step in the presence of a BMP signal transduction pathway activating substance and a Sonic hedgehog signal transduction pathway activating substance,
  (2-2) a second step (2) of suspension-culturing the aggregate suspension-cultured in the second step in the presence of a BMP signal transduction pathway inhibiting substance, thereby obtaining a cell mass comprising pituitary tissue.

Step (a)

The step a of culturing pluripotent stem cells in the absence of feeder cells and in a medium containing 1) a TGFβ family signal transduction pathway inhibiting substance and/or a Sonic hedgehog signal transduction pathway activating substance, and 2) a factor for maintaining undifferentiated state, is explained below.

When pluripotent stem cells are treated with a TGFβ family signal transduction pathway inhibiting substance and/or a Sonic hedgehog signal transduction pathway activating substance in step (a), and subjected to suspension culturing in the first step, the condition of the pluripotent stem cells changes, the efficiency of nonneural epithelial tissue formation is improved, the quality of aggregate is improved, differentiation becomes easier, cell death does not occur easily, and a cell aggregate maintaining a densely undifferentiated state of the inside can be produced with high efficiency.

It is preferable to perform step (a) in the absence of feeder cells.

The absence of feeder cells (feeder-free) in the present invention means a condition substantially free of feeder cells (e.g., the ratio of the number of feeder cells relative to the total number of cells is not more than 3%).

The medium to be used in step (a) is not particularly limited as long as it is a medium enabling culturing of pluripotent stem cells to maintain undifferentiated state under feeder-free conditions (feeder-free medium). For example, a medium containing a factor for maintaining an undifferentiated state, and a TGFβ family signal transduction pathway inhibiting substance and/or a Sonic hedgehog signal transduction pathway activating substance can be mentioned.

To enable culturing to maintain undifferentiated state, the medium used in step (a) contains a factor for maintaining undifferentiated state. The factor for maintaining undifferentiated state is not particularly limited as long as it is a substance having an action to suppress differentiation of pluripotent stem cells. Examples of the factor for maintaining undifferentiated state widely used by those of ordinary skill in the art include an FGF signal transduction pathway activating substance, a TGFβ family signal transduction pathway activating substance, and insulin in the case of primed pluripotent stem cells (e.g., human ES cells, human iPS cells). As the FGF signal transduction pathway activating substance, fibroblast growth factors (e.g., bFGF, FGF4, FGF8) can be specifically mentioned. As the TGFβ family signal transduction pathway activating substance, a TGFβ signal transduction pathway activating substance, a Nodal/Activin signal transduction pathway activating substance can be mentioned. As the TGFβ signal transduction pathway activating substance, for example, TGFβ1, TGFβ2 can be mentioned. As the Nodal/Activin signal transduction pathway activating substance, for example, Nodal, Activin A, Activin B can be mentioned. When human pluripotent stem cells (human ES cells, human iPS cells) are cultured, the medium in step (a) preferably contains bFGF as a factor for maintaining undifferentiated state.

The factor for maintaining undifferentiated state to be used in the present invention is generally a factor for maintaining undifferentiated state of mammals. The mammals are, for example, those mentioned above. Since the factor for maintaining undifferentiated state may have cross-reactivity among mammal species, a factor for maintaining undifferentiated state of any mammal may also be used as long as the undifferentiated state of the pluripotent stem cells to be cultured can be maintained. Preferably, a factor for maintaining undifferentiated state of a mammal of the same species as the cells to be cultured is used. For example, for the culturing of human pluripotent stem cells, human factor for maintaining undifferentiated states (e.g., bFGF, FGF4, FGF8, EGF, Nodal, Activin A, Activin B, TGFβ 1, and TGFβ 2) are used. Here, the "human protein X" means that protein X (a factor for maintaining undifferentiated state etc.) has the amino acid sequence of protein X naturally expressed in human in vivo.

The factor for maintaining undifferentiated state to be used in the present invention is preferably isolated.

Being "isolated" means that an operation to remove factors other than the intended component or cell has been performed, and the component or cell is no longer in a naturally occurring state. Therefore, "isolated protein X" does not include an endogenous protein X produced from the cells or tissues to be cultured, and contained in a cell or tissue or in the medium. The purity of the "isolated protein X" (percentage of the weight of protein X to the total protein weight) is generally not less than 70%, preferably not less than 80%, more preferably not less than 90%, further preferably not less than 99%, most preferably 100%.

In one embodiment, the present invention comprises a step of providing an isolated factor for maintaining undifferentiated state. In one embodiment, it includes a step of extrinsically (exogenously) adding an isolated factor for maintaining undifferentiated state to a medium used in step (a). Alternatively, a factor for maintaining undifferentiated state may be added in advance to a medium to be used in step (a).

The concentration of the factor for maintaining undifferentiated state in the medium to be used in step (a) is a concentration capable of maintaining the undifferentiated state of the pluripotent stem cells to be cultured, and can be appropriately determined by those of ordinary skill in the art. For example, when bFGF is used as a factor for maintaining undifferentiated state in the absence of feeder cells, the concentration thereof is generally about 4 ng/mL-about 500 ng/mL, preferably about 10 ng/mL-about 200 ng/mL, more preferably about 30 ng/mL-about 150 ng/mL.

As the feeder-free medium, many synthetic media have been developed and are commercially available and, for example, Essential 8 medium can be mentioned. Essential 8 medium is DMEM/F12 medium containing L-ascorbic acid-2-phosphate magnesium (64 mg/l), sodium selenium (14 μg/l), insulin (19.4 mg/l), $NaHCO_3$ (543 mg/l), transferrin (10.7 mg/l), bFGF (100 ng/mL), and a TGFβ family signal transduction pathway activating substance (TGFβ1 (2 ng/mL) or Nodal (100 ng/mL)) as additives (Nature Methods, 8, 424-429 (2011)). Examples of the commercially available feeder-free medium include Essential 8 (manufactured by Life Technologies), S-medium (manufactured by DS Pharma Biomedical), StemPro (manufactured by Life Technologies), hESF9, mTeSR1 (manufactured by STEMCELL Technologies), mTeSR2 (manufactured by STEMCELL Technologies), and TeSR-E8 (manufactured by STEMCELL Technologies). In addition to these, StemFit (manufactured by Ajinomoto Co., Inc.) can be mentioned as the feeder-free medium. The present invention can be performed conveniently by using these in the above-mentioned step (a). The StemFit medium contains bFGF as a component for maintaining an undifferentiated state as described in Scientific Reports, 4, 3594.

While the medium used for step (a) may be a serum-containing medium or a serum-free medium, it is preferably a serum-free medium, to avoid contamination with chemically-undefined components.

To avoid contamination with a chemically-undefined component, a medium to be used for step (a) is preferably a medium whose components are chemically-defined.

In step (a), the pluripotent stem cells may be cultured under any conditions of suspension culturing and adhesion culturing, preferably adhesion culturing.

For culturing pluripotent stem cells under feeder-free conditions in step (a), the aforementioned feeder-free medium can be used as a medium.

For culturing pluripotent stem cells under feeder-free conditions in step (a), an appropriate matrix may be used as a scaffold to provide a scaffold in stead of the feeder cells to the pluripotent stem cell. The pluripotent stem cells are subjected to adhesion culturing in a cell container whose surface is coated with a matrix as a scaffold.

As a matrix available as a scaffold, laminin (Nat Biotechnol 28, 611-615 (2010)), laminin fragment (Nat Commun 3, 1236 (2012)), basement membrane preparation (Nat Biotechnol 19, 971-974 (2001)), gelatin, collagen, heparan sulfate proteoglycan, entactin, vitronectin and the like can be mentioned.

"Laminin" is a heterotrimer molecule consisting of α, β, γ chains and an extracellular matrix protein containing isoforms having different subunit chain compositions. Specifically, laminin has about 15 kinds of isoforms based on the combinations of heterotrimers with 5 kinds of α chains, 4 kinds of β chains and 3 kinds of γ chains. The name of laminin is determined by combining respective numbers of α chain (α1-α5), β chain (β1-β4) and γ chain (γ1-γ4). For example, a laminin having a combination of α5 chain, β1 chain, γ1 chain is named laminin 511. In the present invention, laminin 511 is preferably used (Nat Biotechnol 28, 611-615 (2010)).

A laminin fragment to be used in the present invention is not particularly limited as long as it has adhesiveness to pluripotent stem cells and enables maintenance culturing of pluripotent stem cell under feeder-free conditions, and is preferably E8 fragment. Laminin E8 fragment was identified as a fragment with strong cell adhesion activity among the fragments obtained by digestion of laminin 511 with elastase (EMBO J., 3:1463-1468, 1984, J. Cell Biol., 105:589-598, 1987). In the present invention, E8 fragment of laminin 511 is preferably used (Nat Commun 3, 1236 (2012), Scientific Reports 4, 3549 (2014)). The laminin E8 fragment to be used in the present invention is not required to be an elastase digestion product of laminin and may be a recombinant. Alternatively, it may be produced by a gene recombinant animal (*Bombyx mori* etc.). To avoid contamination of chemically unidentified components, a recombinant laminin fragment is preferably used in the present invention. An E8 fragment of laminin 511 is commercially available and can be purchased from, for example, Nippi, Inc. and the like.

To avoid contamination with chemically unidentified components, the laminin or laminin fragment to be used in the present invention is preferably isolated.

Preferably, in the culturing of pluripotent stem cells under feeder-free conditions in step (a), the human pluripotent stem cells are cultured in an adhered state in a cell container with surface coated with isolated laminin 511 or E8 fragment of laminin 511 (most preferably, E8 fragment of laminin 511).

While the period for the culturing of pluripotent stem cells in step (a) is not particularly limited as long as the effect of improving the quality of the aggregate formed in subsequent step (1) can be achieved, it is generally 0.5-144 hr, preferably 2-96 hr, more preferably 6-48 hr, further preferably 12-48 hr, further more preferably 18-28 hr (e.g., 24 hr). That is, step (a) is started 0.5-144 hr (preferably, 18-28 hr) before the start of step (1), and step (1) is continuously performed on completion of step (a).

The culturing conditions such as culturing temperature, and $CO_2$ concentration in step (a) can be appropriately determined. The culturing temperature is, for example, about 30° C. to about 40° C., preferably about 37° C. The $CO_2$ concentration is, for example, about 1% to about 10%, preferably about 5%.

In one preferable embodiment, human pluripotent stem cells (e.g., human iPS cells) are cultured in an adhered state in the absence of feeder cells and in a serum-free medium containing bFGF. The adhesion culturing is preferably performed in a cell container with surface coated with laminin 511, E8 fragment of laminin 511 or vitronectin. The adhesion culturing is preferably performed using StemFit medium as a feeder-free medium.

In one preferable embodiment, human pluripotent stem cells (e.g., human iPS cells) are cultured in suspension in the absence of feeder cells and in a serum-free medium containing bFGF. In the suspension-culturing, human pluripotent stem cells may form an aggregate of human pluripotent stem cells.

The Sonic hedgehog (Shh) signal transduction pathway activating substance is a substance capable of enhancing signal transduction mediated by Shh. Examples of the Shh signal transduction pathway activating substance include proteins belonging to the Hedgehog family (e.g., Shh, Ihh), Shh receptor, Shh receptor agonist, Smo agonist, Purmorphamine, GSA-10, Hh-Ag1.5, and 20(S)-Hydroxycholesterol or SAG (Smoothened Agonist; N-Methyl-N'-(3-pyridinylbenzyl)-N'-(3-chlorobenzo[b]thiophene-2-carbonyl)-1,4-diaminocyclohexane) and the like. The Shh signal transduction pathway activating substance is preferably SAG. The concentration of the Shh signal transduction pathway activating substance in the medium can be appropriately determined to fall within a range capable of achieving the aforementioned effects. In step (a), SAG is generally used at a concentration of about 1 nM-about 2000 nM, preferably about 10 nM-about 1000 nM, particularly preferably about 10 nM-about 700 nM, more preferably about 100 nM-about 600 nM, further preferably about 100 nM-about 500 nM. When an Shh signal transduction pathway activating substance other than SAG is used, it is desirably used at a concentration that shows Shh signal transduction promoting activity equivalent to that of SAG at the aforementioned concentration. Shh signal transduction promoting activity such as SAG can be determined by a method well known to those of ordinary skill in the art, for example, reporter gene assay focusing on the expression of Gli1 gene (Oncogene (2007) 26, 5163-5168). For example, as the Shh signal transduction pathway activating substance having Shh signal transduction promoting activity corresponding to that of 10 nM to about 700 nM SAG, 20 nM to 2 μM of Purmorphamine, 20 nM to 3 μM of GSA-10, 10 nM to 1 μM of Hh-Ag1.5 and the like can be mentioned.

The TGFβ family signal transduction pathway (i.e., TGFβ superfamily signal transduction pathway) is a signal transduction pathway intracellularly transduced by Smad family with TGFβ, Nodal/Activin or BMP as a ligand.

The TGFβ family signal transduction pathway inhibiting substance is a substance that inhibits TGFβ family signal transduction pathway, that is, a signal transduction pathway transduced by the Smad family. Specifically, a TGFβ signal transduction pathway inhibiting substance, a Nodal/Activin signal transduction pathway inhibiting substance and a BMP signal transduction pathway inhibiting substance can be mentioned. As the TGFβ family signal transduction pathway inhibiting substance, a TGFβ signal transduction pathway inhibiting substance is preferable.

The TGFβ signal transduction pathway inhibiting substance is not particularly limited as long as it is a substance inhibiting a signal transduction pathway caused by TGFβ, and may be any of nucleic acid, protein and low-molecular organic compound. As the substance, for example, a substance directly acting on TGFβ (e.g., protein, antibody, and aptamer), a substance suppressing expression of gene encoding TGFβ (e.g., antisense oligonucleotide, and siRNA), a substance that inhibits the binding of TGFβ receptor and TGFβ, and a substance that inhibits physiological activity caused by signal transduction by the TGFβ receptor (e.g., TGFβ receptor inhibitor, and Smad inhibitor) can be mentioned. As a protein known as a TGFβ signal transduction pathway inhibiting substance, Lefty and the like can be mentioned.

As a TGFβ signal transduction pathway inhibiting substance, compounds well known to those of ordinary skill in the art can be used. Specifically, Alk5/TGFβR1 inhibitors such as SB431542 (sometimes to be abbreviated as SB431 in the present specification), SB505124, SB525334, LY2157299, LY2109761, GW788388, LY364947, SD-208, EW-7197, A 83-01, and RepSox, and SMAD3 inhibitors such as SIS3 can be mentioned. SB431542 (4-(5-benzol[1,3]dioxol-5-yl-4-pyridin-2-yl-1H-imidazol-2-yl)-benzamide)

and A-83-01 (3-(6-methyl-2-pyridinyl)-N-phenyl-4-(4-quinolinyl)-1H-pyrazole-1-carbothioamide) are compounds known as inhibitors of TGFβ receptor (ALK5) and Activin receptor (ALK4/7) (i.e., TGFβR inhibitor). SIS3 is a TGFβ signal transduction pathway inhibiting substance that inhibits phosphorylation of SMAD3 which is an intracellular signal transduction factor under the control of TGFβ receptor. The TGFβ transduction pathway inhibiting substance used in the present invention is preferably SB431542 or A-83-01.

The concentration of a TGFβ signal transduction pathway inhibiting substance in the medium can be appropriately determined to fall within a range capable of achieving the aforementioned effects. When SB431542 is used as the TGFβ signal transduction pathway inhibiting substance in step (a), it is generally used at a concentration of about 1 nM-about 100 µM, preferably about 10 nM-about 50 µM, more preferably about 100 nM-about 50 µM, further preferably about 1 µM-about 10 µM. When a TGFβ signal transduction pathway inhibiting substance other than SB431542 is used, it is desirably used at a concentration that shows TGFβ signal transduction pathway inhibiting activity equivalent to that of SB431542 at the aforementioned concentration.

Step (1)

The first step of suspension-culturing pluripotent stem cells maintained under undifferentiation conditions, preferably pluripotent stem cell obtained in step (a), to form a cell aggregate in the presence of a Wnt signal transduction pathway inhibiting substance is explained.

The Wnt signal transduction pathway is a signal transduction pathway that uses a Wnt family protein as a ligand and mainly uses Frizzled as a receptor. Examples of the signal pathway include the classical Wnt pathway transmitted by β-Catenin (Canonical Wnt pathway), as well as a β-catenin-independent non-classical Wnt pathway (Non-Canonical Wnt pathway) and the like. The Non-Canonical Wnt pathway includes Planar Cell Polarity (PCP) pathway, Wnt/Calcium pathway, Wnt-RAP1 pathway, Wnt-Ror2 pathway, Wnt-PKA pathway, Wnt-GSK3MT pathway, Wnt-aPKC pathway, Wnt-RYK pathway, and Wnt-mTOR pathway. In the Non-Canonical Wnt pathway, a common signal transduction factor which is also activated in other signaling pathways other than Wnt is present. In the present invention, such factors are also considered the constitution factors of the Wnt signal transduction pathway and inhibiting substances of the factors are also included in the Wnt signal transduction pathway inhibiting substance.

In the present invention, the Wnt signal transduction pathway inhibiting substance is not limited as long as it can suppress signal transduction induced by Wnt family proteins. It may be any of nucleic acid, protein and low-molecular organic compound. Examples of the substance include a substance that inhibits Wnt processing and extracellular secretion, a substance that directly acts on Wnt (e.g., protein, antibody, and aptamer), a substance that suppresses expression of a gene encoding Wnt (e.g., antisense oligonucleotide, and siRNA), a substance that suppresses binding of Wnt receptor and Wnt, and a substance that suppresses physiological activity caused by signal transduction by Wnt receptor. As a protein known as a Wnt signal transduction pathway inhibiting substance, proteins belonging to secreted Frizzled Related Protein (sFRP) class (sFRP1 to 5, Wnt inhibitory Factor-1 (WIF-1), Cerberus), proteins belonging to Dickkopf (Dkk) class (Dkk1 to 4, Kremen) and the like can be mentioned.

As the Wnt signal transduction pathway inhibiting substance, a compound well known to those of ordinary skill in the art can be used. As the Wnt signal transduction pathway inhibiting substance, for example, Porcupine inhibitor (to be also referred to as PORCN inhibitor), DKK inhibitor, Frizzled inhibitor, Dvl inhibitor, Tankyrase inhibitor (to be also referred to as TANK inhibitor), casein kinase 1 inhibitor, catenin responsive transcription inhibitor, p300 inhibitor, CBP inhibitor, and BCL-9 inhibitor (Am J Cancer Res. 2015; 5(8): 2344-2360) can be mentioned. While the action mechanism has not been reported, KY-02111 and KY03-I can be recited as the Wnt signal transduction pathway inhibiting substance. As the PORCN inhibitor, for example, IWP-2, IWP-3, IWP-4, IWP-L6, IWP-12, LGK-974, ETC-159, GNF-6231, and Wnt-059 can be mentioned. As the TANK inhibitor, for example, IWR1-endo, XAV939, MN-64, WIKI4, TC-E 5001, JW 55, and AZ6102 can be mentioned. The Wnt signal transduction pathway inhibiting substance to be used in the present invention is preferably PORCN inhibitor, TANK inhibitor or KY-02111, more preferably PORCN inhibitor. The PORCN inhibitor to be used in the present invention is preferably IWP-2 or Wnt-059. The TANK inhibitor to be used in the present invention is preferably XAV939.

The Wnt signal transduction pathway inhibiting substance to be used in the present invention also preferably has inhibiting activity on Non-Canonical Wnt pathway. As a Wnt signal transduction pathway inhibiting substance having inhibiting activity on Non-Canonical Wnt pathway, for example, PORCN inhibitor, anti-Frizzled antibody, and Boxy peptide can be mentioned. It is known that Porcupine is involved in lipid modification of Canonical Wnt pathway ligands Wnt1, Wnt3a and the like, as well as Non-Canonical Wnt pathway ligands Wnt5a, Wnt5b, Wnt11 (Dev Biol. 2012 Jan. 15; 361(2):392-402, Biochem J. 2007 Mar. 15; 402(Pt 3): 515-523), and PORCN inhibitor inhibits both the Canonical Wnt pathway and Non-Canonical Wnt pathway.

The concentration of the Wnt signal transduction pathway inhibiting substance in the medium can be appropriately determined to fall within a range capable of achieving the aforementioned effects. For example, when IWP-2 which is one kind of PORCN inhibitor is used as the Wnt signal transduction pathway inhibiting substance, the concentration thereof is generally about 0.01 µM-about 30 µM, preferably about 0.1 µM-about 30 µM, more preferably about 2 µM. When Wnt-059 which is one kind of PORCN inhibitor is used, the concentration thereof is generally about 1 µM-about 30 µM, preferably about 100 µM-about 30 µM, more preferably about 1 nM-about 1 µM. When XAV939 which is one kind of TANK inhibitor is used, the concentration thereof is generally about 0.01 µM-about 30 µM, preferably about 0.1 µM-about 30 µM, more preferably about 1 µM. When KY-02111 is used, the concentration thereof is generally about 0.01 µM-about 30 µM, preferably about 0.1 µM-about 30 µM, more preferably about 5 µM.

In step (1), the suspension culturing is preferably performed in the presence of a Wnt signal transduction pathway inhibiting substance and a TGFβ signal transduction pathway inhibiting substance, from the aspect of formation of mesenchymal cells.

As a TGFβ signal transduction pathway inhibiting substance to be used in step (1), those similar to the ones exemplified in step (a) can be used. The TGFβ signal transduction pathway inhibiting substances in step (a) and step (1) may be the same or different, preferably the same.

The concentration of the TGFβ signal transduction pathway inhibiting substance in the medium can be appropriately determined to fall within a range capable of achieving the aforementioned effects. When SB431542 is used as the TGFβ signal transduction pathway inhibiting substance in step (1), it is generally used at a concentration of about 1 nM-about 100 µM, preferably about 10 nM-about 50 µM, more preferably about 100 nM-about 50 µM, further preferably about 500 nM-about 10 µM. When a TGFβ signal transduction pathway inhibiting substance other than SB431542 is used, it is desirably used at a concentration showing a TGFβ signal transduction pathway inhibiting activity equivalent to that of SB431542 at the aforementioned concentration.

The medium used in step (1) is not particularly limited as long as it is as described in the above-mentioned definition. The medium to be used in step (1) may be a serum-containing medium or serum-free medium. To avoid contamination of chemically-undefined components, a serum-free medium is preferably used in the present invention. To avoid complicated preparation, for example, a serum-free medium supplemented with an appropriate amount of a commercially available serum replacement such as KSR (e.g., medium of 1:1 mixture of IMDM and F-12, which is supplemented with 5% KSR, 450 µM 1-monothioglycerol and 1× Chemically Defined Lipid Concentrate, or GMEM medium supplemented with 5%-20% KSR, NEAA, pyruvic acid, 2-mercaptoethanol) is preferably used. The amount of KSR to be added to a serum-free medium in the case of human ES cell is generally about 1% to about 30%, preferably about 2% to about 20%.

For formation of an aggregate in step (1), a dispersing operation of the pluripotent stem cells obtained in step (a) is preferably first performed. The "dispersed cells" obtained by the dispersing operation refers to a state where, for example, not less than 70% of cells are single cells and not more than 30% of cells are clumps of 2-50 cells.

Preferably, as the dispersed cells, a state where not less than 80% of cells are single cells, and not more than 20% of cells are clumps of 2-50 cells can be mentioned. The dispersed cells refer to a state almost free of mutual adhesion of cells (e.g., plane attachment). In some embodiments, dispersed cells refer to a state almost free of cell-cell junction (e.g., adhesive bond).

A dispersion operation of the pluripotent stem cells obtained in step (a) may contain the above-mentioned mechanical dispersion treatment, cell dispersion solution treatment, and cell protecting agent addition treatment. These treatments may be performed in combination. Preferably, a cell dispersion solution treatment is performed simultaneously with a cell protecting agent addition treatment and then a mechanical dispersion treatment is performed.

As a cell protecting agent to be used for the cell protecting agent addition treatment, an FGF signal transduction pathway activating substance, heparin, ROCK inhibiting substance, myosin inhibiting substance, serum, or serum replacement can be mentioned. As a preferable cell protecting agent, a ROCK inhibiting substance can be mentioned. To suppress cell death of pluripotent stem cells (particularly, human pluripotent stem cells) induced by dispersion, a Rho-associated coiled-coil kinase (ROCK) inhibiting substance may be added from the start of the first step culturing. As a ROCK inhibiting substance, Y-27632, Fasudil (HA1077), H-1152, HA-100 and the like can be mentioned.

Alternatively, a cell protecting agent after preparation can also be used. Examples of the cell protecting agent after preparation include RevitaCell Supplement (manufactured by Thermo Fisher Scientific), and CloneR (manufactured by Stemcell Technologies).

As a cell dispersion solution to be used for the cell dispersion solution treatment, a solution containing any of enzymes such as trypsin, collagenase, hyaluronidase, elastase, pronase, DNase, papain and so on, and a chelating agent such as ethylenediaminetetraacetic acid and so on can be mentioned. A commercially available cell dispersion solution such as TrypLE Select (manufactured by Thermo Fisher Scientific), TrypLE Express (manufactured by Thermo Fisher Scientific), Accumax (manufactured by Innovative Cell Technologies) can also be used.

As a method of mechanical dispersion treatment, a pipetting treatment or scraping by a scraper can be mentioned.

The dispersed cells are suspended in the above-mentioned medium.

Then, a suspension of the dispersed pluripotent stem cells is seeded in the above-mentioned culture vessel, and the dispersed pluripotent stem cells are cultured under a condition non-adhesive to the culture vessel, whereby plural cells are gathered to form an aggregate.

In this case, plural cell aggregates may be simultaneously formed in one culture vessel by seeding the dispersed pluripotent stem cells in a comparatively large culture vessel such as a 10 cm dish. To prevent easy occurrence of size dispersion of each aggregate, for example, a given amount of the dispersed pluripotent stem cells are placed in each well of a multiwell plate (U-bottom, V-bottom) such as a 96-well microplate, and static culturing is performed, whereby the cells rapidly aggregate to preferably form one m aggregate in each well. The aggregates are recovered from plural wells, whereby a population of uniformed aggregates can be obtained.

In step (1), to avoid complicated preparation of the aggregate, a three-dimensional cell culture container permitting exchange of the medium of the whole plate while aggregates are contained in each well may also be used. Examples of the three-dimensional cell culture container include PrimeSurface 96 Slit well plate (manufactured by SUMITOMO BAKELITE CO., LTD.) and the like.

The concentration of the pluripotent stem cells in step (1) can be appropriately set so that cell aggregates can be more uniformly and efficiently formed. For example, when human pluripotent stem cells (e.g., human iPS cell obtained in step (a)) are cultured in suspension using a 96-well microwell plate, a liquid prepared to achieve generally about $1\times10^3$ to about $1\times10^5$ cells, preferably about $3\times10^3$ to about $5\times10^4$ cells, more preferably about $4\times10^3$ to about $2\times10^4$ cells, further preferably about $4\times10^3$ to about $1.6\times10^4$ cells, particularly preferably about $8\times10^3$ to about $1.2\times10^4$ cells, per well is added to the wells, and the plate is left to stand to form aggregates.

The culturing conditions such as culturing temperature, $CO_2$ concentration and so on in step (1) can be appropriately determined. The culturing temperature is, for example, about 30° C. to about 40° C., preferably about 37° C. The $CO_2$ concentration is, for example, about 1% to about 10%, preferably about 5%.

In step (1), when a medium change operation is performed, for example, it can be performed by an operation to add a fresh medium without discarding the existing medium (medium addition operation), an operation to discard about a half amount of the existing medium (about 30-90%, for example, about 40-60% of the volume of the existing medium) and add about a half amount of a fresh medium (about 30-90%, for example, about 40-60% of the volume of the existing medium) (half-medium change operation), and an operation to discard about the whole amount of the existing medium (not less than 90% of the volume of the existing medium) and add about the whole amount of a fresh medium (not less than 90% of the volume of the existing medium) (full-medium change operation) and the like.

When a particular component (e.g., differentiation-inducing factor) is added at a certain time point, for example, an operation to calculate the final concentration, to discard about a half amount of the existing medium, and to add about a half amount of a fresh medium containing a particular component at a concentration higher than the final concentration (half amount medium change operation) may be performed.

When the concentration of a component contained in the existing medium is to be decreased by dilution at a certain time point, for example, the medium change operation may be performed plural times per day, preferably plural times (e.g., 2-3 times) within 1 hr. Also, when the concentration of a component contained in the existing medium is to be decreased by dilution at a certain time point, the cell or aggregate may be transferred to another culture container.

While the tool used for the medium change operation is not particularly limited, for example, pipetter, pipetteman, multichannel pipetteman, and continuous dispenser, can be mentioned. For example, when a 96 well plate is used as a culture container, a multichannel pipetteman may be used.

The period for suspension culturing necessary for forming a cell aggregate can be determined as appropriate according to the pluripotent stem cell to be used, so that the cells can be aggregated uniformly. To form uniformed cell aggregates, it is desirably as short as possible. The steps for the dispersed cells to form cell aggregates can be divided into a step for gathering cells, and a step for forming cell aggregates from the gathered cells. In a step of seeding the dispersed cells (i.e., at the time of the start of suspension culturing) to allow for gathering of the cells in case of human pluripotent stem cell (e.g., human iPS cell), for example, the gathered cells are formed preferably within about 24 hr, more preferably within about 12 hr. In the step of seeding the dispersed cells (i.e., at the time of the start of suspension culturing) to allow for forming a cell aggregate in the case of human pluripotent stem cells (e.g., human iPS cells), for example, the aggregate is formed preferably within about 72 hr, more preferably within about 48 hr. The period for cell aggregate formation can be appropriately adjusted by controlling the tools for aggregating the cells, centrifugation conditions and so on.

Formation of cell aggregates can be determined based on the size and cell number of the aggregates, macroscopic morphology, microscopic morphology and uniformity thereof by tissue staining analysis, expression of markers for differentiation and undifferentiated state and uniformity thereof, control of expression of differentiation marker and synchronism thereof, reproducibility of differentiation efficiency between the aggregates, and so on.

After aggregate formation, the aggregate may be continuously cultured as it is. The period for suspension culturing in step (1) is generally about 8 hr-6 days, preferably about 12 hr-48 hr.

<Step (2)> and <Step (2-1)>

The second step in which the cell aggregate obtained in step (1) is cultured in suspension in the presence of a BMP signal transduction pathway activating substance and a Sonic hedgehog signal transduction pathway activating substance to obtain a cell mass containing pituitary tissue, or the second step (1) in which the cell aggregate obtained in step (1) is cultured in suspension in the presence of a BMP signal transduction pathway activating substance and a Sonic hedgehog signal transduction pathway activating substance is explained below.

The BMP signal transduction pathway activating substance is a substance capable of enhancing signal transduction mediated by BMP. Examples of the BMP signal transduction pathway activating substance include BMP proteins such as BMP2, BMP4, and BMP7, GDF proteins such as GDF7, anti-BMP receptor antibody, BMP partial peptide and so on. BMP2 protein and BMP4 protein are available from, for example, R&D Systems, BMP7 protein is available from Biolegend, and GDF7 protein is available from, for example, Wako Pure Chemical Industries, Ltd. The BMP signal transduction pathway activating substance is preferably BMP4.

The concentration of the BMP signal transduction pathway activating substance in the medium can be appropriately determined to fall within a range capable of achieving the aforementioned effects. When BMP4 is used as a BMP signal transduction pathway activating substance, it is generally used at a concentration of about 1 µM-about 100 nM, preferably about 10 µM-about 50 nM, more preferably about 10 µM-about nM, further preferably about 10 µM-about 5 nM. When a BMP signal transduction pathway activating substance other than BMP4 is used, it is desirably used at a concentration that shows BMP signal transduction pathway promoting activity equivalent to that of BMP4 at the aforementioned concentration.

As the Shh signal transduction pathway activating substance used in step (2) or step (2-1), one similar to those exemplified in step (a) can be used. The Shh signal transduction pathway activating substances in step (a) and step (2) or step (2-1) may be the same or different, preferably the same.

The concentration of the Shh signal transduction pathway activating substance in the medium can be appropriately determined to fall within a range capable of achieving the aforementioned effects. When SAG is used as the Shh signal transduction pathway activating substance in step (2) or step (2-1), it is generally used at a concentration of about 1 nM-about 5 µM, preferably about 10 nM-about 4.5 µM, more preferably about 50 nM-about 4 µM, further preferably about 100 nM-about 3 µM.

The medium used in step (2) or step (2-1) is not particularly limited as long as it contains a BMP signal transduction pathway activating substance and an Shh signal transduction pathway activating substance. The medium to be used in step (2) or step (2-1) may be a serum-containing medium or serum-free medium. To avoid contamination of chemically-undefined components, a serum-free medium is preferably used in the present invention. To avoid complicated preparation, for example, a serum-free medium supplemented with an appropriate amount of a commercially available serum replacement such as KSR (e.g., medium of 1:1 mixture of IMDM and F-12, which is supplemented with 5% KSR, 450 µM 1-monothioglycerol and 1× Chemically Defined Lipid Concentrate, or GMEM medium supplemented with 5%-20% KSR, NEAR, pyruvic acid, 2-mercaptoethanol) is preferably used. The amount of KSR to be added to a serum-free medium in the case of human ES cell is generally about 1% to about 30%, preferably about 2% to about 20%. In the second step, the pluripotent stem cell aggregate obtained in the first step is cultured in suspension in a medium (preferably serum-free medium) containing a BMP signal transduction pathway activating substance and an Shh signal transduction pathway activating substance to form a cell mass, whereby the quality of the cell mass is improved and a cell mass containing pituitary tissue can be formed with high efficiency.

In step (2) or step (2-1), the timing of addition of the BMP signal transduction pathway activating substance and the Shh signal transduction pathway activating substance may be the same or different. Preferably, it is the same, or a Shh signal transduction pathway activating substance is added after adding a BMP signal transduction pathway activating substance. The timing of addition of the Shh signal transduction pathway activating substance is within 12 days, preferably within 10 days, more preferably within 6 days, from the addition of the BMP signal transduction pathway activating substance. In an embodiment in which step (2-2) is continuously performed after step (2-1), the Shh signal transduction pathway activating substance may be added simultaneously with the start of the below-mentioned step (2-2).

Step (2-2)

The second step (2) in which the cell aggregate obtained in step (2-1) is further cultured in suspension in a medium containing a BMP signal transduction pathway inhibiting substance to obtain a cell mass containing pituitary tissue is explained below.

In the present invention, the BMP signal transduction pathway inhibiting substance is not limited as long as it can suppress signal transduction induced by BMP family proteins. It may be any of nucleic acid, protein and low-molecular organic compound. Examples of the substance include a substance that inhibits BMP processing and extracellular secretion, a substance that directly acts on BMP (e.g., protein, antibody, and aptamer), a substance that suppresses expression of a gene encoding BMP (e.g., antisense oligonucleotide, and siRNA), a substance that suppresses binding of BMP receptor and BMP, and a substance that suppresses physiological activity caused by signal transduction by BMP receptor. The BMP receptor includes type I BMP receptor and type II BMP receptor. As the type I BMP receptor, BMPR1A, BMPR1B, and ACVR are known; as the type II BMP receptor, TGF-beta R-II, ActR-II, ActR-IIB, BMPR2, and MISR-II are known.

As a protein known as a BMP signal transduction pathway inhibiting substance, for example, Noggin, Chordin, Follistatin, Gremlin, Inhibin, Twisted Gastrulation, Coco, secretory protein belonging to the DAN family can be mentioned. In the above-mentioned step (2-1), a BMP signal transduction pathway activating substance is added to the culture medium. To more effectively inhibit the BMP signal transduction pathway thereafter, the BMP signal transduction pathway inhibiting substance in step (2-2) preferably contains a substance that inhibits a signal transduction pathway downstream of the extracellular secretion of BMP, for example, a substance that inhibits the binding between BMP receptor and BMP, a substance that inhibits physiological activity caused by signal transduction by BMP receptors, more preferably an inhibitor of type I BMP receptor.

As the BMP signal transduction pathway inhibiting substance, a compound well known to those of ordinary skill in the art can also be used. Examples of the BMP signal transduction pathway inhibiting substance include K02288 (3-[(6-amino-5-(3,4,5-trimethoxyphenyl)-3-pyridinyl]phenol, 3-[6-amino-5-(3,4,5-trimethoxyphenyl)-3-pyridinyl]-phenol), Dorsomorphin (6-[4-[2-(1-piperidinyl)ethoxy]phenyl]-3-(4-pyridinyl)pyrazolo[1,5-a]pyrimidine), LDN-193189 (4-[6-[4-(1-piperazinyl)phenyl]pyrazolo[1,5-a]pyrimidin-3-yl]quinoline dihydrochloride), LDN-212854 (5-[6-[4-(1-/0 piperazinyl)phenyl]pyrazolo[1,5-a]pyrimidin-3-yl]quinoline), LDN-214117 (1-(4-(6-methyl-5-(3,4,5-trimethoxyphenyl)pyridin-3-yl)phenyl)piperazine), ML347 (5-[6-(4-methoxyphenyl)pyrazolo[1,5-a]pyrimidin-3-yl]quinoline)), DMH1 (4-(6-(4-isopropoxyphenyl)pyrazolo[1,5-a]pyrimidin-3-yl)quinoline), and DMH2 (4-[6-[4-[2-(4-morpholinyl)ethoxy]phenyl]pyrazolo[1,5-a]pyrimidin-3-yl]-quinoline). These substances may be used alone or in combination.

The BMP signal transduction pathway inhibiting substance to be used in the present invention is preferably a type I BMP receptor inhibitor, more preferably contains at least one selected from the group consisting of K02288, Dorsomorphin, LDN-193189, LDN-212854, LDN-214117, ML347, DMH1 and DMH2, further preferably contains K02288.

The concentration of the BMP signal transduction pathway inhibiting substance in the medium can be appropriately determined to fall within a range capable of achieving the aforementioned effects. From the aspect of the formation efficiency of the pituitary tissue, when K02288 is used as the BMP signal transduction pathway inhibiting substance in step (2-2), it is generally used at a concentration of about 1 nM-about 100 µM, preferably about 10 nM-about 50 µM, more preferably about 100 nM-about 50 µM, further preferably about 500 nM-about 25 µM. When LDN-193189 is used as the BMP signal transduction pathway inhibiting substance, it is generally used at a concentration of about 1 nM-about 100 µM, preferably about 10 nM-about 10 µM, more preferably about 25 nM-about 1 µM, further preferably about 100 nM-about 500 nM. When LDN-212854 is used as the BMP signal transduction pathway inhibiting substance, it is generally used at a concentration of about 1 nM-about 100 µM, preferably about 10 nM-about 10 µM, more preferably about 25 nM-about 5 µM, further preferably about 250 nM-about 3 µM. When ML-347 is used as the BMP signal transduction pathway inhibiting substance, it is generally used at a concentration of about 1 nM-about 100 µM, preferably about 10 nM-about 50 µM, more preferably about 100 nM-about 50 µM, further preferably about 1 µM-about 25 µM. When DMH2 is used as the BMP signal transduction pathway inhibiting substance, it is generally used at a concentration of about 1 nM-about 100 µM, preferably about 10 nM-about 10 µM, more preferably about 25 nM-about 5 µM, further preferably about 50 nM-about 3 µM. When a BMP signal transduction pathway inhibiting substance other than K02288 is used, it is desirably used at a concentration showing BMP signal transduction pathway inhibitory activity equivalent to that of K02288 at the above-mentioned concentration.

The medium to be used in step (2-2) is not particularly limited as long as it contains a BMP signal transduction pathway inhibiting substance. The medium to be used in step (2-2) is preferably common with the medium in step (1) to step (2-1). The medium to be used in step (2-2) may be a serum-containing medium or serum-free medium. To avoid contamination of chemically-undefined components, a serum-free medium is preferably used in the present invention. To avoid complicated preparation, for example, a serum-free medium supplemented with an appropriate amount of a commercially available serum replacement such as KSR (e.g., medium of 1:1 mixture of IMDM and F-12, which is supplemented with 5% KSR, 450 µM 1-monothioglycerol and 1× Chemically Defined Lipid Concentrate, or GMEM medium supplemented with 5%-20% KSR, NEAA, pyruvic acid, 2-mercaptoethanol) is preferably used. The amount of KSR to be added to a serum-free medium in the case of human ES cell is generally about 1% to about 30%, preferably about 2% to about 20%.

It is also preferable to add a Shh signal transduction pathway activating substance to the medium in step (2-2) as in step (2-1). As the Shh signal transduction pathway activating substance, one similar to those exemplified in step (a) is used. The Shh signal transduction pathway activating substances in steps (a), (2-1) and (2-2) may be the same or different, preferably the same.

The concentration of the Shh signal transduction pathway activating substance in the medium can be appropriately determined to fall within a range capable of achieving the aforementioned effects. When SAG is used as the Shh signal transduction pathway activating substance in step (2-2), it is generally used at a concentration of about 1 nM-about 5 µM, preferably about 10 nM-about 4.5 µM, more preferably about 50 nM-about 4 µM, further preferably about 100 nM-about 3 µM. When a Shh signal transduction pathway activating substance is added after addition of the BMP signal transduction pathway activating substance in step (2-1), the Shh signal transduction pathway activating substance may be added simultaneously with the start of step (2-2).

In steps (2), (2-1) and (2-2), suspension culturing is preferably further performed in the presence of a TGFβ signal transduction pathway inhibiting substance.

As the TGFβ signal transduction pathway inhibiting substance to be used in step (2), (2-1) and (2-2), one similar to those exemplified in step (a) is used. The TGFβ signal transduction pathway inhibiting substances in step (a), steps (1), (2), (2-1) and (2-2) may be the same or different, preferably the same.

The concentration of the TGFβ signal transduction pathway inhibiting substance in the medium can be appropriately determined to fall within a range capable of achieving the aforementioned effects. When SB431542 is used as the TGFβ signal transduction pathway inhibiting substance in steps (2), (2-1) and (2-2), it is generally used at a concentration of about 1 nM-about 100 µM, preferably about 10 nM-about 50 µM, more preferably about 100 nM-about 50 µM, further preferably about 500 nM-about 10 µM. When a TGFβ signal transduction pathway inhibiting substance other than SB431542 is used, it is desirably used at a concentration showing TGFβ signal transduction pathway inhibitory activity equivalent to that of SB431542 at the aforementioned concentration.

In the present invention, it is preferable to perform one or more steps of steps (1), (2), (2-1) and (2-2) in the presence of an FGF signal transduction pathway activating substance. The FGF signal transduction pathway activating substance is not particularly limited as long as it is a substance capable of enhancing the signal transduction pathway mediated by FGF (fibroblast growth factor). Examples of the FGF signal transduction pathway activating substance include FGF proteins such as FGF1, FGF2 (sometimes referred to as bFGF), and FGF8, anti-FGF receptor antibody, FGF partial peptide and the like. These substances may be used alone or in combination.

FGF2 protein and FGF8 protein are available from, for example, FUJIFILM Wako Pure Chemical Corporation. The FGF signal transduction pathway activating substance preferably contains at least one selected from the group consisting of FGF2 and FGF8, and variant thereof, more preferably contains FGF2, further preferably contains recombinant human FGF2.

The concentration of the FGF signal transduction pathway activating substance in the medium can be appropriately determined to fall within a range capable of achieving the aforementioned effects. From the aspects of formation of an epithelial structure in a neural tissue part, and promotion of differentiation into placode and survival and proliferation of the cell, when FGF2 is used as the FGF signal transduction pathway activating substance, it is used at a concentration of generally about 1 µg/ml-about 100 µg/ml, preferably about 10 µg/ml-about 50 µg/ml, more preferably about 100 µg/ml-about 10 µg/ml, further preferably about 500 µg/ml-about 1 µg/ml, most preferably about 1 ng/ml-about 200 ng/ml. When an FGF signal transduction pathway activating substance other than FGF2 is used, it is desirably used at a concentration showing FGF signal transduction pathway promoting activity equivalent to that of FGF2 at the above-mentioned concentration.

To retain the activity of FGF protein in a medium, it is also preferable to add heparin, heparan sulfate to the medium containing the FGF protein. Heparin is available as a sodium salt from, for example, FUJIFILM Wako Pure Chemical Corporation. The concentration of heparin or heparan sulfate in the medium can be appropriately determined to fall within a range capable of achieving the aforementioned effects. The concentration of heparin sodium in the medium is generally about 1 ng/ml-about 100 mg/ml, preferably about 10 ng/ml-about 50 mg/ml, more preferably about 100 ng/ml-about 10 mg/ml, further preferably about 500 ng/ml-about 1 mg/ml, most preferably about 1 µg/ml-about 200 µg/ml. When heparan sulfate is used, it is preferably a concentration showing FGF protein protecting activity equivalent to that of heparin at the above-mentioned concentration. To retain the activity of FGF protein under a cell culture environment such as 37° C., for example, it is also preferable to use modified FGF such as Thermostable FGF2 described in U.S. Pat. No. 8,772,460B2 or FGF2 sustained-release beads such as StemBeads FGF2 in which FGF2 is bound to a biodegradable polymer. Thermostable FGF2 is available from, for example, HumanZyme, inc. StemBeads FGF2 is available from, for example, StemCulture.

In the present invention, to promote survival and proliferation of neural cells or tissue in an aggregate, any one or more steps of steps (1), (2), (2-1) and (2-2) can also be performed in the presence of a Wnt signal transduction pathway activating substance. As mentioned above, canonical Wnt pathway, non-canonical Wnt pathway and the like can be recited as the Wnt signal transduction pathway. The non-canonical Wnt pathway includes Planar Cell Polarity (PCP) pathway, Wnt/Calcium pathway, Wnt-RAPT pathway, Wnt-Ror2 pathway, Wnt-PKA pathway, Wnt-GSK3MT pathway, Wnt-aPKC pathway, Wnt-RYK pathway, and Wnt-mTOR pathway.

In the present invention, the Wnt signal transduction pathway activating substance is not limited as long as it can activate signal transduction induced by Wnt family proteins. It may be any of nucleic acid, protein and low-molecular organic compound. As the substance, for example, a substance that promotes Wnt autocrine, a substance that stabilizes Wnt and suppresses degradation, a recombinant protein of Wnt, a partial sequence peptide of Wnt and by-products and derivatives thereof, a substance that acts on and activate Wnt receptor, a substance that activates intracellular signal transduction mechanism of Wnt, intracellular signal transduction factors of Wnt and its variants (β Catenin S33Y, etc.), and a substance that activates expression of gene downstream of Wnt response element. As a protein known as a Wnt signal transduction pathway activating substance, Wnt, R-Spondin and the like can be mentioned.

As the Wnt signal transduction pathway activating substance, a compound well known to those of ordinary skill in the art can also be used. As a compound having activity as a Wnt signal transduction pathway activating substance, for example, lithium chloride, AMBMP hydrochloride, SGC AAK1 1, Foxy 5, CHIR99021, CHIR98014, TWS119, SB216763, SB415286, BIO, AZD2858, AZD1080, AR-A014418, TDZD-8, LY2090314, IM-12, Indirubin, Bikinin, A 1070722, 3F8, Kenpaullone, 10Z-Hymenialdisine, Indirubin-3'-oxime, NSC 693868, TC-G 24, TCS 2002, TCS 21311, CP21R7, BML-284, SKL2001, WAY 262611, IIIC3a, Methyl Vanillate, IQ-1 and derivatives of these compounds and the like can be mentioned.

In the present invention, a Wnt signal transduction pathway inhibiting substance is added in step (1). Only a particular pathway of the aforementioned plural Wnt signal transduction pathways can be activated or inhibited by using a combination of Wnt signal transduction pathway activating substance and a Wnt signal transduction pathway inhibiting substance wherein there are different points of action. In the present invention, the Wnt signal transduction pathway activating substance is preferably a substance that acts on a factor downstream of the Wnt signal transduction pathway inhibiting substance to be added in step (1). In the present invention, it is also preferable that the Wnt signal transduction pathway activating substance to be added is a substance that activates a canonical Wnt pathway, more preferably a substance that activates Wnt signal transduction pathway by an action of inhibiting degradation of and stabilizing β-catenin which is a Wnt signal transduction factor in the cell. Examples of the substance having an action of inhibiting degradation of and stabilizing β-catenin include GSK3 inhibitor, BML-284, and SKL2001. It is also preferable that the Wnt signal transduction pathway activating substance to be added is a substance that promotes and activates β-catenin responsive transcription (CRT).

As a preferable combination of a Wnt signal transduction pathway activating substance and a Wnt signal transduction pathway inhibiting substance in the present invention, a GSK3 inhibitor and a PORCN inhibitor can be mentioned. When a GSK3 inhibitor and a PORCN inhibitor are used in combination, the canonical Wnt pathway is activated and the non-canonical Wnt pathway is inhibited. When a GSK3 inhibitor and a PORCN inhibitor are used in combination, a preferable GSK3 inhibitor in the present invention contains at least one selected from the group consisting of CHIR99021, CHIR98014, SB216763, SB415286, and BIO, further preferably CHIR99021. When a GSK3 inhibitor and a PORCN inhibitor are used in combination, a preferable PORCN inhibitor in the present invention contains at least one selected from the group consisting of IWP-2, IWP-3, IWP-4, IWP-L6, IWP-12, LGK-974, ETC-159, GNF-6231, and Wnt-059, further preferably IWP-2. In addition, a GSK3 inhibitor and KY02111 or a derivative thereof and the like may be used in combination. As a substance having an action of inhibiting degradation of and stabilizing β-catenin and having action mechanism different from that of a GSK3 inhibitor, for example, BML-284 and SKL2001 can be mentioned. These compounds and a derivative thereof may also be used in combination with a PORCN inhibitor, KY02111 or a derivative thereof and the like.

The concentration of Wnt signal transduction pathway activating substance in the medium can be appropriately determined to fall within a range capable of achieving the aforementioned effects. From the aspects of promotion of survival and proliferation of neural cells or tissue inside the aggregate, when CHIR99021 is used as the Wnt signal transduction pathway activating substance, it is used at a concentration of generally about 10 μM-about 10 mM, preferably about 100 μM-about 1 mM, more preferably about 1 nM-about 100 μM, further preferably about 10 nM-about 30 μM, most preferably about 100 nM-about 3 μM. When a Wnt signal transduction pathway activating substance other than CHIR99021 is used, it is desirably used at a concentration showing Wnt signal transduction pathway promoting activity equivalent to that of CHIR99021 at the above-mentioned concentration.

In the present invention, in any one or more steps of steps (1), (2), (2-1) and (2-2), addition of a further growth factor to the medium is also preferable from the aspects of suppression of cell death and promotion of cell proliferation. The kind of the growth factor to be added is not particularly limited as long as the above-mentioned purpose can be achieved. Examples of the growth factor to be used for such purpose include epidermal growth factor (EGF), insulin-like growth factor (IGF), nerve growth factor (NGF), brain-derived neurotrophic factor (BDNF), neurotrophin 3, neurotrophin 4/5, ciliary neurotrophic factor (CNTF), vesicular endothelial growth factor (VEGF), pigment epithelium-derived factor (PEDF), hepatocyte growth factor (HGF) and the like. These growth factors may be added at a concentration capable of achieving the above-mentioned purpose.

In any one or more steps of steps (1), (2), (2-1) and (2-2) in the present invention, it is also preferable to add a platelet-derived growth factor receptor activating substance such as platelet-derived growth factor (PDGF) and the like to a medium from the aspect of suppression of cell death and promotion of cell proliferation. PDGF includes 4 kinds of genes of A, B, C, D, and they form a homo or hetero dimer of a particular combination of AA, AB, BB, CC, DD and function as a ligand. The PDGF receptor has two kinds of genes, α and β, which form a homo- or hetero-dimer of a combination of αα, αβ, and ββ, and functions as a receptor. Among these, PDGFRβ is well expressed in the nonneural ectoderm containing the placode, and the platelet-derived growth factor receptor activating substance used in the present invention preferably has an action on PDGFRββ or PDGFRαβ; more preferably it contains any of PDGF-AB, PDGF-BB, PDGF-CC, and PDGF-DD further preferably contains either PDGF-BB or PDGF-CC. PDGF-AB, PDGF-BB, PDGF-CC, and PDGF-DD are available as a recombinant protein form R&D systems or GenScript.

In any one or more steps of steps (1), (2), (2-1) and (2-2) in the present invention, to improve production efficiency of pituitary tissue, it is also preferable to add a compound for promoting differentiation into a placodal region. As a compound having the above-mentioned action, for example, BRL-54443 Phenanthroline, Parthenolide described in US20160326491A1, and the like can be mentioned. When BRL-54443 is used as a compound for promoting differentiation into a placodal region, it is used at a concentration of generally 10 nM-100 μM; when Phenanthroline is used, it is used at a concentration of generally 10 nM-100 μM; and when Parthenolide is used, it is used at a concentration of generally 10 nM-100 μM.

In any of steps (2) and (2-2) in the present invention, a more matured cell mass containing differentiated cells can be obtained by culturing the produced cell mass for a long period of time. Such culturing is to be also referred to as mature culturing. In the process of mature culturing in steps (2) and (2-2), a serum-free medium is preferably used to avoid contamination of chemically-undefined components. In the mature culturing of steps (2) and (2-2), a medium similar to those exemplified in steps (2) and (2-2) can also be used. In addition, a known medium used for culturing nerve cell and the like, for example, a medium of a 1:1 mixture of DMEM/F-12 medium and Neurobasal medium supplemented with 0.5% N2 Supplement and 1% B27 supplement (N2B27 medium), a medium of Knockout DMEM/F-12 medium supplemented with StemPro NSC SFM Supplement (StemPro NSC SFM medium) and the like can also be used. When mature culturing is performed, culturing can also be continued in a culture container used at the time of start of the suspension culturing. It is also possible to place a cell mass in a new culture container, for example, dish for suspension culturing, flask for suspension culturing and the like and perform culturing.

In any of step (2), steps (2-1) and (2-2) in the present invention, it is also preferable to perform culturing under a high oxygen atmosphere from the aspect of suppression of cell death and promotion cell proliferation. The high oxygen conditions in the culturing process can be realized, for example, by connecting an oxygen cylinder to an incubator for culturing cells and artificially supplying oxygen. The oxygen concentration for such purpose is generally 25% to 80%, more preferably 30% to 60%.

In any of step (2), steps (2-1) and (2-2) in the present invention, it is possible to use a culture vessel with high gas exchange efficiency from the aspect of increasing the amount of oxygen supply to the medium for culturing cell masses. Examples of such culture vessel include cell culture dish, Lumoxdish with a gas permeable film as bottom surface of the plate (manufactured by Sarstedt K.K.), VECELL 96 well plate (manufactured by Vessel CO. LTD.) and the like.

In any of step (2), steps (2-1) and (2-2) in the present invention, it is also preferred to treat the cell mass with corticosteroids by adding them to the medium. Corticosteroids may be added in step (1). The treatment with corticosteroids promotes differentiation from pituitary placode and/or Rathke's pouch into pituitary hormone-producing cells other than ACTH-producing cells (i.e., GH-producing cells, PRL-producing cells, TSH-producing cells, LH-producing cells, FSH-producing cells etc.). Examples of the corticosteroids include, but are not limited to, natural glucocorticoids such as hydrocortisone, cortisone acetate, and fludrocortisone acetate; artificially synthesized glucocorticoids such as dexamethasone, betamethasone, predonisolone, methylprednisolone, and triamcinolone, and the like.

The concentration of corticosteroids in the medium is not particularly limited as long as differentiation from pituitary placode and/or Rathke's pouch into pituitary hormone-producing cells (excluding ACTH-producing cells) can be promoted, and can be appropriately determined according to the kind of corticosteroids. For example, it is generally not less than 100 ng/ml, preferably not less than 1 µg/ml, for hydrocortisone. The upper limit of the hydrocortisone concentration is not particularly set as long as differentiation into pituitary hormone-producing cells (excluding ACTH-producing cells) is not adversely affected. From the viewpoint of culture costs, it is generally not more than 1000 µg/ml, preferably not more than 100 µg/ml. In one embodiment, the concentration of hydrocortisone in the medium is generally 100 ng/ml-1000 µg/ml, preferably 1-100 µg/ml. When dexamethasone is used as the corticosteroids, the concentration thereof in the medium may be about $1/25$ of that of hydrocortisone.

In steps (2), (2-1) and (2-2) in the present invention, the timing of addition of corticosteroids to the medium is not particularly limited as long as differentiation from pituitary placode and/or Rathke's pouch into pituitary hormone-producing cells (excluding ACTH-producing cells) can be promoted. The corticosteroids may be added to the medium from the start of the culturing step in steps (2), (2-1) and (2-2) in the present invention. Alternatively, corticosteroids may be added to the medium after culturing for a certain period of time in a medium free of corticosteroids after the culturing step is started. Preferably, after steps (2), (2-1) and (2-2) in the present invention are started, when the appearance of ACTH-producing cells in a cell aggregate is confirmed, corticosteroids are added to the medium. That is, the cell aggregate is cultured in a medium free of corticosteroids until the appearance of ACTH-producing cells is confirmed in the cell aggregate, and after the appearance of ACTH-producing cells is confirmed, the third culturing step is continued in the medium containing corticosteroids. The appearance of ACTH-producing cells can be confirmed by immunohistological staining using an antibody against ACTH. When human pluripotent stem cells are used, generally, the appearance of ACTH-producing cells is expected after 37 days from the start of the culturing step in steps (2), (2-1) and (2-2) in the present invention. Thus, in one embodiment, corticosteroids are added to the medium after 37 days from the start of the culturing step in steps (2), (2-1) and (2-2) in the present invention.

The period of treating cell aggregate masses with corticosteroids is not particularly limited as long as differentiation from pituitary placode and/or Rathke's pouch into pituitary hormone-producing cells (excluding ACTH-producing cells) can be promoted. Generally, cell aggregate masses are treated with corticosteroids until promotion of differentiation into pituitary hormone-producing cells (excluding ACTH-producing cells) is confirmed in a corticosteroids treatment group as compared to a corticosteroids non-treatment group. The treatment period is generally, not less than 7 days, preferably not less than 12 days. The upper limit of the treatment period is not particularly set, and corticosteroids may be removed from the medium when promotion of differentiation into pituitary hormone-producing cells (excluding ACTH-producing cells) is confirmed in a corticosteroids treatment group as compared to a corticosteroids non-treatment group.

Due to feedback inhibition, addition of corticosteroids to the medium acts suppressively on the differentiation induction of ACTH-producing cells.

In the present invention, the Notch signal transduction pathway shows a signal transduction pathway activated by direct interaction between Notch protein, which is a receptor expressed on a cell membrane, and Notch ligand (Delta, Jagged, etc.) expressed on the membrane of adjacent cells. In cells in which a Notch signal is transmitted, the Notch protein is stepwisely processed and the intracellular domain excised on the membrane is transported into the nucleus and controls the expression of downstream genes.

The medium to be used in steps (2), (2-1) and (2-2) in the present invention preferably contains a Notch signal transduction pathway inhibitor (Notch signal inhibitor). Notch signal inhibitors promote differentiation from pituitary placode and/or Rathke's pouch into pituitary hormone-producing cells (particularly, ACTH-producing cells). Notch signal inhibitors increase the expression of transcription factor Tbx19 that regulates upstream of ACTH production.

A Notch signal inhibitor may be contained in the medium used in step (1).

The Notch signal inhibitor is not particularly limited as long as it can suppress signal transduction mediated by Notch. It may be any of nucleic acid, protein and low-molecular organic compound. Examples of the substance include functionally deficient Notch receptor and ligand, substances that inhibit Notch processing (S1 cleavage), substances that inhibit sugar chain modification of Notch and Notch ligand, substances that inhibit cell membrane transfer, substances (γ-secretase inhibitors) that inhibit processing (S2 cleavage, S3 cleavage) of intracellular domain (NICD) of Notch, substances that decompose NICD, substances that inhibit NICD-dependent transcription, and the like.

As the Notch signal inhibitor, a compound well known to those of ordinary skill in the art can also be used. As a compound having the activity as a Notch signal inhibitor, for example, DAPT (N—[N-(3,5-difluorophenacetyl)-1-alanyl]-8-phenylglycine t-butyl ester), DBZ, MDL28170, or the substance described in Onco Targets Ther. 2013; 6: 943-955. can be mentioned. Among these, DAPT is preferable.

The concentration of the Notch signal inhibitor in the medium is not particularly limited as long as it can promote differentiation from pituitary placode and/or Rathke's pouch into pituitary hormone-producing cells (particularly, ACTH-producing cells). For example, it is generally not less than 0.1 µM, preferably not less than 1 µM, for DAPT. The upper limit of the DAPT concentration is not particularly set as long as differentiation into pituitary hormone producing cells is not adversely affected. From the aspect of culture cost, it is generally not more than 1000 µM, preferably not more than 100 µM. In one embodiment, the DAPT concentration in the medium is generally 0.1-1000 µM, preferably 1-100 µM (e.g., 10 µM).

3. Cell Mass Containing Pituitary Tissue

The present invention provides a cell mass containing 1) neural cells or neural tissue, 2) pituitary tissue, and 3) mesenchymal cells. In addition, the present invention provides a cell mass containing 1) neural cells or neural tissue, 2) pituitary tissue, and 4) neural crest cells or neural crest-derived cells. It is hereinafter to be also referred to as the cell mass of the present invention. The cell mass of the present invention can be preferably produced by the above-mentioned production method of the present invention.

In the cell mass of the present invention, 1) neural cells or neural tissue are (is) preferably cells or tissue of the central nervous system, or precursor tissue thereof and, as the cell or tissue of the central nervous system, retina, cerebral cortex, diencephalon (e.g., hypothalamus) and the cells derived from such tissues can be mentioned. It is more preferably diencephalon or precursor tissue thereof, further preferably diencephalon having a ventricle-like structure in the tissue or a precursor tissue thereof. The 1) neural cells or neural tissue is, for example, N-Cadherin positive neuroepithelial tissue.

The 2) pituitary tissue in the cell mass of the present invention is preferably formed continuously from nonneural epithelial tissue. More preferably, nonneural epithelial tissue and pituitary tissue cover at least one of 1) neural cells or neural tissue and 3) mesenchymal cells, or nonneural epithelial tissue and pituitary tissue cover at least one of 1) neural cells or neural tissue and 4) neural crest cells or neural crest-derived cells.

It is also preferable that the aforementioned nonneural epithelial tissue is mouth cavity epithelium or precursor tissue thereof. The pituitary tissue preferably contains pituitary hormone-producing cells, preferably contains pituitary tissue stem cells, preferably contains folliculostellate cells, more preferably contains all of pituitary hormone producing cells, pituitary tissue stem cells, and folliculostellate cells. As the pituitary hormone-producing cell, at least one kind selected from the group consisting of growth hormone (GH)-producing cell, prolactin (PRL)-producing cell and adrenocorticotropic hormone (ACTH)-producing cell can be mentioned.

It is also preferable that the pituitary niche is formed in the pituitary tissue, it is also preferable that the pituitary niche is an MCL niche-like structure around the residual cavity remaining between the anterior pituitary and the middle pituitary, it is also preferable that the pituitary niche is a parenchymal layer niche-like structure, and it is more preferable that it contains both an MCL niche-like structure and a parenchymal layer niche-like structure.

In the cell mass of the present invention, 3) mesenchymal cells are preferably cranial mesenchymal cells.

The 3) mesenchymal cells are preferably present between nonneural epithelial tissue coating a surface of the cell mass and 1) neural cells or neural tissue present inside the cell mass.

In the cell mass of the present invention, 4) neural crest cells or neural crest-derived cells are preferably a cranial neural crest cell or cranial neural crest-derived cell.

The 4) neural crest cells or neural crest-derived cells are preferably present between nonneural epithelial tissue coating a surface of the cell mass and 1) neural cells or neural tissue present inside the cell mass. The 4) neural crest cells or neural crest-derived cells are also preferably 3) mesenchymal cells.

In the cell mass of the present invention, for example, ventricle-like vacuoles are formed inside the 1) neuroepithelial tissue, and the surface of the 1) neuroepithelial tissue in contact with the vacuoles is aPKC-zeta positive apical surface.

The 3) mesenchymal cells contained in the cell mass of the present invention expresses, for example, at least one kind of mesenchymal cell marker selected from the group consisting of Nestin, Vimentin, Cadherin-11, Laminin, CD44, CD90, and CD105.

The 3) neural crest cell or neural crest-derived cell contained in the cell mass of the present invention expresses, for example, at least one kind of neural crest cell marker selected from the group consisting of Nestin, Sox10, Slug, Snail, Pax3, Zic1, FoxD3, p75 NTR, HNK-1, CHD7, Numb, and Ascl1.

The nonneural epithelial tissue that can be contained in the present invention expresses, for example, at least one kind of nonneural epithelial tissue marker selected from the group consisting of cytokeratin, E-Cadherin, and EpCAM.

The pituitary tissue stem cell that can be contained in the cell mass of the present invention expresses, for example, at least one kind of pituitary stem cell marker selected from the group consisting of Sox2, Sox9, E-Cadherin, Nestin, s100β, GFRα2, Prop1, CD133, β-Catenin, Klf4, Oct4, Pax6, Coxsackievirus and adenovirus common receptor (CXADR), PRRX1/2, Ephrin-B2, and ACE.

4. Production Method of Pituitary Tissue

The present invention provides a production method of pituitary tissue and the method includes the following steps (1)-(3):

(1) a first step of suspension-culturing pluripotent stem cells to form a cell aggregate in the presence of a Wnt signal transduction pathway inhibiting substance, (2) a second step of suspension-culturing the aggregate obtained in the first step in the presence of a BMP signal transduction pathway activating substance and a Sonic hedgehog signal transduction pathway activating substance, thereby obtaining a cell mass containing pituitary tissue, (3) a third step of collecting pituitary tissue from the cell mass obtained in the second step.

The first step and the second step can be performed in the same manner as in the first step and second step of the above-mentioned "2. Production method of cell mass containing pituitary tissue". When desired, step a may be performed before the first step. When desired, second step (1) and second step (2) may be performed instead of the second step.

The third step of collecting the pituitary tissue from the cell mass obtained in the second step or second step (2) is generally performed by detaching and collecting pituitary tissue formed outside the cell mass (Rathke's pouch part) by using tweezers and the like under microscopic observation. The pituitary tissue can be distinguished as, for example, as described in Nature communications, 2016, 7, a semitransparent thin epithelium on the surface layer of the obtained cell mass. As a method for collecting the pituitary tissue in the third step, a freeze-thawing method, preferably a slow freezing method, can also be used. According to the method, a cell mass having pituitary tissue on the outside and mesenchymal nerve and neuroepithelial tissue in the inside is subjected to freeze-thawing whereby the pituitary tissue on the outside is detached from the cell mass without a physical treatment.

5. Reagent for Evaluation of Toxicity and Efficacy, and Toxicity and Efficacy Evaluation Method The cell mass of the present invention, a cell mass produced by the production method of the present invention, or tissue collected from the cell mass may be pituitary tissue. Therefore, a reagent for evaluating the toxicity and efficacy of a test substance containing the cell mass of the present invention, a cell mass produced by the production method of the present invention, or pituitary tissue collected from the cell mass can be provided.

Also, the present invention can provide a method for evaluating toxicity or efficacy by using the aforementioned cell mass or pituitary tissue recovered from the cell mass.

For example, a method for evaluating toxicity or efficacy of a test substance, including a step of bringing a cell mass or pituitary tissue collected from the cell mass into contact with a test substance, and a step of detecting an influence of the test substance on the cell mass or pituitary tissue can be mentioned.

6. Therapeutic Drug and Treatment Method of Disease

A therapeutic drug for a disease due to a disorder of pituitary gland containing the cell mass of the present invention, a cell mass produced by the production method of the present invention, or pituitary tissue collected from the cell mass can be provided.

Examples of the therapeutic drug for a disease due to a disorder of pituitary gland include a graft containing a suspension containing the cell mass of the present invention or a cell mass produced by the production method of the present invention.

Examples of the suspension include a liquid obtained by suspending a cell mass in an artificial lacrimal fluid or physiological saline. The suspension may contain nonneural epithelial cells isolated from the cell mass, and may also contain a factor that promotes adhesion of the cells, such as extracellular matrix, and hyaluronic acid.

The pituitary tissue recovered from a cell mass may also be used instead of the cell mass.

Furthermore, a method for treating a disease due to a disorder of pituitary gland, including a step of transplanting an effective amount of pituitary tissue from the cell mass of the present invention, a cell mass produced by the production method of the present invention to a target in need of the transplantation can be provided.

The aforementioned disease due to a disorder of pituitary gland may be an animal disease due to a disorder of pituitary gland, or a disease due to a disorder of pituitary gland in a non-human animal. As the disease due to a disorder of pituitary gland, panhypopituitarism, pituitary dwarfism, Hypoadrenocorticism, partial hypopituitarism, pituitary anterior hormone isolated deficiency and the like can be specifically mentioned.

The present invention is explained in more detail in the following by referring to Examples, which are not to be construed as limiting the scope of the present invention. Unless particularly limited, the reagents and materials to be used are commercially available.

EXAMPLE

Example 1: Cell Mass Containing Pituitary Tissue Produced from Human ES Cell Human ES cells (KhES-1 strain, obtained from Kyoto University) were cultured under feeder-free conditions according to the method described in Scientific Reports, 4, 3594 (2014). As the feeder-free medium, StemFit medium was used and, as the feeder-free scaffold, Laminin 511-E8 was used.

As specific maintenance culturing operation, subconfluent human ES cells (KhES-1 strain) were first washed with PBS, subjected to an enzyme treatment using Accumax (manufactured by Innovative Cell Technologies), StemFit medium was added, and the cells were scraped from the surface of the culture dish by using a cell scraper and dispersed into single cells by pipetting. Thereafter, the aforementioned human ES cells dispersed into single cells were seeded in a plastic culture dish coated with Laminin 511-E8, and cultured under feeder-free conditions in StemFit medium in the presence of Y27632 (ROCK inhibiting substance, manufactured by Wako Pure Chemical Industries, Ltd., 10 µM). When a 6-well plate (manufactured by Corning, for cell culturing, culture area 9.5 cm$^2$) was used as the aforementioned plastic culture dish, the number of plated cells of the aforementioned human ES cells dispersed into single cells was adjusted to $1.2 \times 10^4$. One day after seeding, the entire amount of the medium was changed with StemFit medium free of Y27632. Thereafter, once in 1-2 days, the entire amount of the medium was changed with StemFit medium free of Y27632. Thereafter, the cells were cultured until 7 days after seeding when they reached subconfluence (60% of culture area is covered with cells). When the cultured cells were used for differentiation induction, SB-431542 (TGFβ signal transduction pathway inhibiting substance, manufactured by Wako Pure Chemical Industries, Ltd., 5 μM) and SAG (Shh signal transduction pathway activating substance, manufactured by Enzo Life Sciences, 300 nM) were added at 6 days after seeding and simultaneously with the medium change with Stemfit medium.

The thus-prepared subconfluent human ES cells were washed with PBS, subjected to an enzyme treatment using Accumax, a serum-free medium for differentiation induction was added, and the cells were scraped from the surface of the culture dish by using a cell scraper and dispersed into single cells by pipetting. Thereafter, the aforementioned human ES cells dispersed into single cells were suspended in 100 μl of a serum-free medium at $1 \times 10^4$ cells per well of a non-cell-adhesive 96-well culture plate (PrimeSurface 96V-bottom plate, manufactured by SUMITOMO BAKELITE), and cultured in suspension under the conditions of 37° C., 5% $CO_2$. As the serum-free medium (gfCDM+KSR) therefor, a serum-free medium which is a 1:1 mixture of F-12+Glutamax medium (manufactured by Thermo Fisher Scientific) and IMDM+Glutamax medium (manufactured by Thermo Fisher Scientific) supplemented with 5% Knockout Serum Replacement (manufactured by Thermo Fisher Scientific), 450 μM 1-monothioglycerol (manufactured by Wako Pure Chemical Industries, Ltd.), 1× Chemically defined lipid concentrate (manufactured by Thermo Fisher Scientific), 50 unit/ml penicillin-50 μg/ml streptomycin (manufactured by Nacalai Tesque) was used. At the time of the start of suspension culturing (day 0 from the start of suspension culturing, start of step 1), Y27632 (final concentration 20 μM), IWP-2 (Wnt signal transduction pathway inhibiting substance, manufactured by Tocris Bioscience, 2 μM), and SB-431542 (TGFβ signal transduction pathway inhibiting substance, manufactured by Wako Pure Chemical Industries, Ltd., 1 μM) were added to the aforementioned serum-free medium.

On day 2 from the start of the suspension culturing, a serum-free medium not containing Y27632 and containing IWP-2, SB-431542, BMP4 (BMP signal transduction pathway activating substance), and SAG was added at 100 μl per well. BMP4 was added at 3 nM to the medium so that the final concentration in the well would be 1.5 nM, and SAG was added at 4 μM to the medium so that the final concentration in the well would be 2 μM. Thereafter, a half amount of the medium was changed with a serum-free medium not containing Y27632 or BMP4 and containing IWP-2, SB-431542, and SAG was added at 6, 10, 13, 17, 21, and 24 days from the start of suspension culturing.

Cell masses were collected in a dish 28 days from the start of suspension culturing, and subjected to bright field observation under an inverted microscope (manufactured by KEYENCE CORPORATION, BIOREVO) (FIGS. 1A-B). The scale bar at the lower right of FIG. 1A shows 1000 μm, and the scale bar at the lower right of FIG. 1B shows 200 μm. As a result, by day 28 suspension culturing, cell masses with a diameter of about 1 mm and containing neural tissue and nonneural epithelial tissue were formed from human ES cells by the above-mentioned differentiation induction method. An epithelium-like structure with a thickness of around 30 μm was formed on the surface of the cell mass.

The aforementioned cell masses at 28 days from the start of suspension culturing were each fixed with 4% paraformaldehyde at room temperature for 15 min, immersed in 20% sucrose/PBS at 4° C. overnight to be subjected to a cryoprotection treatment, and cryosections were prepared. The cryosections were subjected to fluorescence immunostaining with an anti-Lhx3 antibody (manufactured by Merck Millipore, rabbit) which is an initial marker of pituitary gland, an anti-Emx2 antibody (manufactured by R&D Systems, sheep) which is a placode marker, a Pitx1 antibody (manufactured by Santa Cruz Biotechnology, goat) which is a mouth cavity epithelial or pituitary placode marker, an anti-Nkx2.1 antibody (manufactured by Merck Millipore, mouse) which is a ventral diencephalon marker, an anti-Tbx3 antibody (manufactured by R&D Systems, goat), an anti-Sox3 antibody (manufactured by R&D Systems, goat), an anti-CD326/EpCAM antibody (manufactured by Acris Antibodies, mouse) and an anti-pan-cytokeratin antibody (manufactured by Sigma Aldrich, mouse) which are nonneural epithelial tissue markers, an anti-Nestin antibody (manufactured by Spring Bioscience, rabbit) which is an undifferentiated nerve and neural crest or mesenchymal cell marker, an anti-Laminin antibody (manufactured by KYOWA PHARMA CHEMICAL CO., LTD., mouse) which is a base membrane marker, an anti-aPKC antibody (manufactured by Santa Cruz Biotechnology, rabbit) which is an apical surface marker, and an anti-βIII tubulin (Tuj1) antibody (manufactured by Sigma Aldrich, mouse) which is a nerve cell marker. Multiple staining was performed using, as fluorescence-labeled secondary antibodies, an Alexa488-labeled donkey anti-rabbit antibody (manufactured by Thermo Fisher Scientific), a CF555-labeled donkey anti-mouse antibody (manufactured by Biotium), a CF555-labeled donkey anti-goat antibody, a CF543-labeled donkey anti-sheep antibody, and an Alexa647-labeled donkey anti-mouse antibody. Hoechst33342 (manufactured by Sigma Aldrich) was used for comparison staining of nucleus. FIG. 1E is a comparison nuclear-stained image of FIGS. 1C and D, FIG. 1H is that of FIGS. 1F and G, FIG. 1K is that of FIGS. 1I and J, FIG. 1N is that of FIGS. 1L and M, FIG. 1Q is that of FIGS. 1O and P, FIG. 1U is that of FIGS. 1S and T, and FIG. 1X is that of FIGS. 1V and W. Upright fluorescence microscope Axio Imager M2 (manufactured by Carl Zeiss) and the attached software, Axio Vision, were used for observation and obtainment of images of the stained sections. The scale bar at the lower right of FIGS. 1C-E, FIG. 1F shows 200 μm, the scale bar at the lower right of FIG. 1I, FIG. 1L, FIG. 1O, FIG. 1S shows 100 μm, and the scale bar at the lower right of FIG. 1V shows 50 μm.

As a result, it was found that the inside of the cell masses on day 28 from the start of suspension culturing which were induced by the above-mentioned differentiation induction method was Nkx2.1, Tbx3, Sox3, βIII tubulin positive neuroepithelial tissue of ventral diencephalon or hypothalamus (FIGS. 1D, G, L, O, P), and the outside was EpCAM, pan-cytokeratin positive nonneural epithelial tissue (FIGS. 1M, W). It was found that the further inside of the inner neuroepithelial tissue was an aPKC-zeta-positive apical surface, and ventricle-like tissue which is a vacuole in which cells are not present was formed (FIG. 1I, * part). A base membrane-like structure formed from laminin and the like was found in the inside of the outer nonneural epithelial tissue (FIG. 1J). Furthermore, it was found that a part of the nonneural epithelial tissue was Lhx3, Emx2, Pitx1 positive, and a Rathke's pouch-like structure formed by invaginated nonneural epithelial tissue and pituitary placode were formed (FIGS. 1C, F, S, V). In addition, Nestin-positive, pan-cytokeratin, laminin-weakly positive, βIII tubulin-negative cranial mesenchymal cell was present between the outer nonneural epithelial tissue and the inner neuroepithelial tissue. From the above-mentioned results, it was shown that, according to the production method of the present invention, a mass containing nonneural epithelium, neuroepithelium, and mesenchymal cells, and having an outside covered by nonneural epithelium, ventral diencephalon or hypothalamus-like neuroepithelial tissue having a ventricle-like structure in the inside is formed, and cranial mesenchymal cell is present between nonneural epithelium and neuroepithelium, and a part of outer nonneural epithelium is pituitary placode can be produced. A schematic showing of the cell mass on day 28 from the start of suspension culturing is shown in FIG. 1Y.

Example 2: Maturation by Long-Term Culturing of Cell Mass Containing Pituitary Tissue Produced from Human ES Cell Human ES cells (KhES-1 strain, obtained from Kyoto University) were cultured under feeder-free conditions according to the method described in Scientific Reports, 4, 3594 (2014). As the feeder-free medium, StemFit medium was used and, as the feeder-free scaffold, Laminin 511-E8 was used.

Specific maintenance culturing operation was performed in the same manner as in Example 1.

Thereafter, suspension culturing in a 96 well plate was performed under conditions similar to those in Example 1.

On day 28 from the start of suspension culturing, cell masses were placed in a 10 cm dish for suspension culturing (manufactured by SUMITOMO BAKELITE CO., LTD.) at 48 cell masses per one dish, and cultured in suspension in a serum-free medium up to day 84 of culturing. As the serum-free medium (gfCDM+KSR) therefor, a serum-free medium which is a 1:1 mixture of F-12+Glutamax medium (manufactured by Thermo Fisher Scientific) and IMDM+Glutamax medium (manufactured by Thermo Fisher Scientific) supplemented with 10% Knockout Serum Replacement (manufactured by Thermo Fisher Scientific), 450 µM 1-monothioglycerol (manufactured by Wako Pure Chemical Industries, Ltd.), 1× Chemically defined lipid concentrate (manufactured by Thermo Fisher Scientific), 50 unit/ml penicillin-50 µg/ml streptomycin (manufactured by Nacalai Tesque), and 2 µM SAG was used at 15 ml per one dish, and a half amount of the medium was changed every 3 to 4 days.

Figure 2:
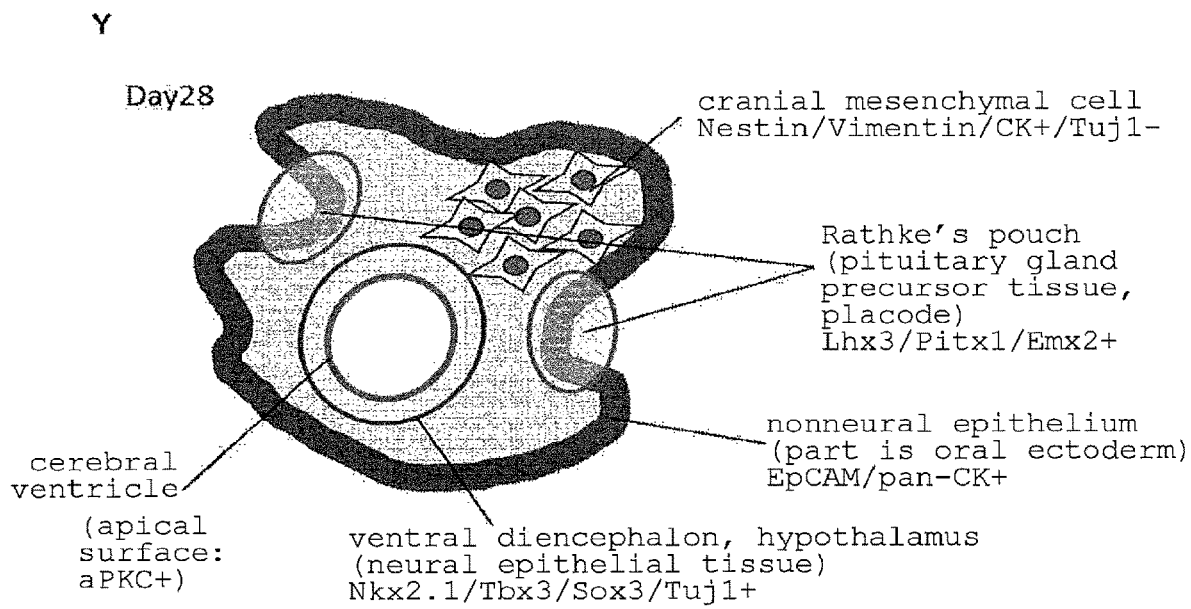
Figure 2:
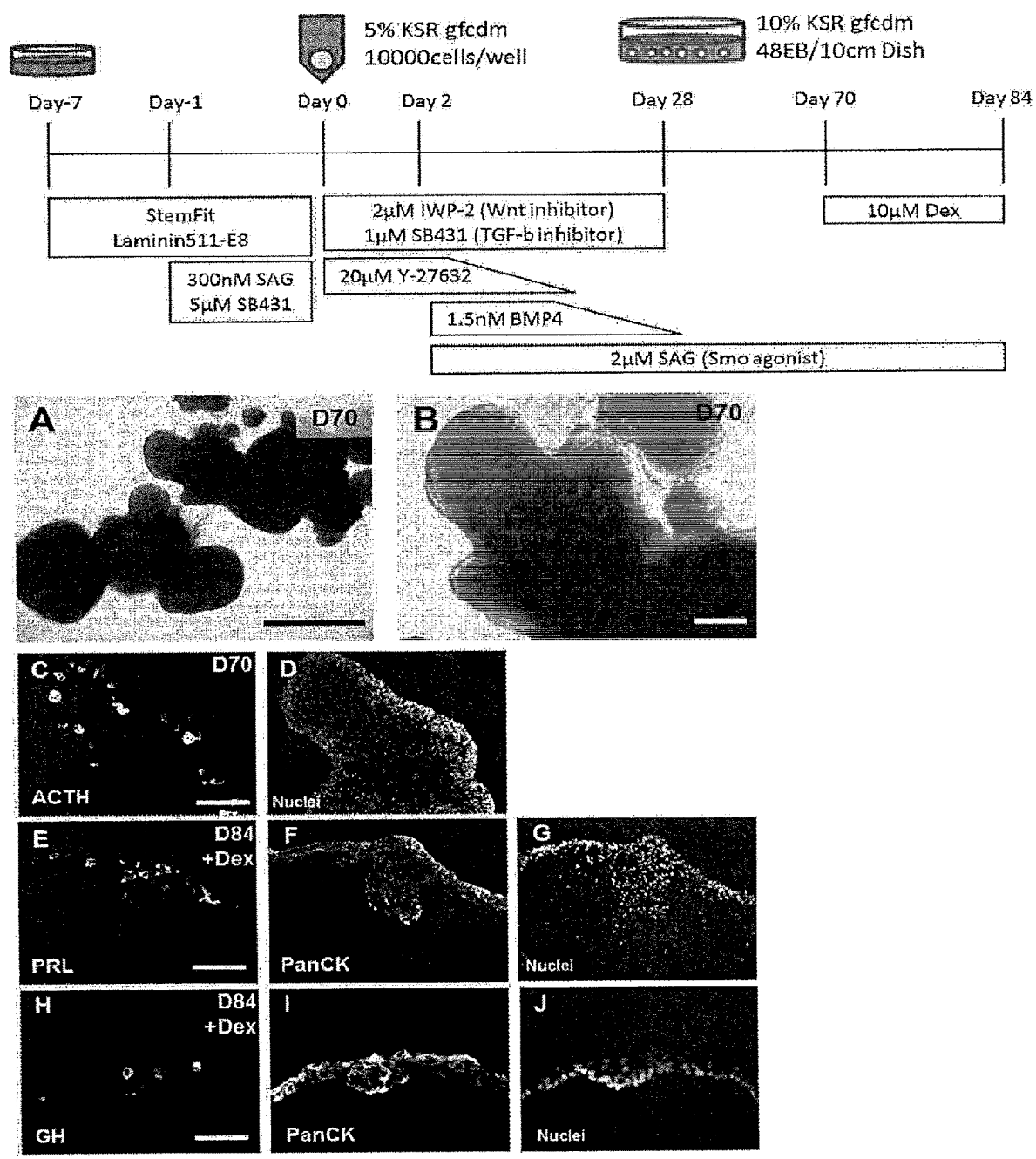

The aforementioned cell masses on day 70 from the start of suspension culturing were subjected to bright field observation under an inverted microscope (manufactured by KEYENCE CORPORATION, BIOREVO) (FIGS. 2A, B). The scale bar at the lower right of FIG. 2A shows 1000 µm, and the scale bar at the lower right of FIG. 2B shows 200 µm. As a result, it was found that cell mass covered by epithelial tissue with a thickness of around 100 µm was formed on day 70 from the start of suspension culturing. A part of the above-mentioned cell masses were fixed with 4% para-formaldehyde, and the remaining cell masses were further cultured in suspension. As the medium therefor, the above-mentioned serum-free medium further supplemented with 10 µM Dexamethasone (manufactured by Sigma Aldrich, mouse) was used. After culturing up to day 84 from the start of suspension culturing, the cells were fixed with 4% para-formaldehyde. Cryosections were produced by a method similar to that in Example 1 from the above-mentioned cell masses on day 70 and day 84 of the culturing, and subjected to fluorescence immunostaining and observation using an anti-adrenocorticotropic hormone (ACTH) antibody (manufactured by Lab Vision, mouse), an anti-prolactin (PRL) antibody (manufactured by Cell Marque, rabbit), an anti-growth hormone antibody (manufactured by R&D Systems, goat) which are hormone producing cell markers of pituitary gland and an anti-pan-cytokeratin antibody which is a nonneural epithelial tissue marker and according to a method similar to that in Example 1. FIG. 2D is a comparison nuclear-stained image of FIG. 2C, FIG. 2G is that of FIGS. 2E and F, and FIG. 2J is that of FIGS. 2H and I. The scale bar at the lower right of FIG. 2C, FIG. 2E shows 100 µm, and the scale bar at the lower right of FIG. 2H shows 50 µm.

As a result, the cell mass on day 70 from the start of suspension culturing contained an ACTH positive cell which is a hormone producing cell marker of pituitary gland (FIG. 2C).

Furthermore, the cell mass on day 84 from the start of suspension culturing and cultured for 14 days with addition of Dexamethasone contained PRL positive cells and GH positive cells which are hormone producing cell markers of pituitary gland (FIGS. 2E, H). From these results, it was found that differentiation of hormone producing cells of pituitary gland from human pluripotent stem cells was induced by the above-mentioned differentiation induction method.

Reference Example 1: Consideration of Timing of Addition of BMP4 in Production of Cell Mass Containing Pituitary Tissue from Human ES Cells (1)

Human ES cells (KhES-1 strain, obtained from Kyoto University) were cultured under feeder-free conditions according to the method described in Scientific Reports, 4, 3594 (2014). As the feeder-free medium, StemFit medium was used and, as the feeder-free scaffold, Laminin 511-E8 was used.

Specific maintenance culturing operation was performed in the same manner as in Example 1.

Thereafter, suspension culturing in a 96 well plate was started under conditions similar to those in Example 1.

Figure 3:
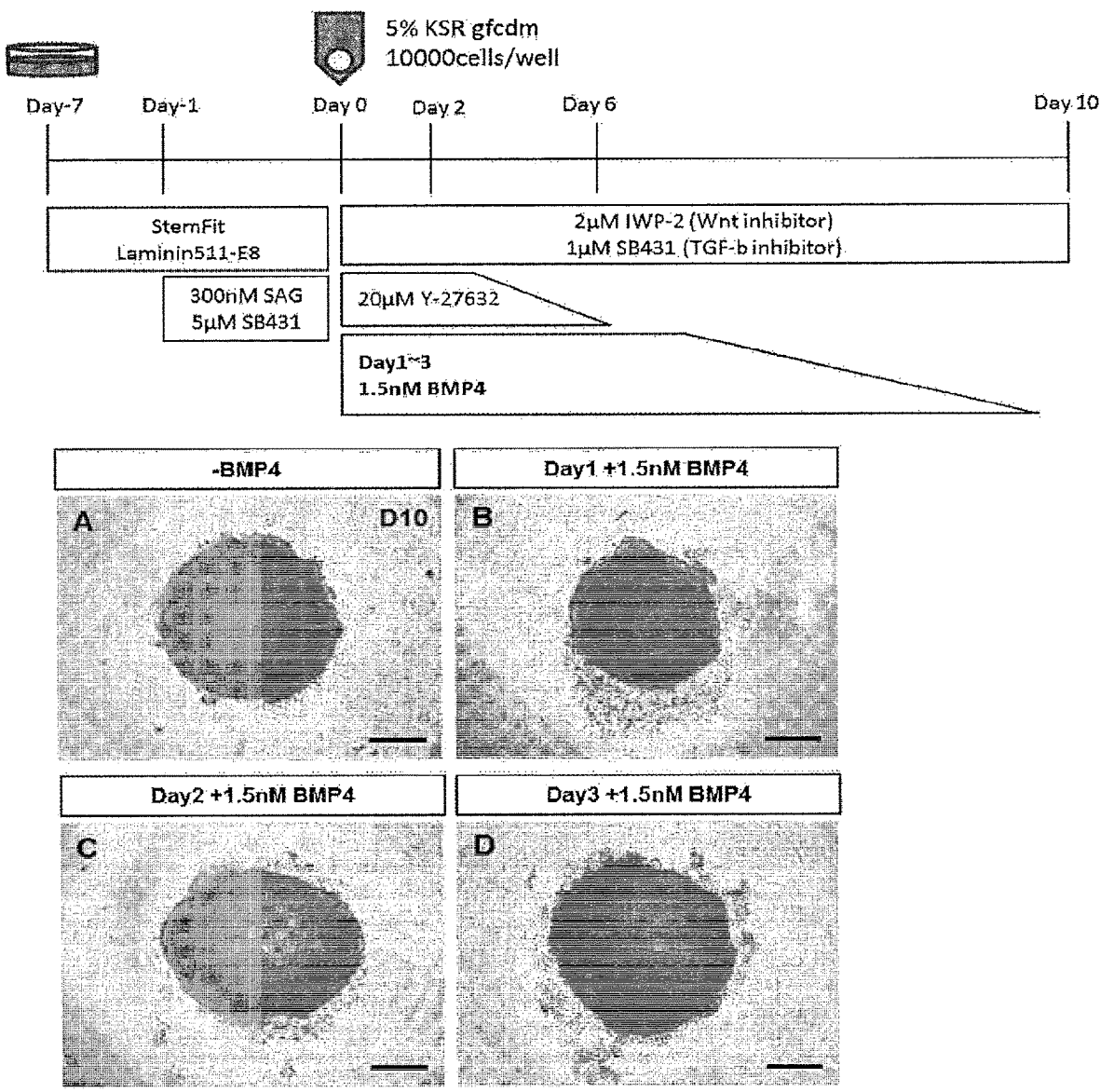
FIG. 3. The upper panel of FIG. 3 is a diagram schematically showing a procedure for producing a cell mass containing pituitary tissue from human ES cells by changing the time of addition of BMP4 in Reference Example 1. The lower panels A-D are diagrams showing bright-field observation images by an inverted microscope of the cell masses 10 days from the start of suspension culturing in Reference Example 1. Diagrams of bright-field observation images by an inverted microscope of the cell masses 10 days from the start of suspension culturing and formed from A: control cells without addition of BMP4, and B-D: cells added with BMP4 on days 1, 2 and 3, respectively, from the start of suspension culturing.

The condition without addition of a BMP signal transduction pathway activating substance during the suspension culturing period was taken as the control (-BMP4 condition, FIG. 3A). Thereafter, in the condition with the addition of a BMP signal transduction pathway activating substance on days 1, 2 or 3 from the start of suspension culturing (Day1-3+BMP4 condition, FIGS. 3B-D), a serum-free medium not containing Y27632 and containing IWP-2, SB-431542, BMP4 was added at 100 µl per well. BMP4 was added at 3 nM to the medium so that the final concentration in the well would be 1.5 nM. A half amount of the medium was changed with a serum-free medium not containing Y27632 or BMP4 and containing IWP-2 and SB-431542 on day 6 from the start of suspension culturing. On day 10 from the start of suspension culturing, bright field observation was performed using an inverted microscope (manufactured by KEYENCE CORPORATION, BIOREVO) (FIGS. 3A-D). The scale bar at the lower right of FIGS. 3A-D shows 200 µm.

As a result, under the condition without addition of BMP4, embryoid body with a smooth surface was formed, and a nonneural epithelium-like structure could not be confirmed on the embryoid body surface (FIG. 3A). In the condition with the addition of BMP4 on day 1 and day 2 from the start of differentiation induction (Day1, 2+BMP4), cell masses containing neural tissue and nonneural epithelial tissue and having a two-layer structure in which a center part with a neuroepithelium-like structure is covered with a nonneural epithelium-like layer were formed (FIGS. 3B, C). By a comparison of the both conditions, addition of BMP4 on day 2 resulted in the formation of embryoid body (FIG. 3C) larger than the embryoid body obtained under the condition with the addition of BMP4 on day 1 (FIG. 3B). In the condition with the addition of BMP4 on day 3 and day 6 from the start of differentiation induction, outer nonneural epithelium-like tissue was not formed, but an embryoid body only composed of neuroepithelium-like tissue with smooth surface was formed (FIG. 3D). From the above-mentioned results, it was found that addition of a BMP signal transduction pathway activating substance within 72 hr from the start of suspension culturing is effective for the formation of a cell mass coated with nonneural epithelial tissue to be the base of future pituitary tissue from human pluripotent stem cells.

Example 3: Consideration of Timing of Addition of BMP4 in Production of Cell Mass Containing Pituitary Tissue from Human so ES Cells (2)

Human ES cells (KhES-1 strain, obtained from Kyoto University) were cultured under feeder-free conditions according to the method described in Scientific Reports, 4, 3594 (2014). As the feeder-free medium, StemFit medium was used and, as the feeder-free scaffold, Laminin 511-E8 was used.

Specific maintenance culturing operation was performed in the same manner as in Example 1.

Thereafter, suspension culturing in a 96 well plate was started under conditions similar to those in Example 1.

Figure 4:
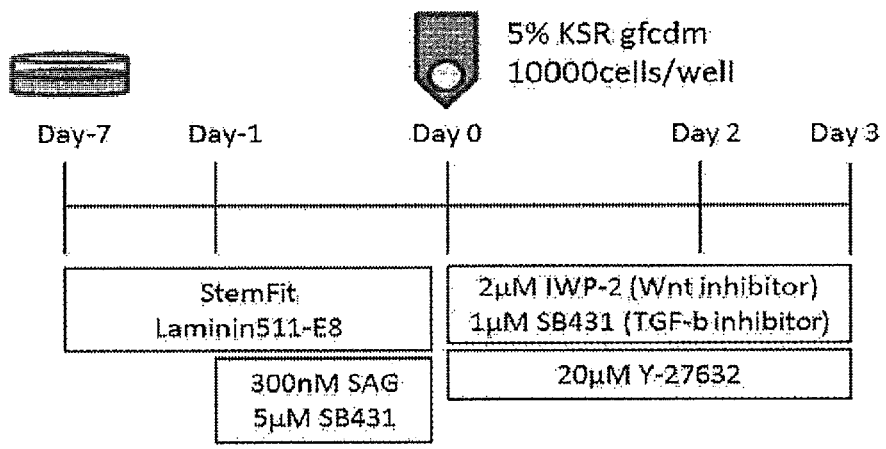
FIG. 4. The upper panel of FIG. 4 is a diagram schematically showing a procedure for preparing a cell aggregate from human ES cells in Example 3. The lower panels A and B are diagrams showing bright-field observation images by an inverted microscope of the cell aggregate respectively 2 and 3 days from the start of suspension culturing in Example 3. The lower panels C-H show the results of examination by fluorescent immunostaining of the expression state of each cell marker in the cell aggregate 2 or 3 days from the start of suspension culturing. C shows stained image of ZO-1 in the cell aggregate 2 days from the start of suspension culturing, and F shows stained image of ZO-1 in the cell aggregate 3 days from the start of suspension culturing. D shows stained image of Sox2 in the cell aggregate 2 days from the start of suspension culturing, and G shows stained image of Sox2 in the cell aggregate 3 days from the start of suspension culturing. E is comparison nuclear-stained image relative to C and D, and H relative to F and G.
Figure 4:
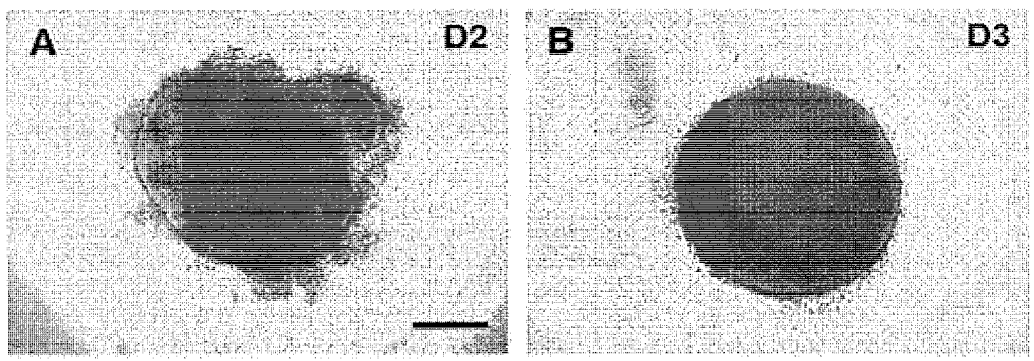
Figure 4:
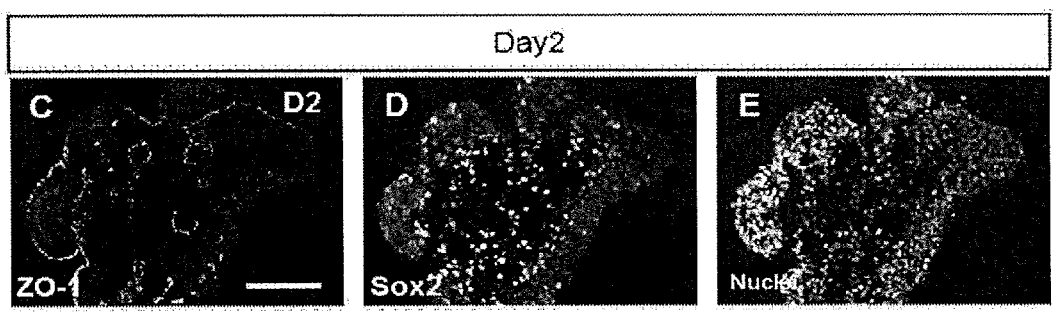
Figure 4:
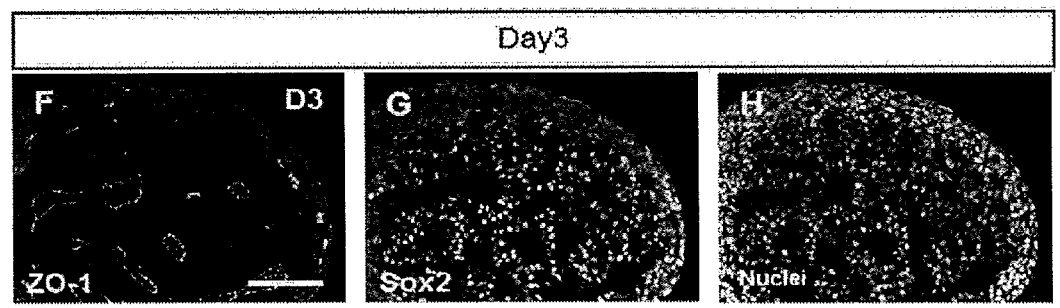

Without adding a medium, bright field observation of aggregates was performed using an inverted microscope on day 2 and day 3 from the start of suspension culturing. The scale bar at the lower right of FIG. 4A shows 200 µm. As a result of m observation, the aggregate on day 2 from the start of suspension culturing which is suitable for the addition of BMP4 showed concaves and convexes on the surface, and had a distorted shape (FIG. 4A). On the other hand, the aggregate on day 3 from the start of suspension culturing showed a decrease in the concaves and convexes found on day 2, and had a shape close to a sphere (FIG. 4B).

The aforementioned, the aggregates on day 2 and day 3 from the start of suspension culturing were fixed by the method described in Example 1 and cryosections were prepared. The cryosections were subjected to fluorescence immunostaining using an anti-ZO-1 antibody (manufactured by Thermo Fisher Scientific, rabbit) which is a tight junction marker, and an anti-Sox2 antibody (manufactured by Santa Cruz Biotechnology, goat) which is a neural stem cell and pluripotent stem cell marker. The fluorescence-labeled secondary antibody and comparison staining of nucleus used were those described in Example 1. The scale bar at the lower right of FIG. 4C shows 100 µm. As a result, in the aggregate on day 2 from the start of suspension culturing, a part of the cells closest to the surface layer of the aggregate was ZO-1 positive and formed a tight junction (FIG. 4C). On the other hand, in the aggregate on day 3 from the start of suspension culturing, ZO-1 positive cells were taken up inside the aggregate and localization was not seen on the outermost layer (FIG. 4F). In addition, in the aggregate on day 3 from the start of suspension culturing, the two-layer structure of the region where the cells in the outer layer are more closely adhered to each other and the region where the cells inside the aggregate are sparse could be more clearly confirmed (FIGS. 4D, G). From the above-mentioned results, it was found that detection of tight junction of the cells in the outermost layer of aggregates can be used as a method for determining the timing of addition of BMP4 in the process of producing a cell mass containing neural tissue and nonneural epithelial tissue.

Example 4: Consideration of Addition Conditions of Sonic Hedgehog Signal Transduction Pathway Activating Substance in the Production of Cell Mass Containing Pituitary Tissue from Human ES Cell Human ES cells (KhES-1 strain, obtained from Kyoto University) were cultured under feeder-free conditions according to the method described in Scientific Reports, 4, 3594 (2014). As the feeder-free medium, StemFit medium was used and, as the feeder-free scaffold, Laminin 511-E8 was used.

Specific maintenance culturing operation was performed in the same manner as in Example 1.

Thereafter, suspension culturing in a 96 well plate was started under conditions similar to those in Example 1.

A serum-free medium not containing Y27632 and containing IWP-2, SB-431542, BMP4, and SAG was added at 100 µl per well on day 2 from the start of suspension culturing. BMP4 was added at 3 nM to the medium so that the final concentration in the well would be 1.5 nM. SAG was added at a final concentration of 100, 300, 500, 700 nM, 1, 2, 5 µM as a Sonic hedgehog signal transduction pathway activating substance. The condition without addition of a Sonic hedgehog signal transduction pathway activating substance during the suspension culturing period was taken as the control (-SAG condition, FIG. 5A).

A half amount of the medium was changed with a serum-free medium not containing Y27632 or BMP4, and containing IWP-2, SB-431542, each concentration of SAG on days 6, 10, 13, 17, 21, 24 from the start of suspension culturing.

Figure 5:
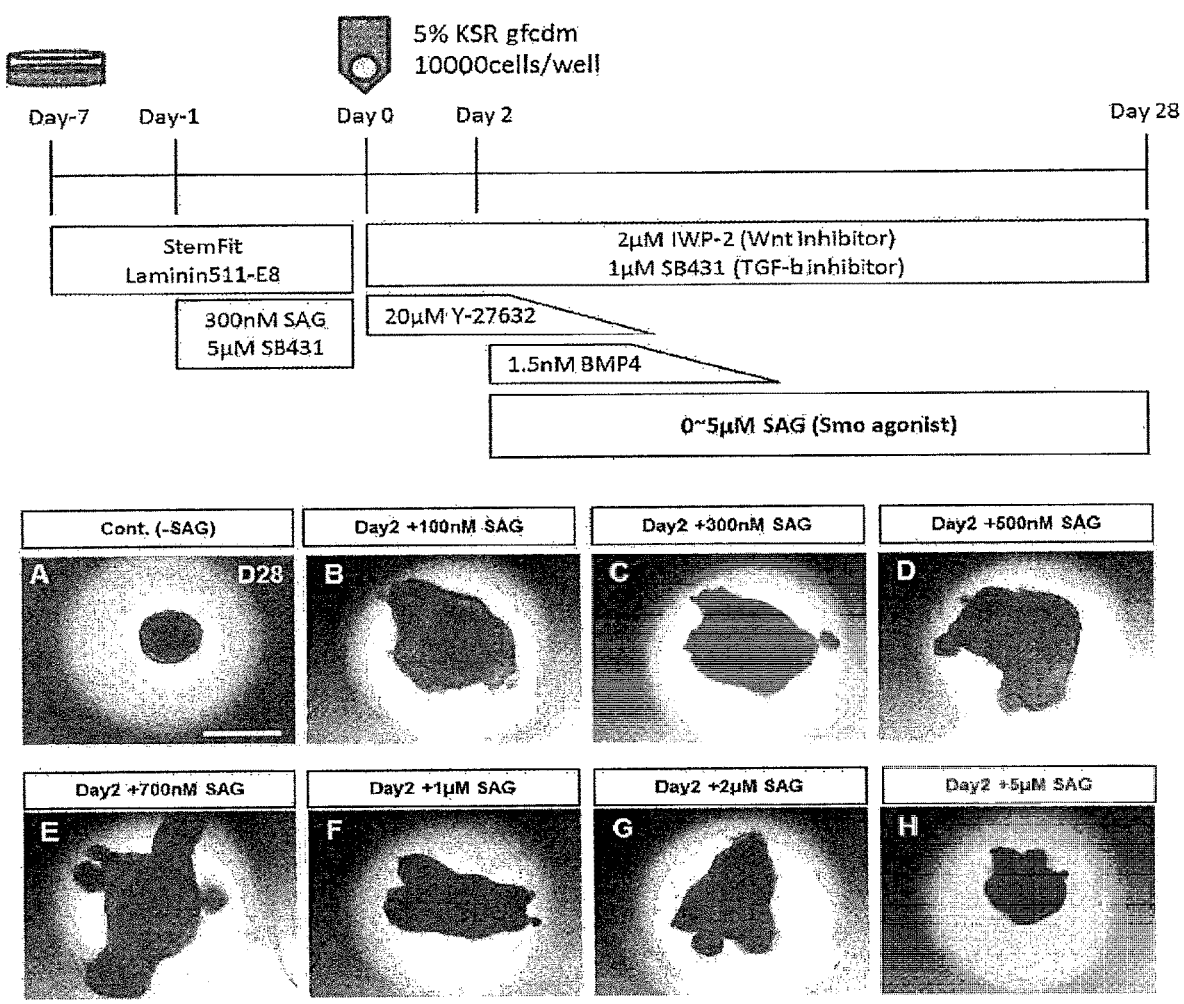
FIG. 5. The upper panel of FIG. 5 is a diagram schematically showing a procedure for producing a cell mass containing pituitary tissue from human ES cells by changing the addition concentration of SAG in Example 4. The lower panel A-H are diagrams showing bright-field observation images by an inverted microscope of the cell masses 28 days from the start of suspension culturing in Example 4. A is a diagram showing bright-field observation image by an inverted microscope of the control cell without addition of SAG, and B-H are diagrams showing bright-field observation images by an inverted microscope of the cell masses formed from cells each added with 100, 300, 500, 700 nM, 1, 2, 5 µM of SAG on day 2 from the start of suspension culturing.

Bright field observation was performed under an inverted microscope (manufactured by KEYENCE CORPORATION, BIOREVO) on day 28 from the start of suspension culturing (FIGS. 5A-H). The scale bar at the lower right of FIG. 5A shows 1000 µm.

As a result, under the conditions without addition of SAG during suspension culturing, about spherical tissue having a nonneural epithelial-like structure was formed on the surface of the cell mass (FIG. 5A). On the other hand, under the conditions with the addition of each concentration of SAG, cell masses with the nonneural epithelial tissue invaginated like Rathke's pouch on the surface and containing neuroepithelium-like tissue and mesenchymal cells in the inside, which were larger than those under conditions without addition of SAG, were formed (FIGS. 5B-H). From the above-mentioned results, it was found that an appropriate concentration of SAG during suspension culturing is 100 nM to 5 µM for the production of a cell mass having pituitary tissue. Particularly, in the conditions in which SAG was added on day 2 of culturing at a final concentration of 100 nM, 300 nM, 500 nM, 700 nM, 1 µM or 2 µM (FIGS. 5B-G), the size of the cell mass was larger and formation of pituitary tissue on the surface of cell mass was fine as compared to the conditions with addition at 5 µM (FIG. 5H).

Example 5: Effect of Compound Treatment Before Differentiation Induction in Production of Cell Mass Containing Pituitary Tissue from Human ES Cells Human ES cells (KhES-1 strain) were cultured under feeder-free conditions according to the method described in Scientific Reports, 4, 3594 (2014). As the feeder-free medium, StemFit medium was used and, as the feeder-free scaffold, Laminin 511-E8 was used. Specific maintenance culturing operation was performed in the same manner as in Example 1.

As a pre-treatment for differentiation induction of the cultured cells, cells under 4 conditions were maintenance cultured under conditions in which, condition in which nothing is simultaneously added with medium change with Stemfit medium (Control), conditions in which 300 nM SAG alone is added (+300 nM SAG), conditions in which 5 µM SB-431542 alone is added (+5 µM SB-431542), and conditions in which SAG and SB431542 are simultaneously added (+SAG/SB) at 6 days after seeding.

The next day of the above-mentioned treatment, human ES cells under 4 conditions that reached subconfluence were each subjected to differentiation induction by suspension culturing into a cell mass containing pituitary tissue according to the method described in Example 1.

Figure 6:
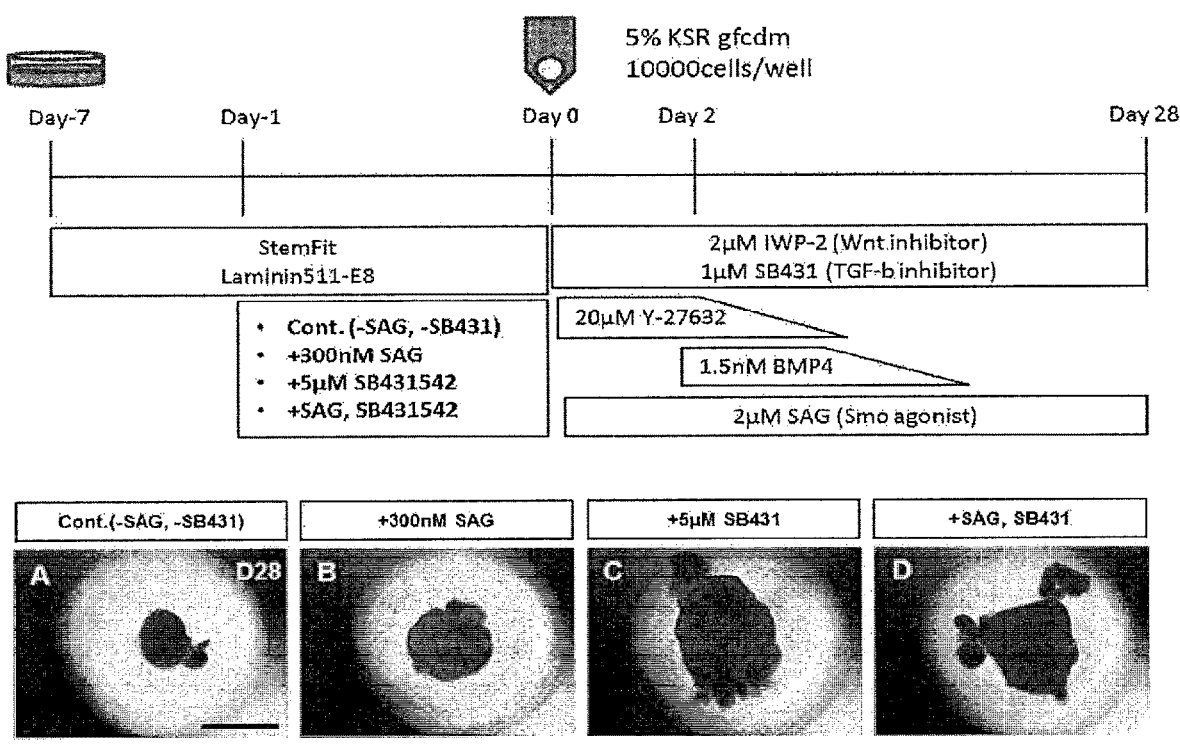
FIG. 6. The upper panel of FIG. 6 is a diagram schematically showing a procedure for examining the effect of a pre-treatment with a compound before the start of suspension culturing on the production of a cell mass containing pituitary tissue from human ES cells in Example 5. The lower panels A-D are diagrams showing bright-field observation images by an inverted microscope of the cell mass 28 days from the start of suspension culturing in Example 5. A is a cell mass free of a pre-treatment with a compound, B is a cell mass subjected to a pre-treatment with 300 nM SAG, C is a cell mass subjected to a pre-treatment with 5 µM SB431542, and D is a cell mass subjected to a pre-treatment by simultaneous addition of SAG and SB431542.

Bright field observation was performed under an inverted microscope on day 28 from the start of suspension culturing (FIGS. 6A-D). The scale bar at the lower right of FIG. 6A shows 1000 µm. As a result, a small cell mass was formed under the conditions without addition of the compound (SAG and/or SB431542) before suspension culturing, and a mesenchymal cell could not be confirmed between the outer nonneural epithelial tissue and the inner neuroepithelial tissue (FIG. 6A). The cell mass became large under the conditions with a treatment with 300 nM SAG alone as compared to the conditions with no addition, and the presence of a mesenchymal cell could also be confirmed (FIG. 6B). Under conditions in which 5 µM SB-431542 alone is added and conditions in which SAG and SB431542 are simultaneously added, larger cell masses containing pituitary tissues were formed (FIGS. 6C, D).

From the above-mentioned results, it was found that the formation efficiency of the cell mass containing pituitary tissue is improved by performing a compound treatment before the start of the suspension culturing and, as the conditions therefor, conditions in which 5 µM SB-431542 alone is added (+5 µM SB-431542), and conditions in which SAG and SB431542 are simultaneously added (+SAG/SB) are preferable.

Example 6: Consideration of Addition Conditions of Wnt Signal Transduction Pathway Inhibiting Substance in the Production of Cell Mass Containing Pituitary Tissue from Human ES Cell Human ES cells (KhES-1 strain) were cultured under feeder-free conditions according to the method described in Scientific Reports, 4, 3594 (2014). As the feeder-free medium, StemFit medium was used and, as the feeder-free scaffold, Laminin 511-E8 was used.

Specific maintenance culturing operation was performed in the same manner as in Example 1.

Thereafter, suspension culturing in a 96 well plate was performed under conditions similar to those in Example 1 except that the kind or the presence or absence of the Wnt signal transduction pathway inhibiting substance to be added at the start of suspension culturing was changed. As the Wnt signal transduction pathway inhibiting substances, IWP-2, C-59 (manufactured by Cayman Chemicals, 500 nM), LGK974 (manufactured by Cayman Chemicals, 5 µM) which are PORCN inhibitors; XAV939 (manufactured by Cayman Chemicals, 1 µM), IWR1-endo (manufactured by Merck Millipore, 1 µM) which are TANK inhibitors, and KY02111 (manufactured by Cayman Chemicals, 5 µM) whose action mechanism has not been reported were added at the start of the suspension culturing, and the condition with the addition of DMSO alone as a control of no addition of a Wnt signal transduction pathway inhibiting substance was performed.

A serum-free medium not containing Y27632 and containing each Wnt signal transduction pathway inhibiting substance, SB-431542, BMP4, and SAG was added at 100 µl per well on day 2 from the start of suspension culturing. BMP4 was added at 3 nM to the medium so that the final concentration in the well would be 1.5 nM, and SAG was added at 4 µM to the medium so that the final concentration in the well would be 2 µM.

A half amount of the medium was changed with a serum-free medium not containing Y27632 or BMP4 and containing each Wnt signal transduction pathway inhibiting substance, SB-431542 and SAG on days 6, 10, 13, 17, 21, 24 from the start of suspension culturing. In addition to the above-mentioned conditions, the condition in which neither SB431542 nor a Wnt signal transduction pathway inhibiting substance is added during suspension culturing was also performed.

Figure 7:
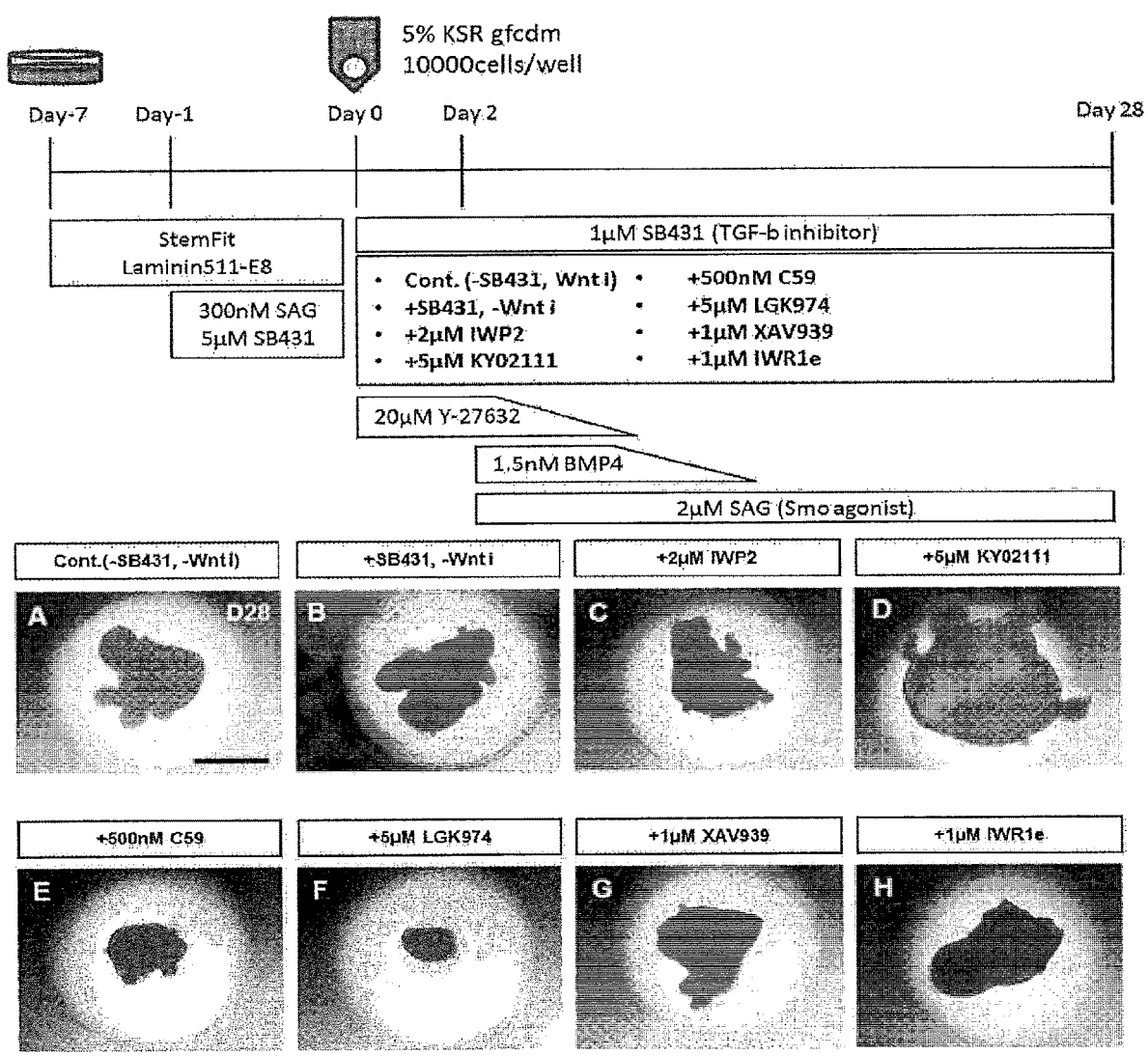
FIG. 7. The upper panel of FIG. 7 is a diagram schematically showing a procedure for examining the effect of each Wnt signal transduction pathway inhibiting substance on the production of a cell mass containing pituitary tissue from human ES cells in Example 6. The lower panels A-H are diagrams showing bright-field observation images by an inverted microscope of the cell mass 28 days from the start of suspension culturing in Example 6. Diagrams of bright-field observation images by an inverted microscope of the cell masses 28 days from the start of suspension culturing and formed from A: control without addition of a Wnt signal transduction pathway inhibiting substance or SB431542, B: condition with addition of SB431542 and no addition of Wnt signal transduction pathway inhibiting substance, and C-H: cell masses obtained by adding Wnt signal transduction pathway inhibiting substance at varied kinds at the start of suspension culturing and further performing suspension culturing.

Bright field observation was performed using an inverted microscope (manufactured by KEYENCE CORPORATION, BIOREVO) on day 28 from the start of suspension culturing (FIGS. 7A-H). The scale bar at the lower right of FIG. 7A shows 1000 µm.

As a result, nonneural epithelial tissue was not formed on the surface of the cell masses under the condition in which neither SB431542 nor a Wnt signal transduction pathway inhibiting substance was added, and the condition in which SB431542 was added and a Wnt signal transduction pathway inhibiting substance was not added (FIGS. 7A, B). On the other hand, cell masses having a nonneural epithelial structure on the surface were formed under the condition in which IWP-2, KY02111, C59, LGK974, XAV939, and IWR1-endo, which are Wnt signal transduction pathway inhibiting substances, were added (FIGS. 7C-H). Particularly, large cell masses in good condition were formed when 2 µM IWP-2, 5 µM KY02111, 1 µM XAV939, and 1 µM IWR1e were added (FIGS. 7C, D, G, H). From the above-mentioned results, it was found that formation of nonneural epithelial tissue by BMP signal on the surface of cell masses containing pituitary tissue is promoted by inhibiting the Wnt signal transduction pathway by using a PORCN inhibitor, a TANK inhibitor and the like.

Example 7: Consideration of Addition Concentration of BMP4 in the Production of Cell Mass Containing Pituitary Tissue from Human ES Cell Human ES cells (KhES-1 strain, obtained from Kyoto University) were cultured under feeder-free conditions according to the method described in Scientific Reports, 4, 3594 (2014). As the feeder-free medium, StemFit medium was used and, as the feeder-free scaffold, Laminin 511-E8 was used.

Specific maintenance culturing operation was performed in the same manner as in Example 1.

Thereafter, suspension culturing in a 96 well plate was started under conditions similar to those in Example 1.

A serum-free medium not containing Y27632 and containing IWP-2, SB-431542, BMP4, and SAG was added at 100 µl per well on day 2 from the start of suspension culturing. In this case, the amount of BMP4 to be added was under 4 conditions of 0.5 nM, 1.5 nM, 5 nM and no addition control. BMP4 was added at twice the concentration set for the medium so that the final concentration set for the well could be achieved. SAG was added at 4 µM to the medium so that the final concentration in the well would be 2 µM.

A half amount of the medium was changed with a serum-free medium not containing Y27632 or BMP4 and containing IWP-2, SB-431542 and SAG on days 6, 10, 13, 17, 21 and 24 from the start of suspension culturing.

Figure 8:
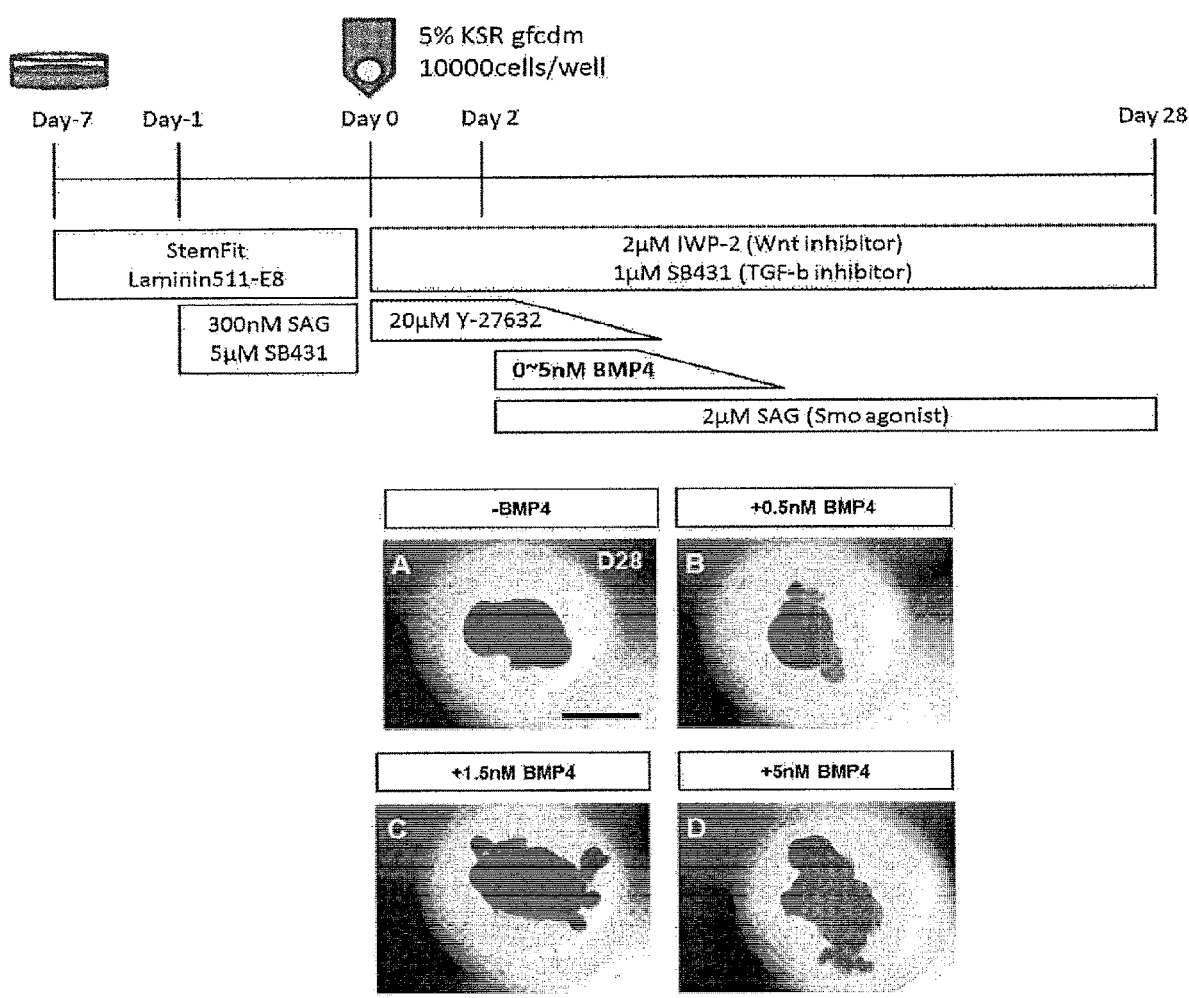
FIG. 8. The upper panel of FIG. 8 is a diagram schematically showing a procedure for producing a cell mass containing pituitary tissue from human ES cells by changing the addition concentration of BMP4 in Example 7. The lower panels A-D are diagrams showing bright-field observation images by an inverted microscope of the cell masses 28 days from the start of suspension culturing in Example 7. Diagrams of bright-field observation images by an inverted microscope of the cell masses 28 days from the start of suspension culturing and formed from A: control without addition of BMP4, and B-D: cell masses obtained by adding BMP4 at varied concentration (0.5 nM, 1.5 nM, 5 nM) on day 2 from the start of suspension culturing and further performing suspension culturing.

Bright field observation was performed under an inverted microscope on day 28 from the start of suspension culturing (FIGS. 8A-D). The scale bar at the lower right of FIG. 8A shows 1000 µm.

As a result, a nonneural epithelial structure was not formed on the surface of the cell mass under the conditions without addition of BMP4 (FIG. 8A). On the other hand, a nonneural epithelial structure was formed on the surface of the cell mass under the conditions with the addition of 0.5 nM, 1.5 nM or 5 nM BMP4 (FIGS. 8B-D). From the above-mentioned results, it was found that addition of BMP4 one time on day 2 of suspension culturing results in the formation of nonneural epithelial tissue on the surface of cell masses containing pituitary tissue.

Example 8: Consideration of TGFβ Signal Transduction Pathway Inhibitory Conditions in the Production of Cell Mass Containing Pituitary Tissue from Human ES Cell Human ES cells (KhES-1 strain) were cultured under feeder-free conditions according to the method described in Scientific Reports, 4, 3594 (2014). As the feeder-free medium, StemFit medium was used and, as the feeder-free scaffold, Laminin 511-E8 was used.

Specific maintenance culturing operation was performed in the same manner as in Example 1.

Thereafter, suspension culturing in a 96 well plate was performed under conditions similar to those in Example 1 except that the concentration and kind of the TGFβ signal transduction pathway inhibiting substance to be added at the start of the suspension culturing are changed. As the TGFβ signal transduction pathway inhibiting substance therefor, SB431542 (1 or 10 µM), A 83-01 (manufactured by Cayman Chemicals, 1 or 10 µM), and RepSox (manufactured by Cayman Chemicals, 1 µM) were added at respective concentration conditions.

Thereafter, a serum-free medium not containing Y27632 and containing IWP-2, each TGFβ signal transduction pathway inhibiting substance, BMP4, and SAG was added at 100 µl per well on day 2 from the start of suspension culturing. BMP4 was added at 3 nM to the medium so that the final concentration in the well would be 1.5 nM, and SAG was added at 4 µM to the medium so that the final concentration in the well would be 2 µM.

A half amount of the medium was changed with a serum-free medium not containing Y27632 or BMP4 and containing IWP-2, each TGFβ signal transduction pathway inhibiting substance, and SAG on days 6, 10, 13, 17, 21, 24 from the start of suspension culturing. In addition to the above-mentioned conditions, the condition in which neither a TGFβ signal transduction pathway inhibiting substance nor IWP-2 is added during suspension culturing, and the condition in which IWP-2 is added and a TGFβ signal transduction pathway inhibiting substance is not added during suspension culturing were also performed.

Figure 9:
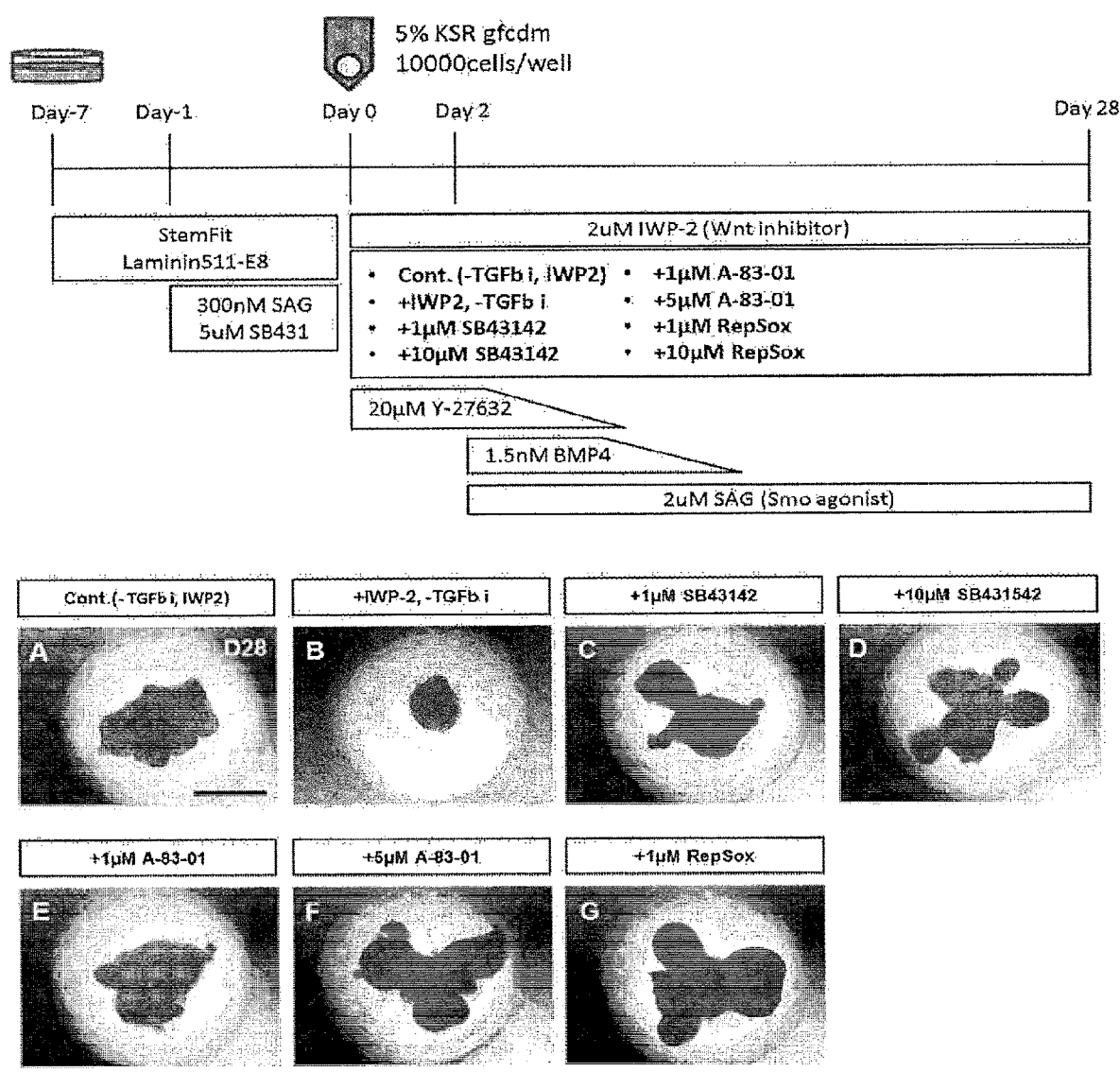
FIG. 9. The upper panel of FIG. 9 is a diagram schematically showing a procedure for examining the effect of each TGFβ signal transduction pathway inhibiting substance on the production of a cell mass containing pituitary tissue from human ES cells in Example 8. The lower panels A-G are diagrams showing bright-field observation images by an inverted microscope of the cell mass 28 days from the start of suspension culturing in Example 8. Diagrams of bright-field observation images by an inverted microscope of the cell masses 28 days from the start of suspension culturing and formed from A: control without addition of a TGFβ signal transduction pathway inhibiting substance or IWP-2, B: condition with addition of IWP-2 and no addition of a TGFβ signal transduction pathway inhibiting substance, and C-G: cell masses obtained by adding various kinds of TGFβ signal transduction pathway inhibiting substance at varied concentrations at the start of suspension culturing and further performing suspension culturing.

As a result, in step (1), a nonneural epithelial structure was not formed on the surface of the cell mass on day 28 from the start of suspension culturing under the condition in which neither a TGFβ signal transduction pathway inhibiting substance nor IWP-2 is added during suspension culturing (FIG. 9A). While a nonneural epithelial structure was formed on the surface of the cell mass under the condition in which IWP-2 was added and a TGFβ signal transduction pathway inhibiting substance was not added, the formed cell mass was small, and a mesenchymal cell could not be confirmed between the outer nonneural epithelial tissue and the inner neuroepithelial tissue (FIG. 9B). Under the condition in which each TGFβ signal transduction pathway inhibiting substance was added, a large cell mass containing pituitary tissue in which mesenchymal cell is present between the outer nonneural epithelial tissue and the inner neuroepithelial tissue was formed (FIGS. 9C-G). From the above-mentioned results, it was found that a large cell mass containing pituitary tissue in which a mesenchymal cell is present between the outer nonneural epithelial tissue and the inner neuroepithelial tissue can be produced by adding a TGFβ signal transduction pathway inhibiting substance during suspension culturing.

Example 9: Cell Mass Containing Neural Tissue and Nonneural Epithelial Tissue and Produced from Human iPS Cells Human iPS cells (201B7 strain, obtained from iPS Academia Japan, Inc.) were cultured under feeder-free conditions according to the method described in Scientific Reports, 4, 3594 (2014). As the feeder-free medium, StemFit medium was used and, as the feeder-free scaffold, Laminin 511-E8 was used.

Specific maintenance culturing operation was performed in the same manner as in Example 1.

Thereafter, suspension culturing in a 96 well plate was performed under conditions similar to those in Example 1.

A serum-free medium not containing Y27632 and containing IWP-2, SB-431542, SAG, and BMP4 was added at 100 µl per well on day 2 from the start of suspension culturing. BMP4 was added at 3 nM to the medium so that the final concentration in the well would be 1.5 nM, and SAG was added at 4 µM to the medium so that the final concentration in the well would be 2 µM.

A half amount of the medium was changed with a serum-free medium not containing Y27632 or BMP4 and containing IWP-2, SB-431542, and SAG on days 6, 10, 13, 17, 21, 24 from the start of suspension culturing.

Figure 10:
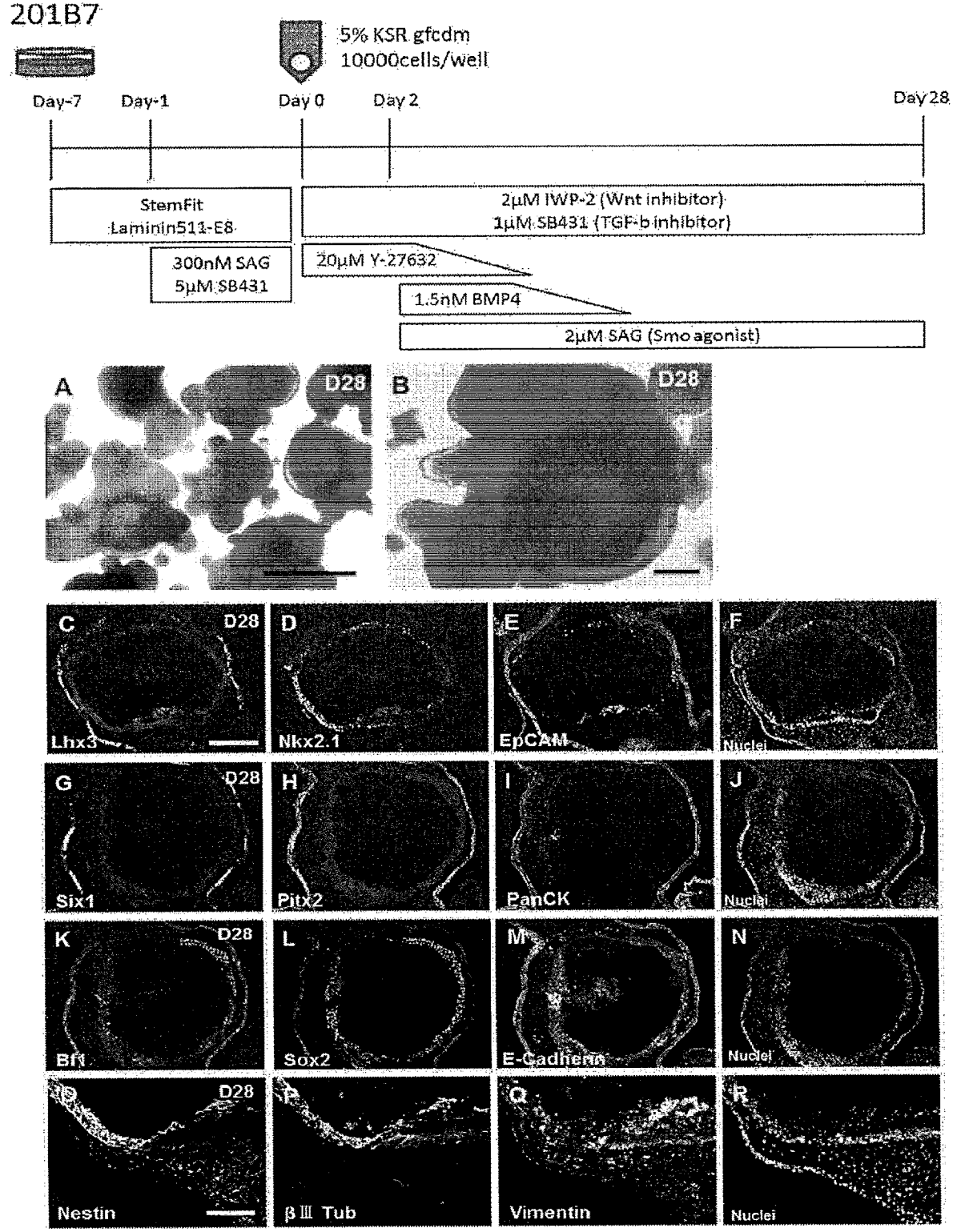
FIG. 10. The upper panel of FIG. 10 is a diagram schematically showing a procedure for producing a cell mass containing pituitary tissue from human iPS cells in Example 9. The lower panels A and B are diagrams showing bright-field observation images by an inverted microscope of the cell mass 28 days from the start of suspension culturing in Example 9. The lower panels C-R show the results of examination by fluorescent immunostaining of the expression state of each cell marker in the cell mass 28 days from the start of suspension culturing. C-F respectively show stained images of Lhx3, Nkx2.1, EpCAM and nuclear-stained image thereof. G-J respectively show stained images of Six1, Pitx2, pan-cytokeratin (PanCK) and nuclear-stained image thereof. K-N respectively show stained images of Bf1, Sox2, E-Cadherin and nuclear-stained image thereof. O-R respectively show stained images of Nestin, βIII tubulin (βIII Tub), Vimentin and nuclear-stained image thereof.

Bright field observation was performed under an inverted microscope) on day 28 from the start of suspension culturing (FIGS. 10A, B). The scale bar at the lower right of FIG. 10A shows 1000 µm, and the scale bar at the lower right of FIG. 10B shows 200 µm. As a result, it was found that a cell mass in which nonneural epithelial tissue surrounds neural tissue of the center part from the human iPS cell line 201B7 was formed as in the case of production from human ES cell line KhES-1 in Example 1.

The above-mentioned cell masses on day 28 of the culturing were fixed by a method similar to that in Example 1 to prepare cryosections. The cryosections were subjected to fluorescence immunostaining with an anti-Lhx3 antibody which is an initial marker of pituitary gland, an anti-Pitx2 antibody (manufactured by R&D Systems, sheep) which is a mouth cavity epithelial or pituitary placode marker, an anti-Six1 antibody (manufactured by Atlas Antibodies, rabbit) which is a nonneural epithelial or placode marker, an anti-Nkx2.1 antibody which is a ventral diencephalon marker, an Sox2 antibody which is an undifferentiated nerve and placode marker, a Bf1 antibody (manufactured by Takara Bio Inc., rabbit) which is a telencephalon and placode marker, an anti-CD326/EpCAM antibody (manufactured by R&D Systems, goat), an anti-pan-cytokeratin antibody, an anti-E-Cadherin antibody (manufactured by Santa Cruz Biotechnology, mouse) which are nonneural epithelial tissue markers, an anti-Nestin antibody which is an undifferentiated nerve and neural crest or mesenchymal cell marker, an anti-βIII tubulin (Tuj1) antibody which is a nerve cell marker, and an anti-Vimentin antibody (manufactured by R&D Systems, goat) which is a mesenchymal cell marker. Multiple staining was performed using, as fluorescence-labeled secondary antibodies, an Alexa647-labeled donkey anti-goat antibody (manufactured by Thermo Fisher Scientific) in addition to those used in Example 1. Hoechst33342 was used for comparison staining of nucleus. FIG. 10F is a comparison nuclear-stained image of FIG. 10C, D, E, FIG. 10J is that of FIGS. 10G, H, I, FIG. 10N is that of FIGS. 10K, L, M, and FIG. 10R is that of FIGS. 10O, P, Q. Upright fluorescence microscope Axio Imager M2 (manufactured by Carl Zeiss) and the attached software, Axio Vision, were used for observation and obtainment of images of the stained sections. The scale bar at the lower right of FIG. 10C shows 200 μm, and the scale bar at the lower right of FIG. 10O shows 100 μm.

As a result, it was found that the inside of the cell masses on day 28 from the start of suspension culturing which were induced by the above-mentioned differentiation induction method from human iPS cell line 201B7 was Nkx2.1, Sox2, Bf1, tubulin positive neuroepithelial tissue of ventral diencephalon or hypothalamus, and the outside was EpCAM, pan-cytokeratin, E-Cadherin, Pitx2 positive mouth cavity nonneural epithelial tissue. Furthermore, it was found that a part of the nonneural epithelial tissue was Lhx3, Bf1, Sox2 positive, and a Rathke's pouch-like structure formed by invaginated nonneural epithelial tissue and pituitary placode were formed. In addition, a Nestin, Vimentin-positive; pan-cytokeratin, laminin-weakly positive; βIII tubulin-negative cranial mesenchymal cell was present between the outer nonneural epithelial tissue and the inner neuroepithelial tissue. From the above-mentioned results, it was shown that, according to the production method of the present invention, a mass containing nonneural epithelium, neuroepithelium, and mesenchymal cells, and having an outside covered by nonneural epithelium, ventral diencephalon or hypothalamus-like neuroepithelial tissue having a ventricle-like structure in the inside is formed, and cranial mesenchymal cell is present between nonneural epithelium and neuroepithelium, and a part of outer nonneural epithelium is pituitary placode can be produced from human iPS cells like human ES cells.

Example 10: Cell Mass Containing Neural Tissue and Nonneural Epithelial Tissue and Produced from Human iPS Cell Using Wnt Signal Transduction Pathway Activating Substance and Inhibitory Substance in Combination Human iPS cells (HC-6 #10 strain, obtained from RIKEN) were cultured under feeder-free conditions according to the method described in Scientific Reports, 4, 3594 (2014). As the feeder-free medium, StemFit medium was used and, as the feeder-free scaffold, Laminin 511-E8 was used.

Specific maintenance culturing operation was performed in the same manner as in Example 1.

The thus-prepared subconfluent human iPS cells were washed with PBS, subjected to an enzyme treatment using Accumax, a serum-free medium for differentiation induction was added, and the cells were scraped from the surface of the culture dish by using a cell scraper and dispersed into single cells by pipetting. Thereafter, the aforementioned human ES cells dispersed into single cells were suspended in 100 μl of a serum-free medium at $9 \times 10^3$ cells per well of a non-cell-adhesive 96-well culture plate (PrimeSurface 96V-bottom plate, manufactured by SUMITOMO BAKELITE), and cultured in suspension under the conditions of 37° C., 5% $CO_2$. As the serum-free medium (gfCDM+KSR) therefor, a serum-free medium which is a 1:1 mixture of F-12+Glutamax medium (manufactured by Thermo Fisher Scientific) and IMDM+Glutamax medium (manufactured by Thermo Fisher Scientific) supplemented with 5% Knockout Serum Replacement (manufactured by Thermo Fisher Scientific), 450 μM 1-monothioglycerol (manufactured by Wako Pure Chemical Industries, Ltd.), 1× Chemically defined lipid concentrate (manufactured by Thermo Fisher Scientific), 50 unit/ml penicillin-50 μg/ml streptomycin (manufactured by Nacalai Tesque) was used. At the time of the start of suspension culturing (day 0 from the start of suspension culturing, start of step 1), Y27632 (final concentration 20 μM), SB-431542 (TGFβ signal transduction pathway inhibiting substance, manufactured by Wako Pure Chemical Industries, Ltd., 1 μM), and IWP-2 (Wnt signal transduction pathway inhibiting substance, manufactured by Tocris Bioscience, 2 μM) were added to the aforementioned serum-free medium. In addition, conditions in which CHIR99021 (manufactured by Cayman Chemical) is added at 300 nM, 1 μM, 3 μM as a Wnt signal transduction pathway activating substance, and conditions in which DMSO alone is added as a control of no addition were set, totaling in 4 conditions. In the present Example, CHIR99021 is sometimes referred to as CHIR.

A serum-free medium not containing Y27632 and containing SB-431542, IWP-2, BMP4 (BMP signal transduction pathway activating substance) and CHIR99021 under each condition set was added at 100 μl per well on day 2 from the start of suspension culturing. BMP4 was added at 3 nM to the medium so that the final concentration in the well would be 1.5 nM. As a method for inducing cell mass containing nonneural epithelium and placode, a half amount of the medium was changed with a serum-free medium not containing Y27632 or BMP4, and containing IWP-2, SB-431542, K02288 (BMP signal transduction pathway inhibiting substance, manufactured by AdooQ Bioscience), FGF2-TS (FGF signal transduction pathway activating substance, manufactured by HumanZyme) and Heparin Sodium (manufactured by FUJIFILM Wako Pure Chemical Corporation) on day 3 from the start of suspension culturing. K02288, FGF2, and Heparin Sodium were respectively added at 2 μM, 40 ng/ml, and 20 μg/ml to the medium so that the final concentration in the well would be respectively 1 μM, 20 ng/ml, and 10 μg/ml. A half amount of the medium was changed on day 6 and day 10 from the start of suspension culturing.

Figure 11:
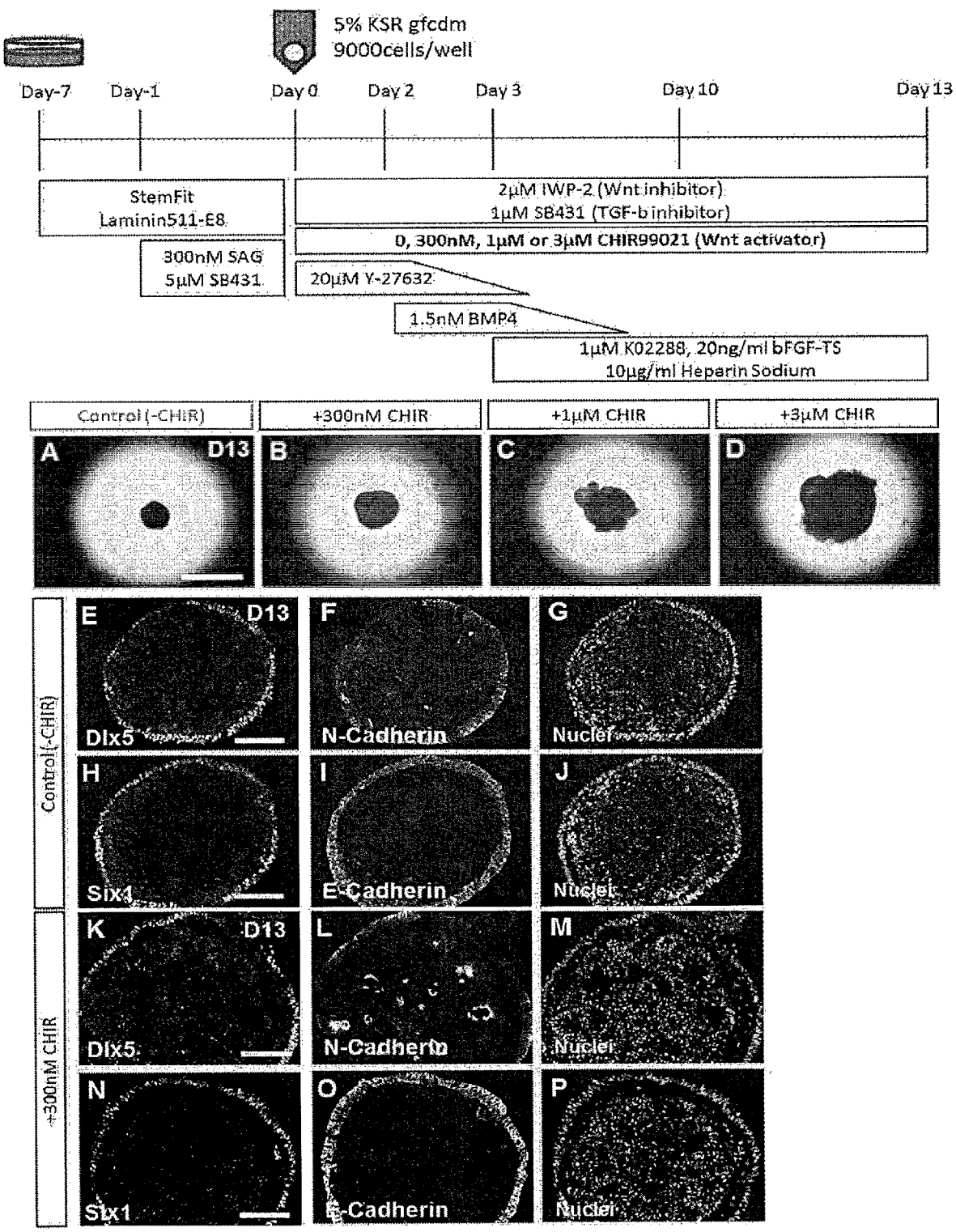
FIG. 11. The upper panel of FIG. 11 is a diagram schematically showing a procedure for producing a cell mass containing neural tissue and nonneural epithelial tissue from human iPS cells in Example 10. The lower panels A-D are diagrams showing bright-field observation images by an inverted microscope of the cell mass 13 days from the start of suspension culturing in Example 10. The lower panels E-P show the results of examination by fluorescent immunostaining of the expression state of each cell marker in the cell mass 13 days from the start of suspension culturing. E-G and K-M respectively show stained images of Dlx5, N-Cadherin and nuclear-stained image thereof. H-J and N-P respectively show stained images of Six1, E-Cadherin and nuclear-stained to image thereof.

On day 13 from the start of suspension culturing, bright field observation was performed under an inverted microscope (FIGS. 11A-D). The scale bar at the lower right of FIG. 11A shows 1000 μm. As a result, it was found that a cell mass in which nonneural epithelial tissue surrounds neural tissue of the center part from the human iPS cell line HC-6 #10 strain was formed as in the case of production from human ES cell line KhES-1 in Example 1. It was found that nonneural epithelial tissue is formed on the surface even when a BMP signal transduction pathway inhibiting substance and an FGF signal transduction pathway activating substance are added on day 3 from the start of suspension culturing. Furthermore, it was found that a Wnt signal transduction pathway activating substance CHIR99021 acts even in the presence of IWP-2 which is a Wnt signal transduction pathway inhibiting substance, and cell masses grow in a concentration-dependent manner, whereas formation of nonneural epithelial tissue on the surface of cell mass is inhibited under 3 µM CHIR99021 addition conditions.

The above-mentioned cell masses on day 13 of the culturing were fixed by a method similar to that in Example 1 to prepare cryosections. The cryosections were subjected to fluorescence immunostaining with an anti-Six1 antibody which is a nonneural epithelial or placode marker, an anti-Dlx5 antibody (manufactured by Atlas Antibodies, rabbit), an anti-E-Cadherin antibody (manufactured by R&D Systems, goat), and an anti-N-Cadherin antibody (manufactured by BD Biosciences, mouse) which are central nervous system or placode markers (FIGS. 11E-P, FIGS. 12Q-AB). Upright fluorescence microscope Axio Imager M2 (manufactured by Carl Zeiss) and the attached software, Axio Vision, were used for observation and obtainment of images of the stained sections. The scale bar at the lower right of FIGS. 11E, H, K, N, FIGS. 12Q, T, W, Z shows 100 µm.

Figure 12:
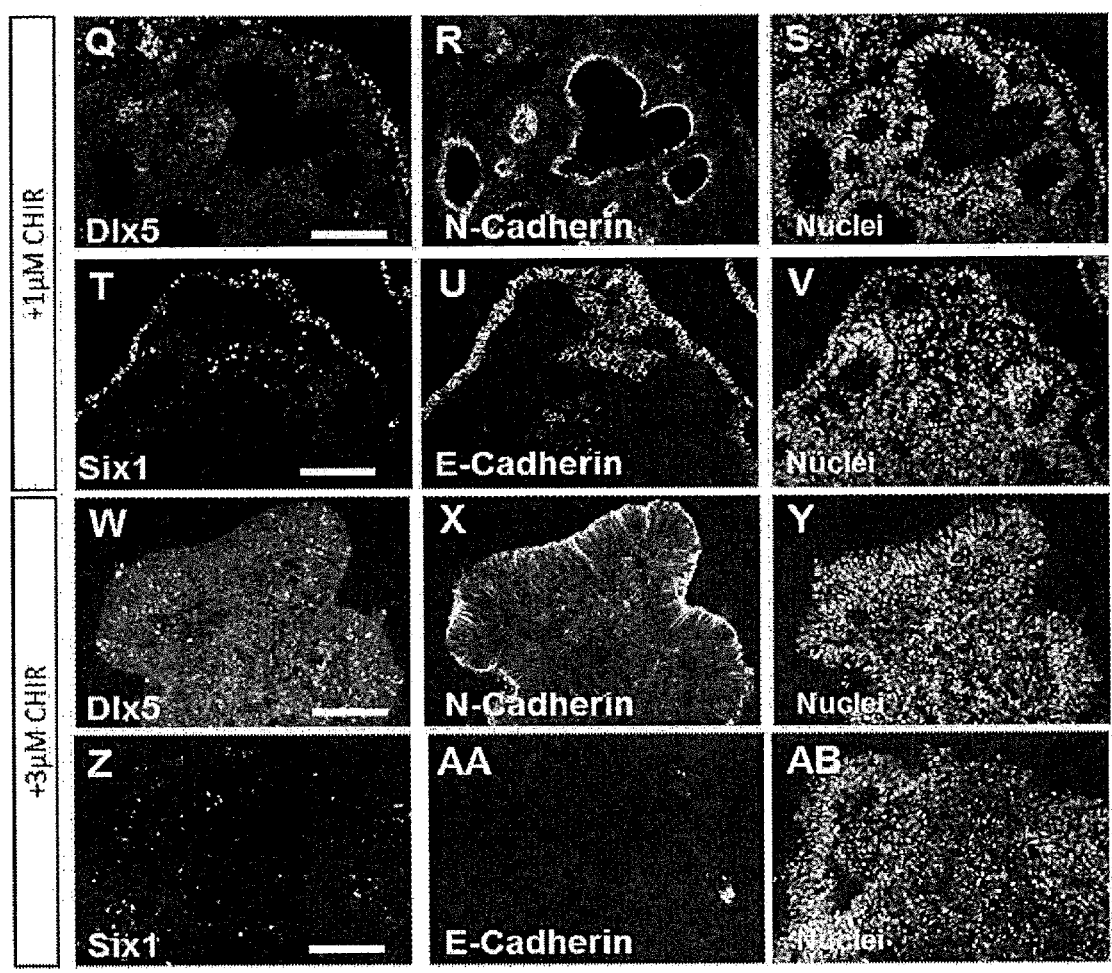
FIG. 12.

As a result, cell masses on day 13 from the start of suspension culturing which were induced from human iPS cell line HC-6 #10 by the above-mentioned differentiation induction method showed formation of Dlx5, Six1, E-Cadherin, N-Cadherin positive nonneural epithelium or placode precursor tissue under CHIR no addition conditions and 300 nM, 1 µM CHIR addition conditions (FIGS. 11E-P, FIGS. 12Q-V). Formation of nonneural epithelium was not observed under 3 µM CHIR addition conditions, thus suggesting occurrence of differentiation into other tissues (FIGS. 12W-AB). A comparison of CHIR no addition conditions and 300 nM, 1 µM CHIR addition conditions revealed that larger cell masses were formed under 300 nM CHIR addition conditions than CHIR no addition conditions, and survival of neural tissue in the inside and epithelial formation were promoted. On the other hand, thickening of nonneural epithelium on the outside and formation of placode were suppressed under 1 µM CHIR addition conditions. From the above-mentioned results, it was shown that a certain level (not more than about 3 µM CHIR99021) of β-catenin-dependent activation of canonical Wnt pathway in the presence of IWP-2 which is a Wnt signal transduction pathway inhibiting substance is effective for the growth of whole cell masses, survival of neural tissue in the inside, and promotion of epithelial formation.

Example 11: Cell Mass Containing Neural Tissue and Pituitary Tissue and Produced from Human iPS Cell Using Wnt Signal Transduction Pathway Activating Substance and Inhibitory Substance in Combination Human iPS cells (HC-6 #10 strain, obtained from RIKEN) were cultured under feeder-free conditions according to the method described in Scientific Reports, 4, 3594 (2014). As the feeder-free medium, StemFit medium was used and, as the feeder-free scaffold, Laminin 511-E8 was used.

Specific maintenance culturing operation was performed in the same manner as in Example 1.

The thus-prepared subconfluent human iPS cells were washed with PBS, subjected to an enzyme treatment using Accumax, a serum-free medium for differentiation induction was added, and the cells were scraped from the surface of the culture dish by using a cell scraper and dispersed into single cells by pipetting. Thereafter, the aforementioned human ES cells dispersed into single cells were suspended in 100 µl of a serum-free medium at $9 \times 10^3$ cells per well of a non-cell-adhesive 96-well culture plate (PrimeSurface 96V-bottom plate, manufactured by SUMITOMO BAKELITE), and cultured in suspension under the conditions of 37° C., 5% $CO_2$. As the serum-free medium (gfCDM+KSR) therefor, a serum-free medium which is a 1:1 mixture of F-12+Glutamax medium (manufactured by Thermo Fisher Scientific) and IMDM+Glutamax medium (manufactured by Thermo Fisher Scientific) supplemented with 5% Knockout Serum Replacement (manufactured by Thermo Fisher Scientific), 450 µM 1-monothioglycerol (manufactured by Wako Pure Chemical Industries, Ltd.), 1× Chemically defined lipid concentrate (manufactured by Thermo Fisher Scientific), 50 unit/ml penicillin-50 µg/ml streptomycin (manufactured by Nacalai Tesque) was used. At the time of the start of suspension culturing (day 0 from the start of suspension culturing, start of step 1), Y27632 (final concentration 20 µM), SB-431542 (TGFβ signal transduction pathway inhibiting substance, manufactured by Wako Pure Chemical Industries, Ltd., 1 µM), and IWP-2 (Wnt signal transduction pathway inhibiting substance, manufactured by Tocris Bioscience, 2 µM) were added to the aforementioned serum-free medium. In addition, CHIR99021 (manufactured by Cayman Chemical, 300 nM) was added as a Wnt signal transduction pathway activating substance.

A serum-free medium not containing Y27632 and containing SB-431542, IWP-2, CHIR99021, BMP4 (BMP signal transduction pathway activating substance), and SAG (Shh signal transduction pathway activating substance) was added at 100 µM per well on day 2 from the start of suspension culturing. BMP4 was added at 3 nM to the medium so that the final concentration in the well would be 1.5 nM. SAG was added at 1.4 µM to the medium so that the final concentration in the well would be 700 nM.

A half amount of the medium was changed with a serum-free medium not containing Y27632 or BMP4 and containing SAG, SB-431542, IWP-2, and CHIR99021 at the same concentration on day 6, 10, 13 from the start of suspension culturing. With the aim of further growing the placode precursor tissue formed, a half amount of the medium was changed with a serum-free medium containing FGF2-TS (FGF signal transduction pathway activating substance, manufactured by HumanZyme, 20 ng/ml), heparin sodium (FGF stabilizer, manufactured by Fujifilm Corporation Wako Pure Chemical Industries, Ltd., 10 µg/ml) in addition to SAG, SB-431542, IWP-2 and CHIR99021 on days 17, 21, 24 from the start of suspension culturing.

Figure 13:
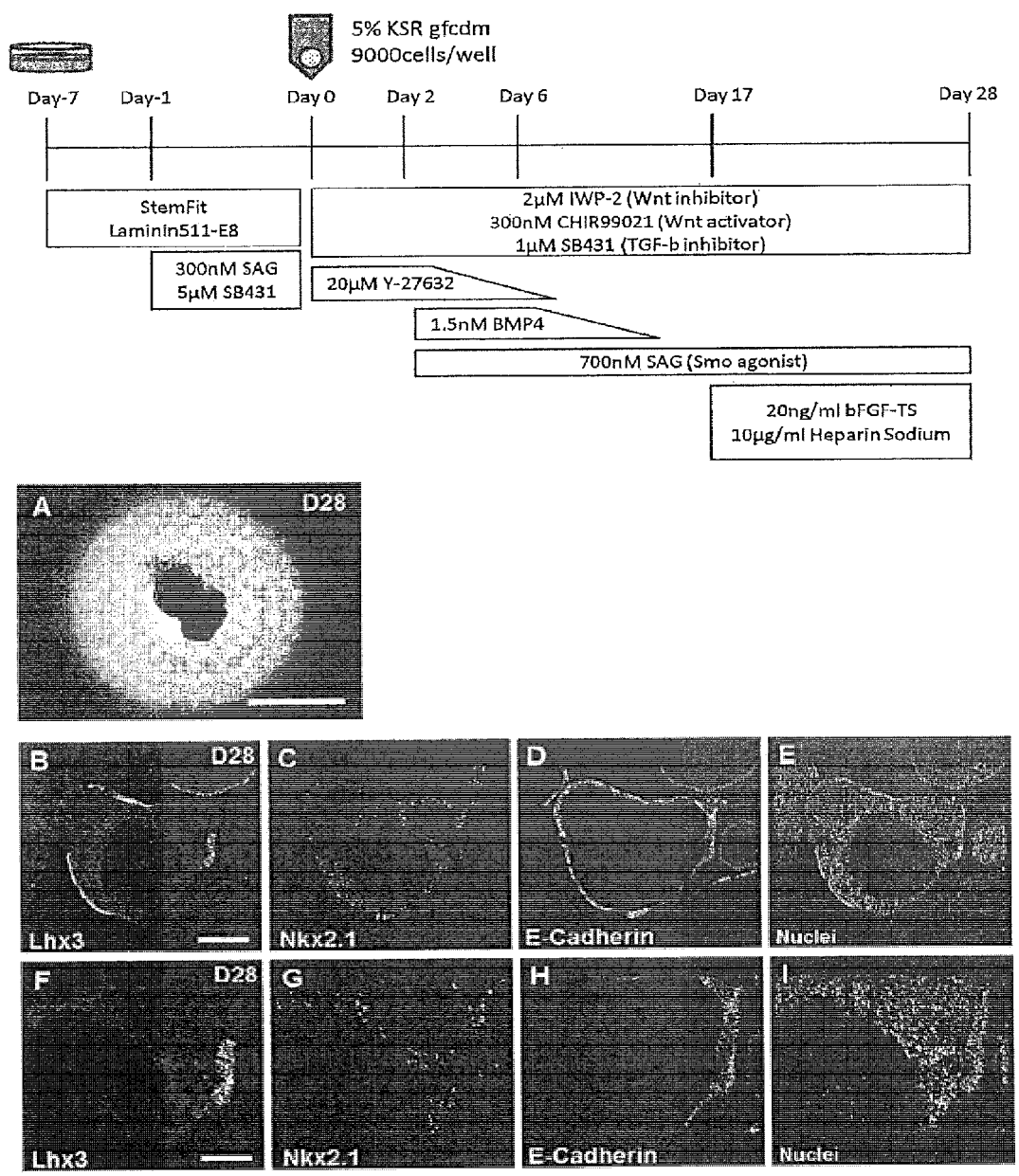
FIG. 13. The upper panel of FIG. 13 is a diagram schematically showing a procedure for producing a cell mass containing pituitary tissue from human iPS cells in Example 11. The lower panel A is a diagrams showing bright-field observation images by an inverted microscope of the cell mass 28 days from the start of suspension culturing in Example 11. The lower panels B-I show the results of examination by fluorescent immunostaining of the expression state of each cell marker in the cell mass 28 days from the start of suspension culturing. B-E and F-I respectively show stained images of Lhx3, Nkx2.1, E-Cadherin and nuclear-stained image thereof.

Bright field observation was performed under an inverted microscope on day 28 from the start of suspension culturing (FIG. 13A). The scale bar at the lower right of FIG. 11A shows 1000 µm. As a result, it was found that, under the condition with the addition of SAG, a cell mass in which nonneural epithelial tissue surrounds neural tissue of the center part from the human iPS cell line HC-6 #10 strain was formed as in the case of production from human ES cell line KhES-1 in Example 1.

The cell masses on day 28 of the above-mentioned culturing were fixed by a method similar to that in Example 1 to prepare cryosections. The cryosections were subjected to fluorescence immunostaining with antibodies to Lhx3, Nkx2.1, E-Cadherin, Nestin, Pitx2, Sox2, Six1, Vimentin, Rx, N-Cadherin, Tbx3, and pan-cytokeratin by a method similar to that in Example 1 (FIGS. 13B-I, FIGS. 14J-V).

Figure 14:
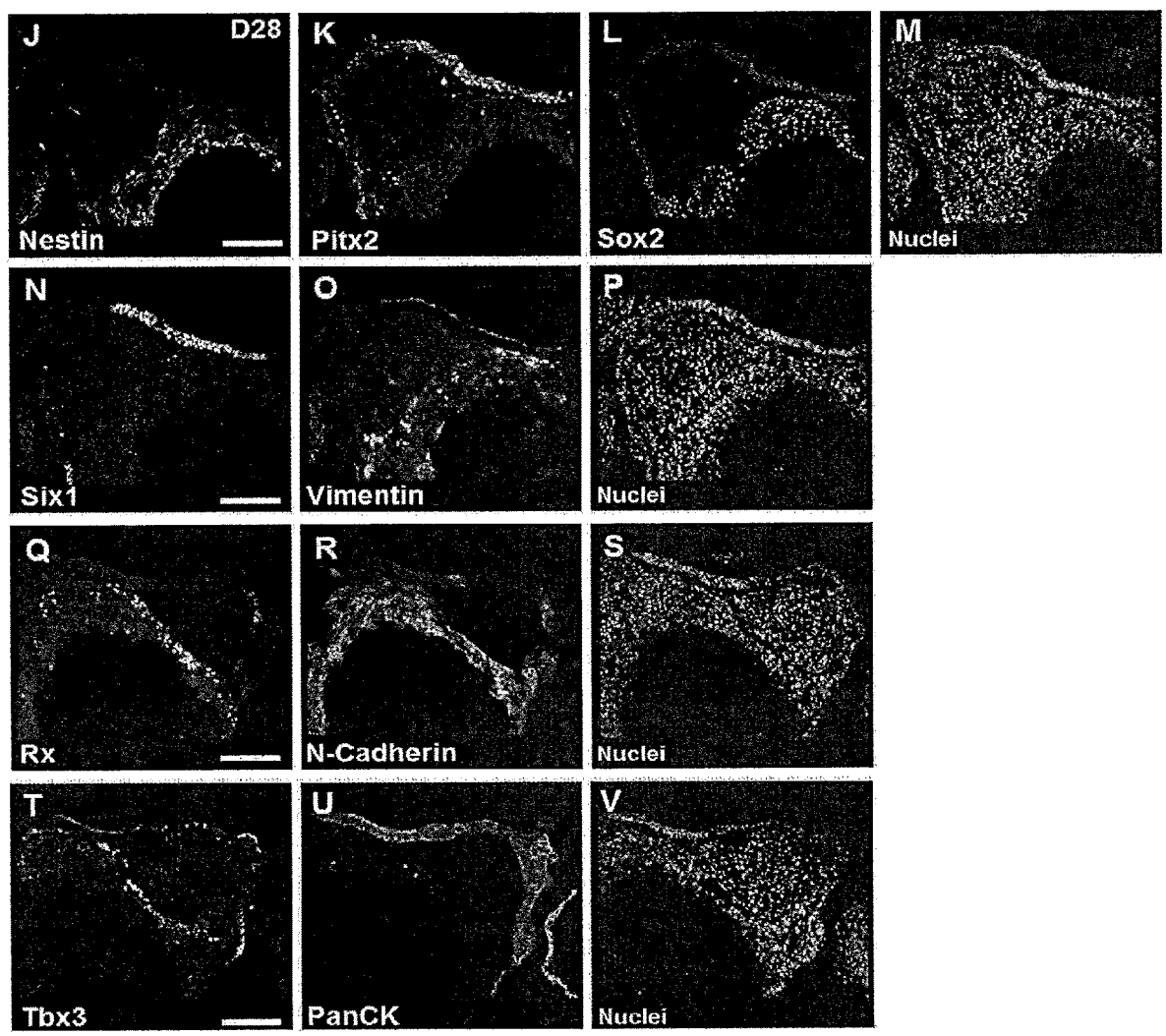
FIG. 14. 14J-V are diagrams sequentially showing bright-field observation images by an inverted microscope of the cell mass 28 days from the start of suspension culturing in Example 11 and continued from FIG. 13. J-M respectively show stained images of Nestin, Pitx2, Sox2 and nuclear-stained image thereof. N-P respectively show stained images of Six1, Vimentin and nuclear-stained image thereof. Q-S respectively show stained images of Rx, N-Cadherin and nuclear-stained image thereof. T-V respectively show stained images of Tbx3, pan-cytokeratin and nuclear-stained image thereof.

FIGS. 13E, I, FIGS. 14M, P, S, V are comparison nuclear-stained images of the immunostaining images on the same line.

As a result, it was found that the inside of the cell masses on day 28 from the start of suspension culturing which were induced from human iPS cell line HC-6 #10 strain by the above-mentioned differentiation induction method with the addition of a Wnt signal transduction pathway activating substance and an FGF signal transduction pathway activating substance contained Nkx2.1, Sox2, Tbx3, Rx, N-Cadherin positive neuroepithelial tissue of ventral diencephalon or hypothalamus, and the outside was pan-cytokeratin, E-Cadherin, Pitx2 positive nonneural epithelial tissue of the mouth cavity. Furthermore, it was found that a part of the nonneural epithelial tissue was Lhx3, Six1, Sox2 positive, and a Rathke's pouch-like structure formed by invaginated nonneural epithelial tissue and pituitary placode were formed. In addition, Nestin, Vimentin-positive, pan-cytokeratin-weakly positive cranial mesenchymal cell was present between the outer nonneural epithelial tissue and the inner neuroepithelial tissue. From the above-mentioned results, it was shown that, by the differentiation induction conditions including addition of a Wnt signal transduction pathway activating substance and an FGF signal transduction pathway activating substance, a mass containing nonneural epithelium, neuroepithelium, and mesenchymal cells, and having an outside covered by nonneural epithelium, ventral diencephalon or hypothalamus-like neuroepithelial tissue having a ventricle-like structure in the inside is formed, and cranial mesenchymal cell is present between nonneural epithelium and neuroepithelium, and a part of outer nonneural epithelium is pituitary placode can be produced from human iPS cells.

Example 12: Cell Mass Containing Neural Tissue and Nonneural Epithelial Tissue and Produced from Human iPS Cells Using BMP Signal Transduction Pathway Inhibiting Substance after Given Period from Addition of BMP Signal Transduction Pathway Activating Substance Human iPS cells (HC-6 #10 strain, obtained from RIKEN) were cultured under feeder-free conditions according to the method described in Scientific Reports, 4, 3594 (2014). As the feeder-free medium, StemFit medium was used and, as the feeder-free scaffold, Laminin 511-E8 was used.

Specific maintenance culturing operation was performed in the same manner as in Example 1.

The thus-prepared subconfluent human iPS cells were washed with PBS, subjected to an enzyme treatment using Accumax, a serum-free medium for differentiation induction was added, and the cells were scraped from the surface of the culture dish by using a cell scraper and dispersed into single cells by pipetting. Thereafter, the aforementioned human ES cells dispersed into single cells were suspended in 100 μl of a serum-free medium at $9 \times 10^3$ cells per well of a non-cell-adhesive 96-well culture plate (PrimeSurface 96V-bottom plate, manufactured by SUMITOMO BAKELITE), and cultured in suspension under the conditions of 37° C., 5% $CO_2$. As the serum-free medium (gfCDM+KSR) therefor, a serum-free medium which is a 1:1 mixture of F-12+Glutamax medium (manufactured by Thermo Fisher Scientific) and IMDM+Glutamax medium (manufactured by Thermo Fisher Scientific) supplemented with 5% Knockout Serum Replacement (manufactured by Thermo Fisher Scientific), 450 μM 1-monothioglycerol (manufactured by Wako Pure Chemical Industries, Ltd.), 1× Chemically defined lipid concentrate (manufactured by Thermo Fisher Scientific), 50 unit/ml penicillin-50 μg/ml streptomycin (manufactured by Nacalai Tesque) was used. At the time of the start of suspension culturing (day 0 from the start of suspension culturing, start of step 1), Y27632 (final concentration 20 μM), SB-431542 (TGFβ signal transduction pathway inhibiting substance, manufactured by Wako Pure Chemical Industries, Ltd., 1 μM), IWP-2 (Wnt signal transduction pathway inhibiting substance, manufactured by Tocris Bioscience, 2 μM) and CHIR99021 (manufactured by Cayman Chemical, 300 nM) were added to the aforementioned serum-free medium.

Figure 15:
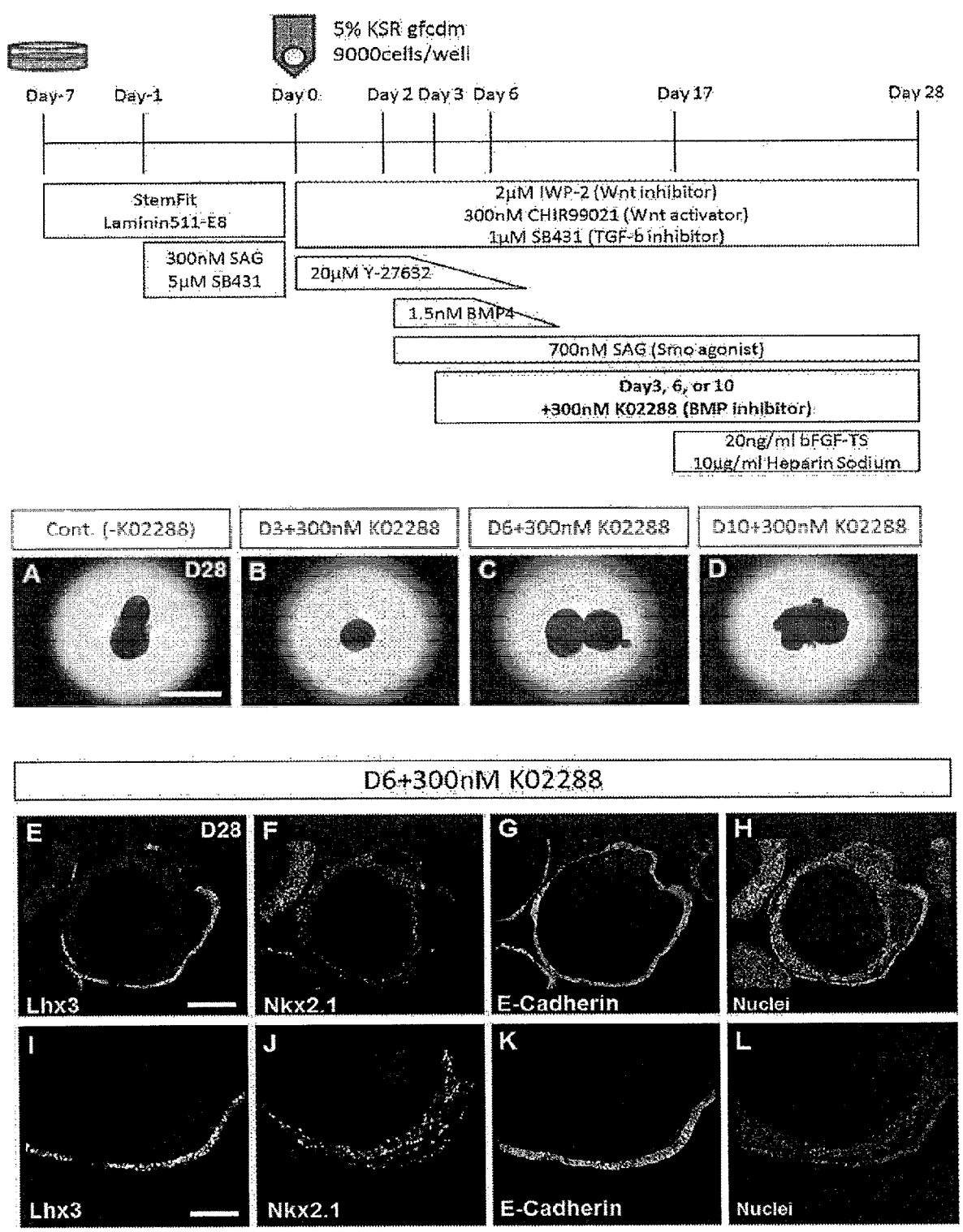
FIG. 15. The upper panel of FIG. 15 is a diagram schematically showing a procedure for producing a cell mass containing pituitary tissue from human iPS cells in Example 12. The lower panels A-D are diagrams showing bright-field observation images by an inverted microscope of the cell mass 28 days from the start of suspension culturing in Example 12. The lower panels E-L show the results of examination by fluorescent immunostaining of the expression state of each cell marker in the cell mass 28 days from the start of suspension culturing. E-H and I-L respectively show stained images of Lhx3, Nkx2.1, E-Cadherin and nuclear-stained image thereof.

A serum-free medium not containing Y27632 and containing SB-431542, IWP-2, CHIR99021, BMP4 (BMP signal transduction pathway activating substance), and SAG (Shh signal transduction pathway activating substance) was added at 100 μl per well on day 2 from the start of suspension culturing. BMP4 was added at 3 nM to the medium so that the final concentration in the well would be 1.5 nM. SAG was added at 1.4 μM to the medium so that the final concentration in the well would be 700 nM. A half amount of the medium was changed with a serum-free medium not containing Y27632 or BMP4 and containing SAG, SB-431542, IWP-2, and CHIR99021 on days 3, 6, 10, 13 from the start of suspension culturing. Also, 4 conditions were set including conditions in which K02288 (BMP signal transduction pathway inhibiting substance, manufactured by Adooq BioScience, 300 nM) is added at the time of change of a half amount of the medium on any of days 3, 6, 10 from the start of suspension culturing, and addition of solvent DMSO as a control. K02288 was added at 600 nM to the medium so that the final concentration in the well would be 300 nM. With the aim of further growing the placode precursor tissue formed, a half amount of the medium was changed with a serum-free medium such that the final concentration would be 20 ng/ml FGF2-TS, 10 μg/ml heparin sodium, in addition to SAG, SB-431542, IWP-2, CHIR99021 and K02288 on days 17, 21, 24 from the start of suspension culturing. Bright field observation was performed under an inverted microscope on day 28 from the start of suspension culturing (FIGS. 15A-D). The scale bar at the lower right of FIG. 15A shows 1000 μm. As a result, it was found that a cell mass in which nonneural epithelial tissue surrounds neural tissue of the center part was formed even under conditions in which K02288 was added at any time on days 3, 6, 10 from the start of suspension culturing, in addition to the control with no addition of K02288.

Figure 16:
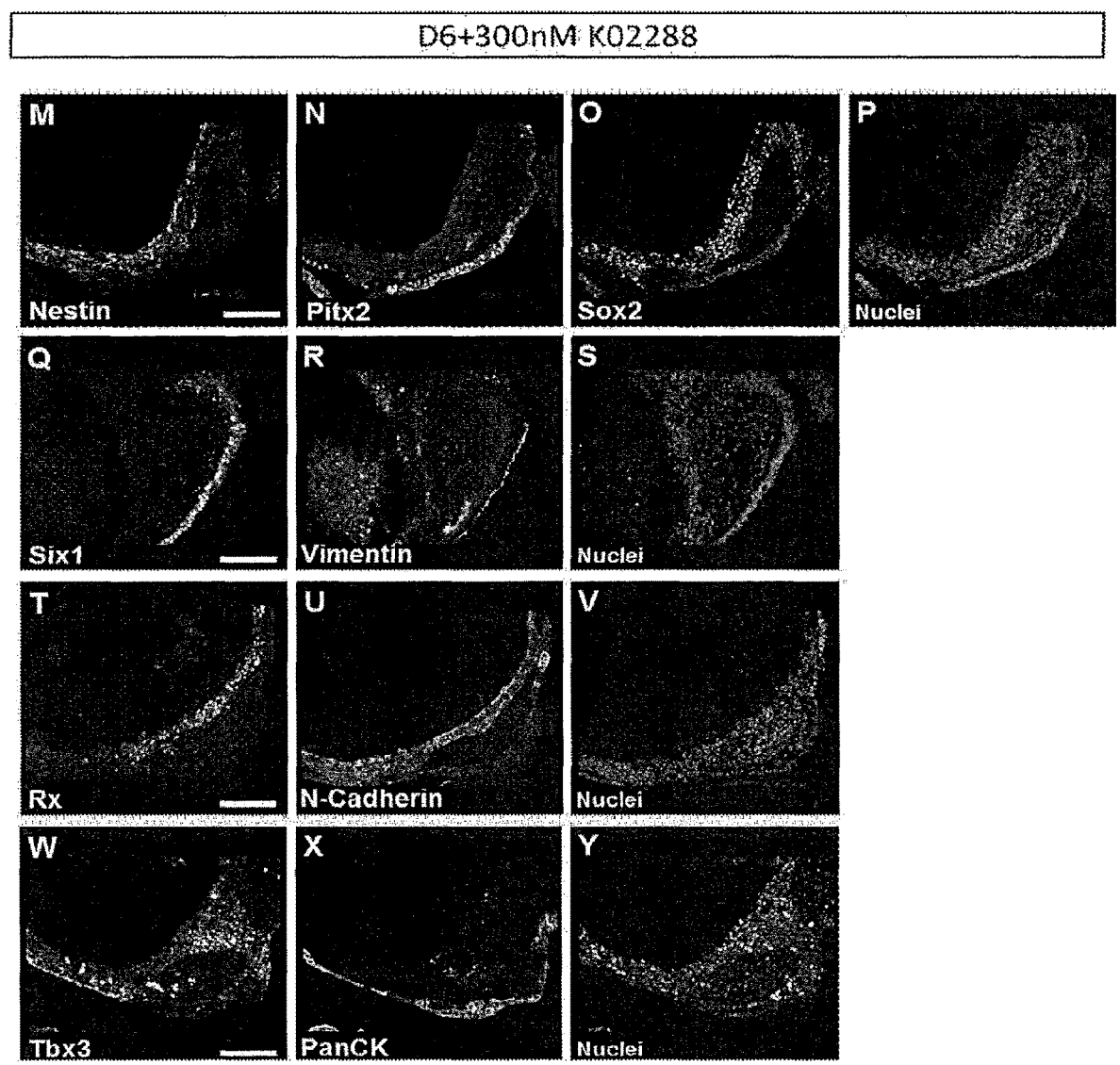
FIG. 16.

Furthermore, the cell masses on day 28 of the above-mentioned culturing, which had been induced to differentiate by adding K02288 on day 6 from the start of suspension culturing, were fixed by a method similar to that in Example 1 to prepare cryosections. The cryosections were subjected to fluorescence immunostaining with antibodies to Lhx3, Nkx2.1, E-Cadherin, Nestin, Pitx2, Sox2, Six1, Vimentin, Rx, N-Cadherin, Tbx3, and pan-cytokeratin by a method similar to that in Example 1 (FIGS. 15E-L, FIGS. 16M-Y). FIGS. 15H, L, FIGS. 16P, S, V, Y are comparison nuclear-stained images of the immunostaining images on the same line.

As a result, it was found that the inside of the cell masses on day 28 from the start of suspension culturing which were induced from human iPS cell line HC-6 #10 strain by the above-mentioned differentiation induction method in which a BMP signal transduction pathway inhibiting substance is added after a given period from the addition of a BMP signal transduction pathway activating substance contained Nkx2.1, Sox2, Tbx3, Rx, N-Cadherin positive neuroepithelial tissue of ventral diencephalon or hypothalamus, and the outside was pan-cytokeratin, E-Cadherin, Pitx2 positive nonneural epithelial tissue of the mouth cavity. Furthermore, it was found that a part of the nonneural epithelial tissue was Lhx3, Six1, Sox2 positive, and a Rathke's pouch-like structure formed by invaginated nonneural epithelial tissue and pituitary placode were formed. In addition, Nestin, Vimentin-positive, pan-cytokeratin-weakly positive cranial mesenchymal cell was present between the outer nonneural epithelial tissue and the inner neuroepithelial tissue. Furthermore, a cell mass having an extremely high proportion of pituitary placode marker Lhx3 positive cells on the surface thereof could be obtained by adding a BMP signal transduction pathway inhibiting substance.

The above-mentioned results reveal that the proportion of pituitary placode formed on a part of nonneural epithelium can be increased by the differentiation induction conditions in which a BMP signal transduction pathway inhibiting substance is added after a given period from the addition of a BMP signal transduction pathway activating substance.

INDUSTRIAL APPLICABILITY

According to the present invention, a cell mass containing central nervous system tissue such as ventral diencephalon, cranial mesenchymal cells and pituitary tissue can be produced efficiently from pluripotent stem cells at a low cost.

This application is based on a patent application No. 2017-226312 filed in Japan (filing date: Nov. 24, 2017), the contents of which are incorporated in full herein.

The invention claimed is:

1. A method for producing a cell mass comprising pituitary tissue, the method comprising:
   (1) culturing pluripotent stem cells in the absence of feeder cells and in a medium comprising 1) a TGFβ family signal transduction pathway inhibiting substance and/or a Sonic hedgehog signal transduction pathway activating substance, and 2) a factor for maintaining an undifferentiated state for 6 to 48 hours,
   (2) suspension-culturing the pluripotent stem cells obtained in (1), to form a cell aggregate in the absence of a factor for maintaining an undifferentiated state and in the presence of a Wnt signal transduction pathway inhibiting substance for 72 hours or less, and
   (3) suspension-culturing the cell aggregate obtained in (2) in the presence of a BMP signal transduction pathway activating substance and a Sonic hedgehog signal transduction pathway activating substance, to obtain a cell mass comprising pituitary tissue,
   wherein the TGFβ family signal transduction pathway inhibiting substance is selected from a group consisting of a TGFβ signal transduction pathway inhibitor, Nodal/Activin signal transduction inhibitor and BMP signal transduction inhibitor,
   wherein the BMP signal transduction pathway activating substance in (3) is added during a period when not less than 10% of the cells of the surface layer of the aggregate formed in (2) form a tight junction, and
   wherein the factor for maintaining an undifferentiated state comprises a FGF signal transduction pathway activating substance.

2. A method for producing a cell mass comprising pituitary tissue, the method comprising:
   (1) suspension-culturing pluripotent stem cells to form a cell aggregate in the absence of a factor for maintaining an undifferentiated state and in the presence of a Wnt signal transduction pathway inhibiting substance,
   (2) suspension-culturing the cell aggregate obtained in (1) in the presence of a BMP signal transduction pathway activating substance and a Sonic hedgehog signal transduction pathway activating substance, and
   (3) suspension-culturing the cell aggregate obtained in (2) in the presence of a BMP signal transduction pathway inhibiting substance, to obtain a cell mass comprising pituitary tissue,
   wherein the BMP signal transduction pathway activating substance in (2) is added during a period when not less than 10% of the cells of the surface layer of the aggregate formed in (1) form a tight junction.

3. The method of claim 2, wherein the suspension-culturing in (1), (2), and (3) is performed in the further presence of a TGFβ signal transduction pathway inhibiting substance.

4. The method of claim 2, wherein at least one of (1), (2), and (3) is performed in the presence of an FGF signal transduction pathway activating substance.

5. The method of claim 2, wherein at least one of (1), (2), and (3) is performed in the presence of a Wnt signal transduction pathway activating substance.

6. The method of claim 1, wherein the TGFβ signal transduction pathway inhibiting substance is an Alk5/TGFβR1 inhibitor, and wherein the Alk5/TGFβR1 inhibitor is at least one compound selected from the group consisting of SB431542, SB505124, SB525334, LY2157299, GW788388, LY364947, SD-208, EW-7197, A 83-01, and RepSox.

7. The method of claim 1, wherein the TGFβ signal transduction pathway inhibiting substance is a SMAD3 inhibitor, and wherein the SMAD3 inhibitor is SIS3.

8. The method of claim 1, wherein a concentration of the BMP signal transduction pathway activating substance in step (3) is a concentration showing BMP signal transduction pathway promoting activity corresponding to that of BMP4 at 10 pM to 5 nM.

9. The method of claim 2, wherein the BMP signal transduction pathway inhibiting substance is a type I BMP receptor inhibitor.

10. The method of claim 9, wherein the type I BMP receptor inhibitor is at least one selected from the group consisting of K02288, Dorsomorphin, LDN-193189, LDN-212854, LDN-214117, ML347, DMH1, and DMH2.

11. The method of claim 1, wherein the FGF signal transduction pathway activating substance is bFGF.

12. The method according to claim 1, wherein the TGFβ signal transduction pathway inhibiting substance is a Alk5/TGFβR1 inhibitor or SMAD3 inhibitor.

13. A method for producing a cell mass comprising pituitary tissue, the method comprising:
   (1) culturing pluripotent stem cells in the absence of feeder cells and in a medium comprising 1) a TGFβ family signal transduction pathway inhibiting substance and/or a Sonic hedgehog signal transduction pathway activating substance, and 2) a factor for maintaining an undifferentiated state for 6 to 48 hours,
   (2) suspension-culturing the pluripotent stem cells obtained in (1), to form a cell aggregate in the absence of a factor for maintaining an undifferentiated state and in the presence of a Wnt signal transduction pathway inhibiting substance,
   (3) suspension-culturing the cell aggregate obtained in (2) in the presence of a BMP signal transduction pathway activating substance and a Sonic hedgehog signal transduction pathway activating substance, and (4) suspension-culturing the cell aggregate obtained in (3) in the presence of a BMP signal transduction pathway inhibiting substance, to obtain a cell mass comprising pituitary tissue, wherein the TGFβ family signal transduction pathway inhibiting substance is selected from a group consisting of a TGFβ signal transduction pathway inhibitor, Nodal/Activin signal transduction inhibitor and BMP signal transduction inhibitor, wherein the BMP signal transduction pathway activating substance in (3) is added during a period when not less than 10% of the cells of the surface layer of the aggregate formed in (2) form a tight junction, and wherein the factor for maintaining an undifferentiated state comprises a FGF signal transduction pathway activating substance.

14. The method of claim 1, wherein the Wnt signal transduction pathway inhibiting substance is a Porcupine (PORCN) inhibitor.

15. The method of claim 1, wherein (2) and/or (3) is performed in the presence of a TGFβ signal transduction pathway inhibiting substance.

16. The method of claim 1, wherein (2) and/or (3) is performed in the presence of an FGF signal transduction pathway activating substance.

17. The method of claim 1, wherein (2) and/or (3) is performed in the presence of a Wnt signal transduction pathway activating substance.

18. The method of claim 1, wherein the suspension-culturing in (2) and/or (3) is performed in the further presence of a Notch signal inhibitor.

19. The method of claim 1, wherein the suspension-culturing in (2) and/or (3) is performed in the further presence of dexamethasone.

20. The method of claim 1, wherein the BMP signal transduction pathway activating substance is selected from a group consisting of BMP2, BMP4, BMP7 and GDF7.

21. The method of claim 20, wherein the BMP signal transduction pathway activating substance is BMP4.

22. The method of claim 1, wherein the BMP signal transduction pathway activating substance in (3) is added within 0.5 hr to 72 hr from the start of the suspension culturing of the pluripotent stem cells in (2).

23. The method of claim 1, wherein the Sonic hedgehog signal transduction pathway activating substance is selected from a group consisting of proteins belonging to Hedgehog family, Shh receptor, Shh receptor agonist, Smo agonist, purmorphamine, GSA-10, Hh-AG1.5, 20(S)-Hydroxycholesterol and SAG.

24. The method of claim 1, wherein the Sonic hedgehog signal transduction pathway activating substance is at least one compound selected from the group consisting of SAG, Purmorphamine, and GSA-10.

25. The method of claim 1, wherein a concentration of Sonic hedgehog signal transduction pathway activating substance in (1) is a concentration showing Sonic hedgehog signal promoting activity corresponding to that of 10 nM to 1000 nM of SAG.

26. The method of claim 1, wherein a concentration of Sonic hedgehog signal transduction pathway activating substance in the step (3) is a concentration showing Sonic hedgehog signal promoting activity corresponding to that of 100 nM to 3 μM of SAG.

27. The method of claim 1, wherein the Wnt signal transduction pathway inhibiting substance is selected from a group consisting of a PORCN inhibitor, DKK inhibitor, Frizzled inhibitor, Dvl inhibitor, Tankyrase (TANK) inhibitor, casein kinase 1 inhibitor, catenin responsive transcription inhibitor, p300 inhibitor, CBP inhibitor, and BCL-9 inhibitor.

28. The method of claim 14, wherein the PORCN inhibitor is at least one compound selected from the group consisting of IWP-2, IWP-3, IWP-4, IWP-L6, IWP-12, LGK-974, Wnt-C59, ETC-159, and GNF-6231.

29. The method of claim 1, wherein the Wnt signal transduction pathway inhibiting substance is a TANK inhibitor.

30. The method of claim 29, wherein the TANK inhibitor is at least one compound selected from the group consisting of IWR1-endo, XAV939, and MN-64.

31. A method for producing a pituitary tissue, the method comprising:

(1) culturing pluripotent stem cells in the absence of feeder cells and in a medium comprising 1) a TGFβ family signal transduction pathway inhibiting substance and/or a Sonic hedgehog signal, transduction pathway activating substance, and 2) a factor for maintaining an undifferentiated state for 6 to 48 hours, (2) suspension-culturing the pluripotent stem cells obtained in (1), to form a cell aggregate in the absence of a factor for maintaining an undifferentiated state and in the presence of a Wnt signal transduction pathway inhibiting substance for 72 hours or less, (3) suspension-culturing the cell aggregate obtained in (2) in the presence of a BMP signal transduction pathway activating substance and a Sonic hedgehog signal transduction pathway activating substance, to obtain a cell mass comprising pituitary tissue, and (4) collecting pituitary tissue from the cell mass obtained in (3), wherein the TGFβ family signal transduction pathway inhibiting substance is selected from the group consisting of a TGFβ signal transduction pathway inhibitor, Nodal/Activin signal transduction inhibitor and BMP signal transduction inhibitor, wherein the BMP signal transduction pathway activating substance in the (3) is added during a period when not less than 10% of the cells of the surface layer of the aggregate formed in the (2) form a tight junction, and wherein the factor for maintaining an undifferentiated state comprises a FGF signal transduction pathway activating substance.

* * * * *